United States Patent [19]

Honda et al.

[11] Patent Number: 4,834,501

[45] Date of Patent: May 30, 1989

[54] LIGHT RECEIVING MEMBER HAVING A LIGHT RECEIVING LAYER OF A-SI(GE,SN)(H,X) AND A-SI(H,X) LAYERS ON A SUPPORT HAVING SPHERICAL DIMPLES WITH INSIDE FACES HAVING MINUTE IRREGULARITIES

[75] Inventors: Mitsuru Honda; Keiichi Murai, both of Chiba; Kyosuke Ogawa, Miye; Atsushi Koike, Chiba, all of Japan

[73] Assignee: Canon Kabushiki Kaisha, Tokyo, Japan

[21] Appl. No.: 923,108

[22] Filed: Oct. 24, 1986

[30] Foreign Application Priority Data

| | | | |
|---|---|---|---|
| Oct. 28, 1985 | [JP] | Japan | 60-239552 |
| Oct. 29, 1985 | [JP] | Japan | 60-241892 |
| Oct. 30, 1985 | [JP] | Japan | 60-241575 |
| Oct. 31, 1985 | [JP] | Japan | 60-242787 |
| Nov. 1, 1985 | [JP] | Japan | 60-244143 |

[51] Int. Cl.$^4$ ...................... G02B 27/00; G03G 15/04

[52] U.S. Cl. .................................... 350/321; 350/1.6; 428/141; 430/57; 430/60; 430/84

[58] Field of Search .................. 350/321, 1.7, 1.1, 1.6, 350/163, 164, 311, 316, 318; 428/141, 149; 354/3; 356/359, 382; 355/3 R, 3 SH, 11; 430/57, 60, 84

[56] References Cited

U.S. PATENT DOCUMENTS

| | | | |
|---|---|---|---|
| 2,599,542 | 6/1952 | Carlson | 430/69 |
| 3,743,847 | 7/1973 | Boland | 350/1.6 |
| 3,758,336 | 9/1973 | Reichle | 428/141 |
| 4,106,859 | 8/1978 | Doriguzzi et al. | 428/141 |
| 4,322,125 | 3/1982 | Warren | 350/1.6 |
| 4,352,847 | 10/1982 | Okiyama | 430/950 |
| 4,419,397 | 12/1983 | Neat et al. | 428/141 |
| 4,511,614 | 4/1985 | Greenson et al. | 428/141 |
| 4,514,582 | 4/1985 | Tiedje et al. | 427/290 |
| 4,532,198 | 7/1985 | Saitoh et al. | 427/74 |
| 4,551,406 | 11/1985 | Schaedlich et al. | 430/56 X |
| 4,599,482 | 7/1986 | Yamazaki | 427/74 |
| 4,650,736 | 3/1987 | Saitoh et al. | 430/69 |
| 4,663,188 | 5/1987 | Kane | 427/74 |
| 4,683,160 | 7/1987 | Bloch et al. | 428/141 |
| 4,696,881 | 9/1987 | Saitoh et al. | 430/69 X |

FOREIGN PATENT DOCUMENTS

| | | | |
|---|---|---|---|
| 1346711 | 11/1983 | France | 430/69 |
| 55-144251 | 11/1980 | Japan | 430/69 |
| 60-31144 | 2/1985 | Japan | 430/69 |
| 60-166956 | 8/1985 | Japan | 430/69 |

*Primary Examiner*—John K. Corbin
*Assistant Examiner*—Loha Ben
*Attorney, Agent, or Firm*—Fitzpatrick, Cella, Harper & Scinto

[57] ABSTRACT

A light receiving member has a support and a light receiving layer. The light receiving layer has an inner layer composed of a-Si(Ge,Sn)(H,X) and an outer layer composed of a-Si(H,X) containing neither germanium atoms nor tin atoms. The support has an uneven surface of spherical dimples, each having an inside face provided with minute irregularities.

The light receiving member exhibits high photosensitivity in the entire visible region of light; exhibits an excellent matching property with a semiconductor laser and shows quick light response. The member is suited for image formation by using coherent light, free from interference fringe patterns and spots upon reversed development even after repeated use for a long period of time. The member is free from defective images or blurring, shows high density with clear half tones, has a high resolving power, and can provide high quality images.

39 Claims, 34 Drawing Sheets

(A)

(B)

(A)

(B)

(A)

(B)

LIGHT RECEIVING MEMBER HAVING A LIGHT RECEIVING LAYER OF A-SI(GE,SN)(H,X) AND A-SI(H,X) LAYERS ON A SUPPORT HAVING SPHERICAL DIMPLES WITH INSIDE FACES HAVING MINUTE IRREGULARITIES

BACKGROUND OF THE INVENTION

1. Field of the Invention

This invention concerns light receiving members being sensitive to electromagnetic waves such as light (which herein means in a broader sense those lights such as ultraviolet rays, visible rays, infrared rays, X-rays, and $\gamma$-rays). More specifically, the invention relates to improved light receiving members suitable particularly for use in the case where coherent lights such as laser beams are applied.

2. Description of the Prior Art

For the recording of digital image information, there has been known such a method as forming electrostatic latent images by optically scanning a light receiving member with laser beams modulated in accordance with the digital image information, and then developing the latent images or further applying transfer, fixing or like other treatment as required. Particularly, in the method of forming images by an Electrophotographic process, image recording has usually been conducted by using a He-Ne laser or a semiconductor laser (usually having emission wavelength at from 650 to 820 nm), which is small in size and inexpensive in cost as the laser source.

By the way, as the light receiving members for electrophotography being suitable for use in the case of using the semiconductor laser, those light receiving members comprising amorphous materials containing silicon atoms (hereinafter referred to as "a-Si"), for example, as disclosed in Japanese Patent Laid-Open Nos. 86341/1979 and 83746/1981, have been evaluated as being worthy of attention since they have a high Vickers hardness and cause less problems in the public pollution, in addition to their excellent matching property in the photosensitive region as compared with other kinds of known light receiving members.

However, when the light receiving layer constituting the light receiving member as described above is formed as an a-Si layer of mono-layer structure, it is necessary to structurally incorporate hydrogen or halogen atoms or, further, boron atoms within a range of specific amount into the layer in order to maintain the required dark resistance of greater than $10^{12}$ Ωcm as for the electrophotography while maintaining their high photosensitivity. Therefore, the degree of freedom for the design of the light receiving member undergoes a rather severe limit such as the requirement for the strict control for various kinds of conditions upon forming the layer. Then, there have been made several proposals to overcome such problems for the degree of freedom in view of the design in that the high photosensitivity can effectively be utilized while reducing the dark resistance to some extent. That is, the light receiving layer is so constituted as to have two or more layers prepared by laminating those layers for different conductivity in which a depletion layer is formed to the inside of the light receiving layer as disclosed in Japanese Patent Laid-Open Nos. 171743/1979, 4053/1982, and 4172/1982, or the apparent dark resistance is improved by providing a multi-layered structure in which a barrier layer is disposed between the support and the light receiving layer and/or on the upper surface of the light receiving layer as disclosed, for example, in Japanese Patent Laid-Open Nos. 52178/1982, 52179/1982, 52180/1982, 58159/1982, 58160/1982, and 58161/1982.

However, such light receiving members as having a light receiving light of multi-layered structure have unevenness in the thickness for each of the layers. In the case of conducting the laser recording by using such members, since the laser beams comprise coherent monochromatic light, the respective reflection lights reflected from the free surface of the light receiving layer on the side of the laser beam irradiation and from the layer boundary between each of the layers constituting the light receiving layer and between the support and the light receiving layer (hereinafter both of the free surface and the layer interface are collectively referred to as "interface") often interfere with each other.

The interference results in a so-called interference fringe pattern in the formed images to bring about defective images. Particularly, in the case of intermediate tone images with high gradation, the images obtained become extremely poor in identification.

Another important point to be referred to is a problem that the foregoing interference phenomenon becomes remarkable as the wavelength region of the semiconductor laser beams used is increased since the absorption of the laser beams in the light receiving layer is decreased.

That is, in the two or more layer (multi-layered) structure, interference occurs between each of the layers and the respective interferences are synergistically acted with each other to exhibit an interference fringe pattern, which directly gives an effect on the transfer material to transfer and fix the interference fringe on the member and thus in the visible images corresponding to the interference fringe pattern thus bringing about defective images.

In order to overcome these problems, there have been proposed, for example, (a) a method of cutting the surface of the support with diamond means to form a light scattering surface formed with unevenness of ±500 Å to ±10,000 Å (refer, for example, to Japanese Patent Laid-Open No. 162975/1983), (b) a method of disposing a light absorbing layer by treating the surface of an aluminum support with black alumite or dispersing carbon, colored pigment, or dye into a resin (refer, for example, to Japanese Patent Laid-open No. 165845/1982), and (c) a method of disposing a light scattering reflection preventing layer on the surface of an aluminum support by treating the surface of the support with a satin-like alumite processing or by disposing a fine grain-like unevenness by means of sand blasting (refer, for example, to Japanese Patent Laid-open No. 16554/1982).

Although these proposed methods provide satisfactory results to some extent, they are not sufficient for completely eliminating the interference fringe pattern resulted in the images.

That is, in the method (a), since a plurality of irregularities with a specific t are formed at the surface of the support, occurrence of the interference fringe pattern due to the light scattering effect can be prevented to some extent. However, since the regular reflection light component is still left as the light scattering, the interference fringe pattern due to the regular reflection light still remains and, in addition, the irradiation spot is widened due to the light scattering effect at the support surface to result in a substantial reduction in the resolving power.

In the method (b), it is impossible to obtain complete absorption only by the black alumite treatment and the reflection light still remain at the support surface. In the case of disposing the resin layer dispersed with the pigment, there are various problems in that degasification is caused from the resin layer upon forming an a-Si layer to remarkably deteriorate the layer quality of the thus formed light receiving layer, the resin layer is damaged by the plasmas upon forming the a-Si layer in which the inherent absorbing function is reduced and undesired effects are given to the subsequent formation of the a-Si layer due to the worsening in the surface state.

In the method (c), a portion of the incident light is reflected at the surface of the light receiving layer, while the remaining portion intrudes as the transmitted light to the inside of the light receiving layer. While a portion of the transmitted light is scattered as a diffused light at the surface of the support and the remaining portion is regularly reflected as a reflected light, a portion of which goes out as the outgoing light. However, the outgoing light is a component to interfere with the reflected light. In any way, since the light is remaining, the interference fringe pattern cannot be completely eliminated.

By the way, for preventing the interference in this case, although there has been attempted to increase the diffusibility at the surface of the support so that no multi-reflection occurs at the inside of the light receiving layer. However, this rather diffuses the light in the light receiving layer thereby causing halation and, after all, reducing the resolving power.

Particularly, in the light receiving member of the multi-layered structure, if the support surface is roughened irregularly, the reflected light at the surface of the first layer, the reflected light at the second layer, and the regular reflected light at the support surface interfere with one another to result in the interference fringe pattern in accordance with the thickness of each layer in the light receiving member. Accordingly, it is impossible to completely prevent the interference fringe by unevenly roughening the surface of the support in the light receiving member of the mutli-layered structure.

In the case of unevenly roughening the surface of the support by sand blasting or like other method, the surface roughness varies from one lot to another and the unevenness in the roughness occurs even in the same lot thereby causing problems in view of the production control. In addition, relatively large protrusions are frequently formed at random and such large protrusions cause local breakdown in the light receiving layer.

Further, even if the surface of the support is regularly roughened, since the light receiving layer is usually deposited along the uneven shape at the surface of the support, the inclined surface on the unevenness at the support are in parallel with the inclined surface on the unevenness at the light receiving layer, where the incident light brings about bright and dark areas. Further, in the light receiving layer, since the layer thickness is not uniform over the entire light receiving layer, dark and bright stripe pattern occurs. Accordingly, mere orderly roughening to the surface of the support cannot completely prevent the occurrence of the interference fringe pattern.

Furthermore, in the case of depositing the light receiving layer of multi-layered structure on the support having the surface which is regularly roughened, since the interference due to the reflected light at the interface between the layers is joined to the interference between the regular reflected light at the surface of the support and the reflected light at the surface of the light receiving layer, the situation is more complicated than the occurrence of the interference fringe in the light receiving member of single layer structure.

SUMMARY OF THE INVENTION

The object of this invention is to provide a light receiving member comprising a light receiving layer mainly composed of a-Si, free from the foregoing problems and capable of satisfying various kinds of requirements.

That is, the main object of this invention is to provide a light receiving member comprising a light receiving layer constituted with a-Si in which electrical, optical, and photoconductive properties are always substantially stable scarcely depending on the working circumstances, and which is excellent against optical fatigue, causes no degradation upon repeating use, excellent in durability and moisture-proofness, exhibits no or scarce residual potential and provides easy production control.

Another object of this invention is provide a light receiving member comprising a light receiving layer composed of a-Si which has a high photosensitivity in the entire visible region of light, particularly, an excellent matching property with a semiconductor laser, and shows quick light response.

Other object of this invention is to provide a light receiving member comprising a light receiving layer composed of a-Si which has high photosensitivity, high S/N ratio, and high electrical voltage withstanding property.

A further object of this invention is to provide a light receiving member comprising a light receiving layer composed of a-Si which is excellent in the close bondability between the support and the layer disposed on the support or between the laminated layers, strict and stable in that of the structural arrangement and of high layer quality.

A further object of this invention is to provide a light receiving member comprising a light receiving layer composed of a-Si which is suitable to the image formation by using coherent light, free from the occurrence of interference fringe pattern and spot upon reversed development even after repeating use for a long period of time, free from defective images or blurring in the images shows high density with clear half tone, and has a high resolving power, and can provide high quality images.

BRIEF DESCRIPTION OF THE DRAWINGS

These and other objects, as well as the features of this invention will become apparent by reading the following descriptions of preferred embodiments according to this invention while referring to the accompanying drawings, wherein:

FIGS. 2 and 3 are enlarged views for a portion illustrating the principle of preventing the occurrence of an interference fringe in the light receiving member, in which FIG. 2 is a view illustrating that the occurrence of the interference fringe can be prevented in the light receiving member in which unevenness constituted with spherical dimples is formed to the surface of the support according to this invention, and FIG. 3 is a view illustrating that the interference fringe occurs in the conventional light receiving member in which the light receiving layer is deposited on the support roughened regularly at the surface;

FIGS. 6(A) and 6(B) are charts schematically illustrating a constitutional example of a device suitable for forming the uneven shape formed to the support of the light receiving member according to this invention, in which FIG. 6(A) is a front elevational view, and FIG. 6(B) is a vertical cross-sectional view;

DETAILED DESCRIPTION OF THE INVENTION

The present inventors made earnest studies for overcoming the foregoing problems on the conventional light receiving members and attaining the objects as described above and, as a result, obtained the following findings, and have completed this invention based on those findings.

That is, when a light receiving layer composed of a-Si is incorporated with germanium atoms and/or tin atoms, it becomes more sensitive to light of wavelengths broadly ranging from short wavelength to long wavelength covering visible light and it also becomes quickly responsive to light. This effect is pronounced when the light receiving layer is of double-layered structure in which the layer adjacent to the support contains germanium atoms and/or tin atoms and the layer facing outward contains neither germanium atoms nor tin atoms. The light receiving layer of such structure is useful in instances where a semiconductor laser is used as the light source of long wavelength, because the lower layer containing germanium atoms and/or tin atoms substantially completely absorbs the light which the upper layer containing neither germanium atoms nor tin atoms can absorb very little. This light absorption prevents the interference resulting from the light reflected by the surface of the support.

In addition, the light receiving member having a plurality of layers as mentioned above significantly prevent the occurrence of the interference fringe pattern, which often occurs upon image formation in a conventional light receiving member, when the surface of the support is provided with irregularities composed of a plurality of spherical dimples each of which having an inside face provided with minute irregularities.

The above-mentioned findings are based on the experiments carried out by the present inventors.

To help understand the foregoing, the following explanation will be made with reference to the drawings.

Figure 1:
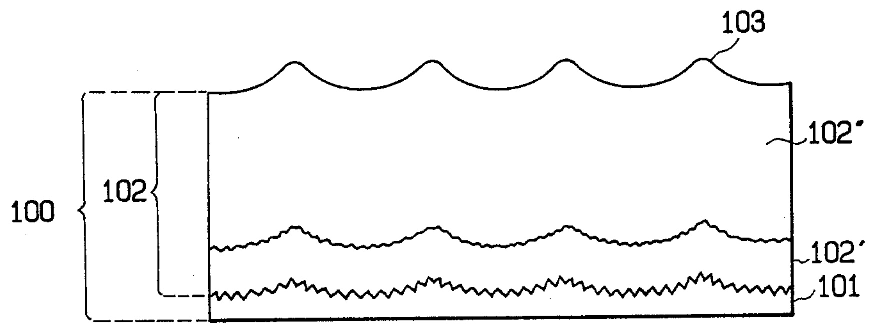
FIGS. 1(A) and 1(B) are views schematically illustrating typical examples of the light receiving members according to this invention.
Figure 1:
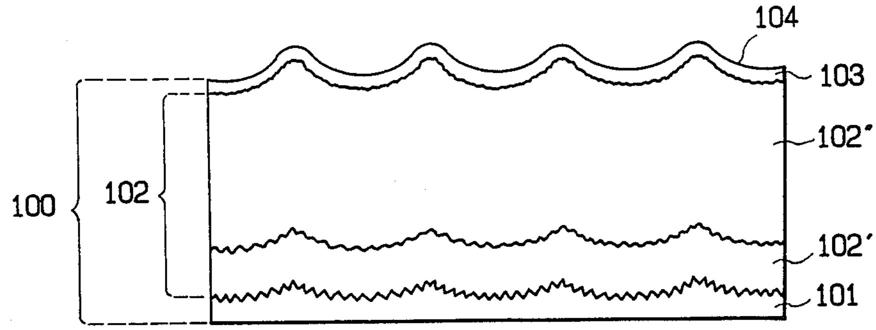

FIGS. 1(A) and 1(B) are schematic views respectively illustrating the layer structure of the light receiving member 100 pertaining to this invention. The light receiving member is made up of a support 101 and a light receiving layers 102 formed thereon. The support 101 has irregularities composed of a plurality of fine spherical dimples each of which having an inside face provided with minute irregularities at the surface thereof. The light receiving layer 102 is formed along the slopes of the irregularities, and is constituted by a layer 102′ containing silicon atoms and at least either of germanium atoms or tin atoms and a layer 102″ containing silicon atoms but containing neither germanium atoms nor tin atoms.

That is, FIG. 1(A) is a schematic view for illustrating a typical layer structure of the light receiving member of this invention, in which are shown the light receiving member 100, the support 101, the light receiving layer 102, the layer 102′ containing at least either germanium atoms or tin atoms, the layer 102″ containing neither germanium atoms nor tin atoms, and a free surface 104.

And, FIG. 1(B) is a schematic view for illustrating another typical layer structure of the light receiving member of this invention, in which are shown the light receiving member 100, the support 101, the light receiving layer, the layer 102′ containing at least either germanium atoms or tin atoms, the layer 102″ containing neither germanium atoms nor tin atoms, a surface layer 103 and a free surface 104.

Figure 2:
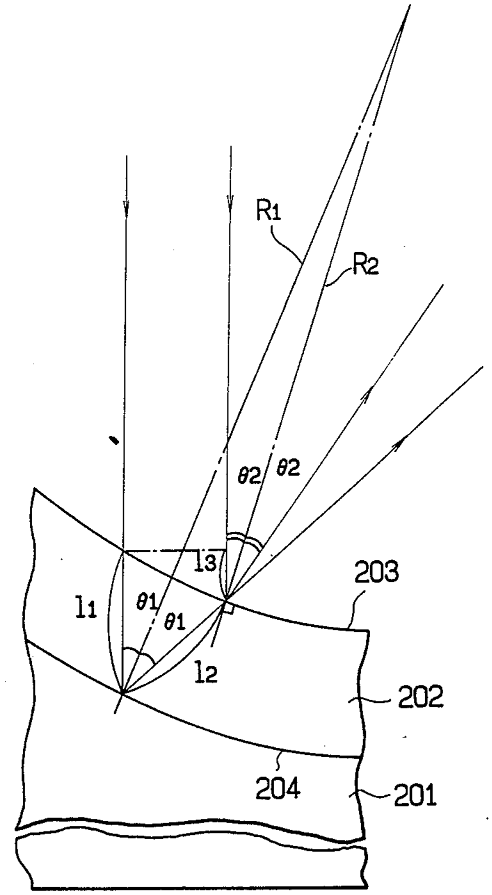
Figure 3:
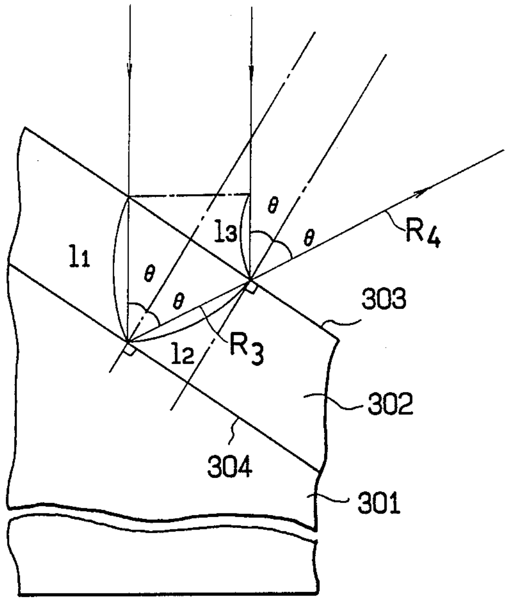
FIG. 3 PRIOR ART

FIGS. 2 and 3 are views explaining how the problem of interference fringe pattern is solved in the light receiving member of this invention.

FIG. 3 is an enlarged view for a portion of a conventional light receiving member in which a light receiving layer of a multi-layered structure is deposited on the support the surface of which is regularly roughened. In the drawing, a first layer 301, a second layer 302, a free surface 303, and an interface 304 between the first and second layers are shown. As shown in FIG. 3, in the case of merely roughening the surface of the support regularly by grinding or like other means, since the light receiving layer is usually formed along the uneven shape at the surface of the support, the slope of the unevenness at the surface of the support and the slope of the unevenness of the light receiving layer are in parallel with each other.

Owing to the parallelism, the following problems always occur, for example, in a light receiving member of multi-layered structure in which the light receiving layer comprises two layers, that is, a first layer 301 and the second layer 302. Since the interface 304 between the first layer and the second layer is in parallel with the free surface 303, the direction of the reflected light $R_3$ at the interface 304 and that of the reflected light $R_4$ at the free surface coincide with each other and, accordingly, an interference fringe occurs depending on the thickness of the second layer.

FIG. 2 is an enlarged view for a portion of the light receiving member according to this invention as shown in FIG. 1(A) or FIG. 1(B), in which a light receiving layer of multi-layered structure is deposited on an unevenly shaped surface composed of a plurality of fine spherical dimples each of which having an inside face provided with minute irregularities. As shown in FIG. 2, an uneven shape composed of a plurality of the fine spherical dimples are formed at the surface of the support in the light receiving member according to this invention, and the light receiving layer thereover is deposited along the uneven shape. Therefore, in the light receiving member of the multi-layered structure, for example, in the light receiving layer which comprises a first layer 201 and a second layer 202, the interface 204 between the first layer 201 and the second layer 202, and the free surface 203 are rspectively formed with the uneven shape composed of the spherical dimples along the uneven shape at the surface of the support. Assuming the radius of curvature of the spherical dimples formed at the interface 204 as $R_1$ and the radius of curvature of the spherical dimples formed at the free surface as $R_2$, since $R_1$ is not identical with $R_2$, the reflection light at the interface 204 and the reflection light at the free surface 203 have reflection angles different from each other, that is, $\theta_1$ is not identical with $\theta_2$ in FIG. 2 and the direction of their reflection lights are different. In addition, the deviation of the wavelength represented by $l_1+l_2-l_3$ by using $l_1$, $l_2$ and $l_3$ shown in FIG. 2 is not constant but variable, by which a sharing interference corresponding to the so-called Newton ring phenomenon occurs and the interference fringe is dispersed within the dimples. Then, if the interference ring should appear in the microscopic point of view in the images caused by way of the light receiving member, it is not visually recognized.

That is, in a light receiving member having a light receiving layer of multi-layered structure formed on the support having such a surface shape, the fringe pattern resulted in the images due to the interference between lights passing through the light receiving layer and reflecting on the layer interface and at the surface of the support thereby enabling to obtain a light receiving member capable of forming excellent images.

By the way, the radius of curvature R and the width D of the uneven shape formed by the spherical dimples, at the surface of the support of the light receiving member according to this invention constitute an important factor for effectively attaining the advantageous effect of preventing the occurrence of the interference fringe in the light receiving member according to this invention. The present inventors carried out various experiments and, as a result, found the following facts.

That is, if the radius of curvature R and the width D satisfy the following equation:

$$\frac{D}{R} \geqq 0.035$$

0.5 or more Newton rings due to the sharing interference are present in each of the dimples. Further, if they satisfy the following equation:

$$\frac{D}{R} \geqq 0.055$$

one or more Newton rings due to the sharing interference are present in each of the dimples.

From the foregoing, it is preferred that the ratio D/R is greater than 0.035 and, preferably, greater than 0.055 for dispersing the interference fringes resulted throughout the light receiving member in each of the dimples thereby preventing the occurrence of the interference fringe in the light receiving member.

Further, it is desired that the width D of the unevenness formed by the scraped dimple is about 500 $\mu$m at the maximum preferably, less than 200 $\mu$m and, more preferably less than 100 $\mu$m.

In addition, it is desired that the height of the minute irregularity to be provided with the inside face of the spherical dimple of the support, namely the surface roughness $\gamma_{max}$ of the inside face of the spherical dimple lies in the range of 0.5 to 20 $\mu$m.

That is, in the case where said $\gamma_{max}$ is less than 0.5 $\mu$m, a sufficient scattering effect is not given. And in the case where it exceeds 20 $\mu$m, the magnitude of the minute irregularity becomes undesirably greater in comparison with that of the spherical dimple to prevent it from being formed in a desired spherical form and result in bringing about such a light receiving member that does not sufficiently prevent the occurrence of the interference fringe. In addition to this, when a light receiving layer is deposited on such support, the resulting light receiving member becomes to have such a light receiving layer that is accompanied by an undesirably grown unevenness being apt to invite defects in visible images to be formed.

The present invention has been completed on the basis of the above-mentioned findings.

One aspect of the invention resides in a light receiving member which omprises a support and a light receiving layer of multi-layered structure formed thereon, said light receiving layer being composed of an inner layer of amorphous material containing silicon atoms and at least either germanium atoms or tin atoms and an outer layer of amorphous material containing silicon atoms and neither germanium atoms nor tin atoms, said support having a surface provided with irregularities composed of spherical dimples each of which having an inside face provided with minute irregularities.

Another aspect of the invention resides in a light receiving member as mentioned above, wherein the light receiving layer contains at least one kind selected from oxygen atoms, carbon atoms, and nitrogen atoms.

Further another aspect of the invention resides in a light receiving member as mentioned above, which further comprises a surface layer which is formed on said light receiving layer and is made of an amorphous material containing silicon atoms and those atoms selected from oxygen atoms, carbon atoms, and nitrogen atoms which are different from those atoms contained in the said light receiving layer.

Still further another aspect of the invention resides in a light receiving member as mentioned above, which further comprises a surface layer which is formed on said light receiving layer and has the function of preventing reflection.

The light receiving member according to this invention will now be explained more specifically referring to the drawings. The description is not intended to limit the scope of the invention.

FIG. 1(A) is a schematic view for illustrating the typical layer structure of the light receiving member of this invention, in which are shown the light receiving member 100, the support 101, the light receiving layer 102, the layer 102' containing at least either germanium atoms or tin atoms, the layer 102" containing neither germanium atoms nor tin atoms, and the free surface 103. Explanation will be made for the support 101 and the light receiving layer 102.

Support 101

The support 101 in the light receiving member according to this invention has a surface with fine unevenness smaller than the resolution power required for the light receiving member and the unevenness is composed of a plurality of spherical dimples each of which having an inside face provided with minute irregularities.

The shape of the surface of the support and an example of the preferred methods of preparing the shape are specifically explained referring to FIGS. 4, 5(A), 5(B) and 5(C) but it should be noted that the shape of the support in the light receiving member of this invention and the method of preparing the same are no way limited only thereto.

Figure 4:
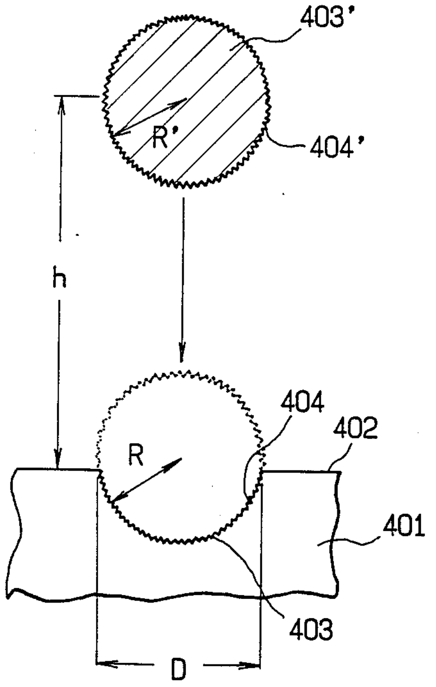
FIGS. 4 and 5 are schematic views for illustrating the uneven shape at the surface of the support of the light receiving member according to this invention and a method of preparing the uneven shape.

FIG. 4 is a schematic view for a typical example of the shape at the surface of the support in the light receiving member according to this invention, in which a portion of the uneven shape is enlarged.

In FIG. 4, are shown a support 401, a support surface 402, an irregular shape due to a spherical dimple (spherical cavity pit) 403, an inside face of the spherical dimple 404 which is provided with minute irregularities and a rigid sphere 403' having a surface 404' which is provided with minute irregularities.

FIG. 4 also shows an example of the preferred methods of preparing the surface shape of the support.

That is, the rigid sphere 403' is caused to fall from a position at a predetermined height above the support surface 402 and collides against the support surface 402 whereby forming the spherical dimple 403 having the inside face provided with minute irregularities 404. And a plurality of the spherical dimples each substantially of an almost identical radius of curvature R and of an almost identical width D can be formed to the support surface 402 by causing a plurality of the rigid spheres 403' substantially of an identical diameter of curvature R' to fall from identical height h simultaneously or sequentially.

Figure 5:
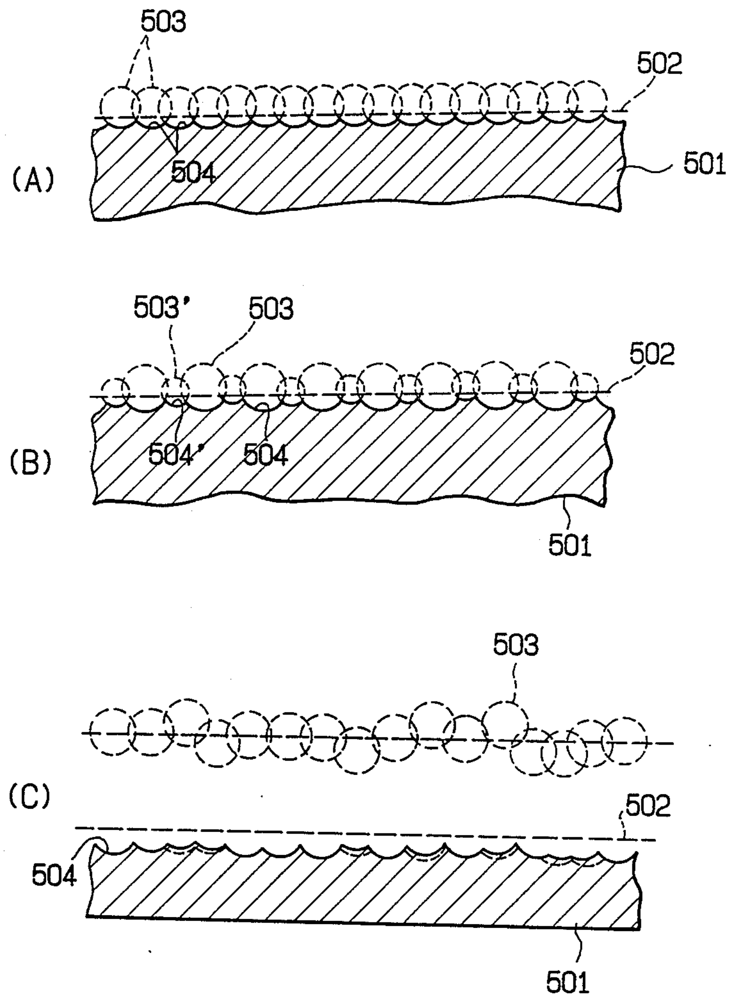

FIGS. 5(A) through 5(C) show typical embodiments of supports formed with the uneven shape composed of a plurality of spherical dimples each of which having an inside face provided with minute irregularities at the support surface as described above.

In FIGS. 5(A) through 5(C), are shown a support 501, a support surface 502, a spherical dimple (spherical cavity pit) having an inside face provided with minute irregularities (not shown) 504 or 504' and a rigid sphere of which surface has minute irregularities (not shown) 503 or 503'.

In the embodiment shown in FIG. 5(A), a plurality of the dimples (spherical cavity pits) 503,503, . . . of an almost identical radius of curvature and of an almost identical width are formed while being closely overlapped with each other thereby forming an uneven shape regularly by causing to fall a plurality of spheres 503',503', . . . regularly from an identical height to different positions at the support surface 502 of the support 501. In this case, it is naturally required for forming the dimples 503,503, . . . overlapped with each other that the spheres 503',503', . . . are gravitationally dropped such that the times of collision of the respective spheres 503',503', . . . to the support surface 502 are displaced from each other.

Further, in the embodiment shown in FIG. 5(B), a plurality of dimples 504, 504', . . . having two kinds of diameter of curvature and two kinds of width are formed being densely overlapped with each other to the surface 502 of the support 501 thereby forming an unevenness with irregular height at the surface by dropping two kinds of spheres 503, 503', . . . of different diameters from the heights identical with or different from each other.

Furthermore, in the embodiment shown in FIG. 5(C) (front elevational and cross-sectional views for the support surface), a plurality of dimples 504, 504, . . . of an almost identical diameter of curvature and plural kinds of width are formed while being overlapped with each other thereby forming an irregular unevenness by causing to fall a plurality of spheres 503, 503, . . . of an identical diameter from the identical height irregularly to the surface 502 of the support 501.

As described above, the uneven shape of the support surface composed of the spherical dimples each of which having an inside face provided with irregularities can be formed preferably by dropping the rigid spheres respectively of a surface provided with minute irregularities to the support surface. In this case, a plurality of spherical dimples having desired radius of curvature and width can be formed at a predetermined density on the support surface by properly selecting various conditions such as the diameter of the rigid spheres, falling height, hardness for the rigid sphere and the support surface or the amount of the fallen spheres. That is, the height and the pitch of the uneven shape formed for the support surface can optionally be adjusted depending on the given purpose by selecting various conditions as described above thereby enabling to obtain a support having a desired uneven shape with the support surface.

For making the surface of the support into an uneven shape in the light receiving member, a method of forming such a shape by the grinding work by means of a diamond cutting tool using lathe, milling cutter, etc. has been proposed, which will be effective to some extent. However, the method leads to problems in that it requires to use cutting oils, remove cutting dusts inevitably resulted during cutting work and to remove the cutting oil remaining on the cut surface, which after all complicates the fabrication and reduces the working efficiency. In this invention, since the uneven surface shape of the support is formed by the spherical dimples as described above, a support having the surface with a desired uneven shape can conveniently be prepared with no problems as described above at all.

The support 101 for use in this invention may either be electroconductive or insulative. The electroconductive support can include, for example, metals such as NiCr, stainless steel, Al, Cr, Mo, Au, Nb, Ta, V, Ti, Pt, and Pb, or the alloys thereof.

The electrically insulative support can include, for example, film or sheet of synthetic resins such as polyester, polyethylene, polycarbonate, cellulose acetate, polypropylene, polyvinyl chloride, polyvinylidene chloride, polystyrene, and polyamide; glass, ceramics, and paper. It is preferred that the electrically insulative support is applied with electroconductive treatment to at least one of the surfaces thereof and disposed with a light receiving layer on the thus treated surface.

In the case of glass, for instance, electroconductivity is applied by disposing, at the surface thereof, a thin film made of NiCr, Al, Cr, Mo, Au, Ir, Nb, Ta, V, Ti, Pt, Pd, $In_2O_2$, $SnO_3$, ITO ($In_2O_3+SnO_2$), etc. In the case of the synthetic resin film such as polycarbonate film, the electroconductivity is provided to the surface by disposing a thin film of metal such as NiCr, Al, Ag, Pb, Zn, Ni, Au, Cr, Mo, Ir, Nb, Ta, V, Tl, and Pt by means of vacuum deposition, electron beam vapor deposition, sputtering, etc. or applying lamination with the metal to the surface. The support may be of any configuration such as cylindrical, belt-like or plate-like shape, which can be properly determined depending on the applications. For instance, in the case of using one of the light receiving members as shown in FIGS. 1(A) and 1(B) as image forming member for use in electronic photography, it is desirably configurated into an endless belt or cylindrical form in the case of continuous high speed production. The thickness of the support member is properly determined so that the light receiving member as desired can be formed. In the case where flexibility is required for the light receiving member, it can be made as thin as possible within a range capable of sufficiently providing the function as the support. However, the thickness is usually greater than 10 μm in view of the fabrication and handling or mechanical strength of the support.

Figure 6:
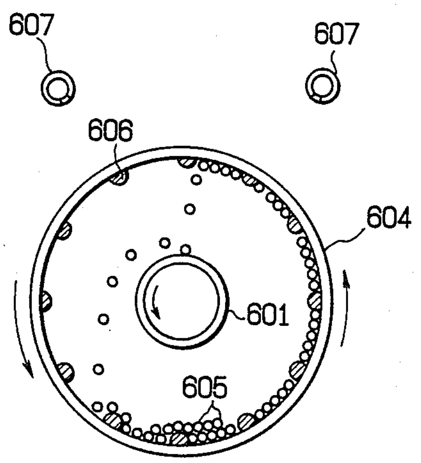
Figure 6:
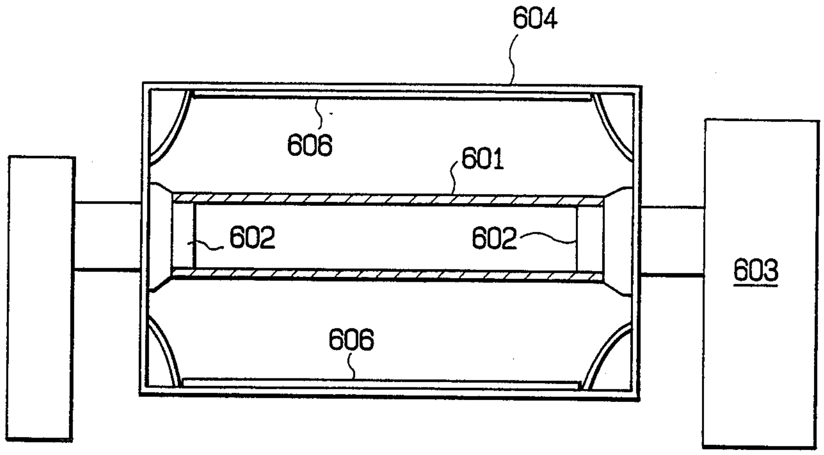

Explanation will then be made to one embodiment of a device for preparing the support surface in the case of using the light receiving member according to this invention as the light receiving member for use in electronic photography while referring to FIGS. 6(A) and 6(B), but this invention is no way limited only thereto.

In the case of the support for the light receiving member for use in electronic photography, a cylindrical substrate is prepared as a drawn tube obtained by applying usual extruding work to aluminum alloy or the like other material into a boat hall tube or a mandrel tube and further applying drawing work, followed by optical heat treatment or tempering. Then, an uneven shape is formed at the surface of the support at the cylindrical substrate by using the fabrication device as shown in FIGS. 6(A) and 6(B).

The rigid sphere to be used for forming the uneven shape as described above on the support surface can include, for example, various kinds of rigid spheres made of stainless steel, aluminum, steel, nickel, and brass, and like other metals, ceramics, and plastics. Among all, rigid spheres of stainless steel or steel are preferred in view of the durability and the reduced cost. The hardness of such sphere may be higher or lower than that of the support. However, in the case of using the rigid spheres repeatedly, it is desired that the hardness of sphere is higher than that of the support.

In order to form the paticular shape as above mentioned for the support surface, it is necessary to use a rigid sphere of a surface provided with minute irregularities.

Such rigid sphere may be prepared properly in accordance with a mechanical treatment method such as a method utilizing plastic processing treatment such as embossing and wave adding and a surface roughing method such as sating finishing, or a chemical treatment method such as acid etching or alkali etching.

And the shape (height) or the hardness of the irregularities as formed on the surface of the rigid sphere may be adjusted properly by subjecting the rigid sphere to the surface treatment in accordance with electropolishing, chemical polishing or finish polishing, or anodic oxidation coating, chemical coating, planting, vitreous enameling, painting, evaporation film forming or CVD film forming.

FIGS. 6(A) and 6(B) are schematic cross-sectional views for the entire fabrication device, in which are shown an aluminum cylinder 601 for preparing a support, and the cylinder 601 may previously be finished at the surface to an appropriate smoothness. The cylinder 601 is supported by a rotating shaft 602, driven by an appropriate drive means 603 such as a motor and made rotatable round the axial center. The rotating speed is properly determined and controlled while considering the density of the spherical dimples to be formed and the amount of rigid spheres supplied.

A rotating vessel 604 is supported by the rotating shaft 602 and rotates in the same direction as the cylinder 601 does. The rotating vessel 604 contains a plurality of rigid spheres each of which having a surface provided with minute irregularities 605, 605, . . . . The rigid spheres are held by plural projected ribs 606, 606, . . . being disposed on the inner wall of the rotating vessel 604 and transported to the upper position by the rotating action of the rotating vessel 604. The rigid spheres 605, 605, . . . then continuously fall down and collide against the surface of the cylinder 601 thereby forming a plurality of spherical dimples each of which having an inside face provided with irregularities when the revolution speed of the rotating vessel 604 is maintained at an appropriate rate.

The fabrication device can be structured in the following way. That is, the circumferential wall of the rotating vessel 604 are uniformly perforated so as to allow the passage of a washing liquid to be jetting-like supplied from one or more of a showering pipe 607 being placed outside the rotating vessel 604 thereby having the cylinder 601, the rigid spheres 605, 605, . . . and also the inside of the rotating vessel 604 washed with the washing liquid.

In that case, extraneous matter caused due to a static electricity generated by contacts between the rigid spheres or between the rigid spheres and the inside part of the rotating vessel can be washed away to form a desirable shape to the surface of the cylinder being free from such extraneous matter. As the washing liquid, it is necessary to use such that does not give any dry unevenness or any residue. In this respect, a fixed oil itself or a mixture of it with a washing liquid such as trichloroethane or trichloroethylene are preferable.

Light Receiving Layer

In the light receiving member of this invention, the light receiving layer 102 is formed on the above-mentioned support 101. The light receiving layer is of multilayered structure composed of the layer 102' adjacent to the support 101 and the layer 102'' formed on the layer 102'. The layer 102' is made of a-Si containing at least either germanium atoms (Ge) or tin atoms (Sn) and preferably at least either hydrogen atoms or halogen atoms. (This a-Si is referred to as a-Si(Ge,Sn) (H,X) hereinafter). The layer 102'' is made of a-Si which, if necessary, contains at least either hydrogen atoms or halogen atoms. (This a-Si is referred to as a-Si (H,X) hereinafter).

The halogen atom (X) contained in the light receiving layer include, specifically, fluorine, chlorine, bromine, and iodine, fluorine and chlorine being particularly preferred. The amount of the hydrogen atoms (H), the amount of the halogen atoms (X) or the sum of the amounts for the hydrogen atoms and the ahlogen atoms (H+X) contained in the light receiving layer 102 is usually from 1 to 40 atomic% and, preferably, from 5 to 31 atomic%.

In the light receiving member according to this invention, the thickness of the light receiving layer is one of the important factors for effectively attaining the purpose of this invention and a sufficient care should be taken therefor upon designing the light receiving member so as to provide the member with desired performance. The layer thickness is usually from 1 to 100 μm, preferably from 1 to 80 μm and, more preferably, from 2 to 50 μm.

The light receiving layer on the light receiving member of the invention is formed such that the layer 102' adjacent to the support 101 contains germanium atoms and/or tin atoms uniformly distributed therein or unevenly distributed therein. (The uniform distribution means that the distribution of germanium atoms and/or tin atoms in the layer 102' is uniform both in the direction parallel with the surface of the support and in the thickness direction. The uneven distribution means that the distribution of germanium atoms and/or tin atoms in the layer 102' is uniform in the direction parallel with the surface of the support but is uneven in the thickness direction.) In the latter case, it is desirable that germanium atoms and/or tin atoms in the layer 102' be present more in the side adjacent to the support than in the side adjacent to the layer 102''. It is especially desirable that the distribution of germanium atoms and/or tin atoms be maximum at the interface in contact with the support. Such constitution is desirable in cases where the light source is a semiconductor laser emitting rays of long wavelengths, because the layer 102' substantially completely absorbs the light of long wavelength the layer 102'' hardly absorbs. This prevents the interference caused by the light reflected by the surface of the support.

In the following an explanation is made of the typical example of the distribution of germanium atoms and/or tin atoms in the thickness direction in the layer 102', with reference to FIGS. 7 through 15 which show the distribution of germanium atoms.

In FIGS. 7 through 15, the abscissa represents the distribution concentration C of germanium atoms and the ordinate represents the thickness of the layer 102'; and $t_B$ represents the extreme position of the layer 102' adjacent to the support and $t_T$ represent the other extreme position adjacent to the layer 102'' which is away from the support. The layer 102' containing germanium atoms is formed from the $t_B$ side toward the $t_T$ side.

In these figures, the thickness and concentration are schematically exaggerated to help understanding.

Figure 7:
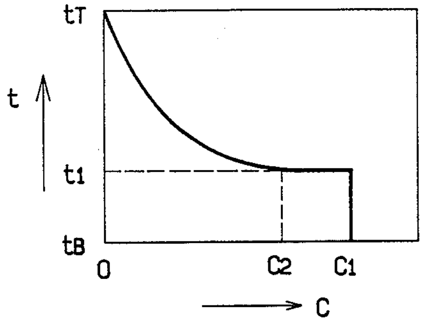
FIGS. 7 through 15 are views illustrating the thicknesswise distribution of germanium atoms or tin atoms in the light receiving layer of the light receiving member according to this invention.

FIG. 7 shows the first typical example of the thicknesswise distribution of germanium atoms in the layer 102'.

In the example shown in FIG. 7, germanium atoms are distributed such that the concentration C is constant at a value $C_1$ in the range from position $t_B$ (at which the layer 102' containing germanium atoms is in contact with the surface of the support) to position $t_1$, and the concentration C gradually and continuously decreases from $C_2$ in the range from position $t_1$ to position $t_T$ at the interface. The concentration of germanium atoms is substantially zero at the interface position $t_T$. ("Substantially zero" means that the concentration is lower than the detectable limit.)

Figure 8:
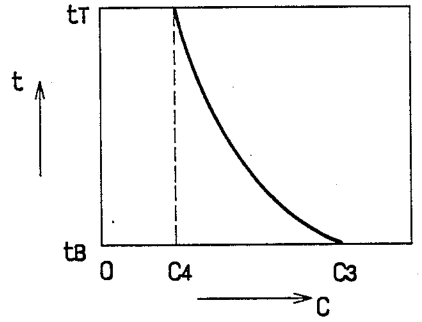

In the example shown in FIG. 8, the distribution of germanium atoms contained is such that concentration $C_3$ at position $t_B$ gradually and continuously decreases to concentration $C_4$ at position $t_T$.

Figure 9:
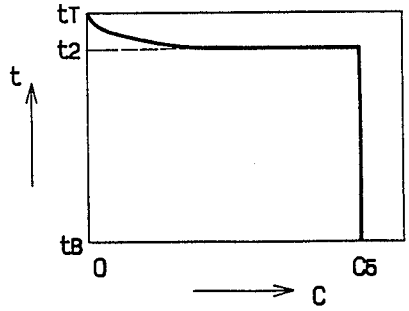

In the example shown in FIG. 9, the distribution of germanium atoms is such that concentration $C_5$ is constant in the range from position $t_B$ and position $t_2$ and it gradually and continuously decreases in the range from position $t_2$ to position $t_T$. The concentration at position $t_T$ is substantially zero.

Figure 10:
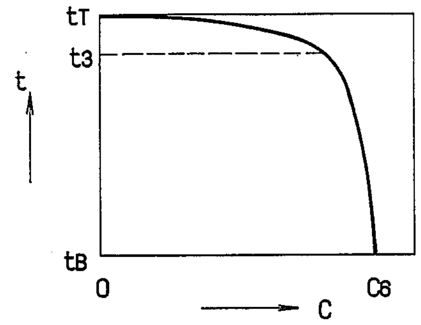

In the example shown in FIG. 10, the distribution of germanium atoms is such that concentration $C_6$ gradually and continuously decreases in the range from position $t_B$ and position $t_3$, and it sharply and continuously decreases in the range from position $t_3$ to position $t_T$. The concentration at position $t_T$ is substantially zero.

Figure 11:
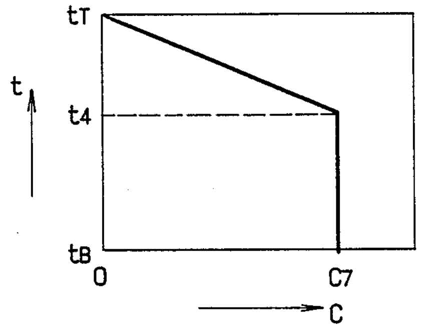

In the example shown in FIG. 11, the distribution of germanium atoms is such that concentration $C_7$ is constant in the range from position $t_B$ and position $t_4$ and it linearly decreases in the range from position $t_4$ to position $t_T$. The concentration at position $t_T$ is zero.

Figure 12:
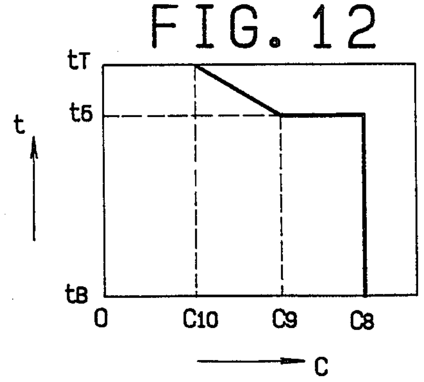

In the example shown in FIG. 12, the distribution of germanium atoms is such that concentration $C_8$ is constant in the range from position $t_B$ and position $t_5$ and concentration $C_9$ linearly decreases to concentration $C_{10}$ in range from position $t_5$ to position $t_T$.

Figure 13:
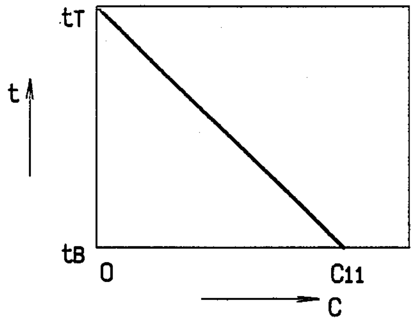

In the example shown in FIG. 13, the distribution of germanium atoms is such that concentration linearly decreases to zero in the range from position $t_B$ to position $t_T$.

Figure 14:
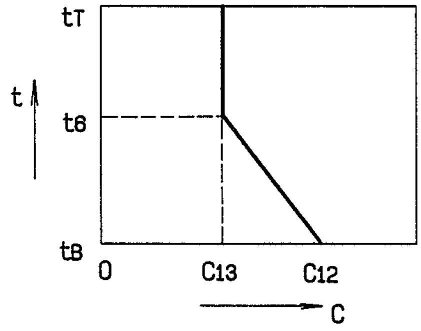

In the example shown in FIG. 14, the distribution of germanium atoms is such that concentration $C_{12}$ linearly decreases to $C_{13}$ in the range from position $t_B$ to position $t_6$ and concentration $C_{13}$ remains constant in the range from position $t_6$ to position $t_T$.

Figure 15:
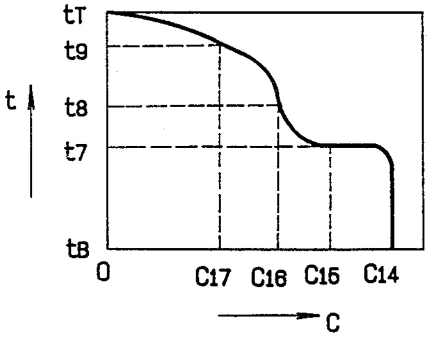

In the example shown in FIG. 15, the distribution of germanium atoms is such that concentration $C_{14}$ at position $t_B$ slowly decreases and then sharply decreases to concentration $C_{15}$ in the range from position $t_B$ to position $t_7$.

In the range from position $t_7$ to position $t_8$, the concentration sharply decreases at first and slowly decreases to $C_{16}$ at position $t_8$. The concentration slowly decreases to $C_{17}$ between position $t_8$ and position $t_9$. Concentration $C_{17}$ further decreases to substantially zero between position $t_9$ and position $t_T$. The concentration decreases as shown by the curve.

Several examples of the thicknesswise distribution of germanium atoms and/or tin atoms in the layer 102' have been illustrated in FIGS. 7 through 15. In the light receiving member of this invention, the concentration of germanium atoms and/or tin atoms in the layer 102' should preferably be high at the position adjacent to the support and considerably low at the position adjacent to the interface $t_T$.

In other words, it is desirable that the layer 102' constituting the light receiving member of this invention have a region adjacent to the support in which germanium atoms and/or tin atoms are locally contained at a comparatively high concentration.

Such a local region in the light receiving member of this invention should preferably be formed within 5 μm from the interface $t_B$.

The local region may occupy entirely or partly the thickness of 5 μm from the interface position $t_B$.

Whether the local region should occupy entirely or partly the layer 102' depends on the performance required for the light receiving layer to be formed.

The thicknesswise distribution of germanium atoms and/or tin atoms contained in the local region should be such that the maximum concentration $C_{max}$ of germanium atoms and/or tin atoms is greater than 1000 atomic ppm, preferably greater than 5000 atomic ppm, and more preferably greater than $1\times10^4$ atomic ppm based on the amount of silicon atoms.

In other words, in the light receiving member of this invention, the layer 102' which contains germanium atoms and/or tin atoms should preferably be formed such that the maximum concentration $C_{max}$ of their distribution exists within 5 $\mu$m of thickness from $t_B$ (or from the support side).

In the light receiving member of this invention, the amount of germanium atoms and/or tin atoms in the layer 102' should be properly determined so that the object of the invention is effectively achieved. It is usually 1 to $6\times10^5$ atomic ppm, preferably 10 to $3\times10^5$ atomic ppm, and more preferably $1\times10^2$ to $2\times10^5$ atomic ppm.

In the light receiving member according to this invention, a substance for controlling the electroconductivity may be contained to the light receiving layer in a uniformly or unevenly distributed state to the entire or partial layer region.

As the substance for controlling the conductivity, so-called impurities in the field of the semiconductor can be mentioned and those usable herein can include atoms belonging to the group III of the periodic table that provides p-type conductivity (hereinafter simply referred to as "group III atoms") or atoms belonging to the group V of the periodic table that provide n-type conductivity (hereinafter simply referred to as "group V atoms"). Specifically, the group III atoms can include B (boron), Al (aluminum), Ga (gallium), In (indium), and Tl (thallium), B and Ga being particularly preferred. The group V atoms can include, for example, P (phosphorus), As (arsenic), Sb (antimony), and Bi (bismuth), P and Sb being particularly preferred.

In the case of incorporating the group III or group V atoms as the substance for controlling the conductivity into the light receiving layer of the light receiving member according to this invention, they are contained in the entire layer region or partial layer region depending on the purpose or the expected effects as described below and the content is also varied.

That is, if the main purpose resides in the control for the conduction type and/or conductivity of the light receiving layer, the substance is contained in the entire layer region of the photosensitive layer, in which the content of group III or group V atoms may be relatively small and it is usually from $1\times10^{-3}$ to $1\times10^3$ atomic ppm, preferably from $5\times10^{-2}$ to $5\times10^2$ atomic ppm, and most suitably, from $1\times10^{-1}$ to $5\times10^2$ atomic ppm.

In the case of incorporating the group III or group V atoms in a uniformly distributed state to a portion of the layer region in contact with the support, or the atoms are contained such that the distribution density of the group III or group V atoms in the direction of the layer thickness is higher on the side adjacent to the support, the constituting layer containing such group III or group V atoms or the layer region containing the group III or group V atoms at high concentration functions as a charge injection inhibition layer. That is, in the case of incorporating the group III atoms, movement of electrons injected from the side of the support into the light receiving layer can effectively be inhibited upon applying the charging treatment of at positive polarity at the free surface of the light receiving layer. While on the other hand, in the case of incorporating the group III atoms, movement of positive holes injected from the side of the support into the light receiving layer can effectively be inhibited upon applying the charging treatment at negative polarity at the free surface of the light receiving layer. The content in this case is relatively great. Specifically, it is generally from 30 to $5\times10^4$ atomic ppm, preferably from 50 to $1\times10^4$ atomic ppm, and most suitably from $1\times10^2$ to $5\times10^3$ atomic ppm. Then, for the charge injection inhibition layer to produce the intended effect, the thickness (T) of the light receiving layer and the thickness (t) of the layer or layer region containing the group III or group V atoms adjacent to the support should be determined such that the relation $t/T\leqq0.4$ is established. More preferably, the value for the relationship is less than 0.35 and, most suitably, less than 0.3. Further, the thickness (t) of the layer or layer region is generally $3\times10^{-3}$ to 10 $\mu$m, preferably $4\times10^{-3}$ to 8 $\mu$m, and, most suitably, $5\times10^{-3}$ to 5 $\mu$m.

Further, typical embodiments in which the group III or group V atoms incorporated into the light receiving layer is so distributed that the amount therefor is relatively great on the side of the support, decreased from the support toward the free surface of the light receiving layer, and is relatively smaller or substantially equal to zero near the end on the side of the free surface can be explained by FIGS. 16 to 24. However, this invention is no way limited only to these embodiments.

In FIGS. 16 through 24, the abscissa represents the distribution concentration C of the group III atoms or group V atoms and the ordinate represents the thickness of the light receiving layer; and $t_B$ represents the interface position between the support and the light receiving layer and $t_T$ represents the position of the free surface of the light receiving layer. The layer 102' containing germanium atoms is formed from the tB side toward the $t_T$ side.

Figure 16:
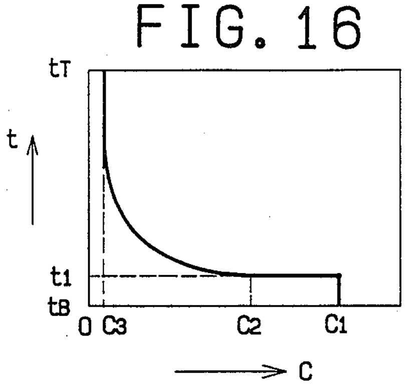
FIGS. 16 through 24 are views illustrating the thicknesswise distribution of oxygen atoms, carbon atoms, or nitrogen atoms, or the thicknesswise distribution of the group III atoms or the group V atoms in the light receiving layer of the light receiving member according to this invention, in which the ordinate represents the thickness of the light receiving layer and the abscissa represents the distribution concentration of respective atoms respectively.

FIG. 16 shows the first typical example of the thicknesswise distribution of the group III atoms or group V atoms in the light receiving layer. In this example, the group III atoms or group V atoms are distributed such that the concentration C remains constant at a value $C_1$ in the range from position $t_B$ (at which the light receiving layer comes into contact with the support) to position $t_1$, and the concentration C gradually and continuously decreases from $C_2$ in the range from position $t_1$ to position $t_T$, where the concentration of the group III atoms or group V atoms is $C_3$.

Figure 17:
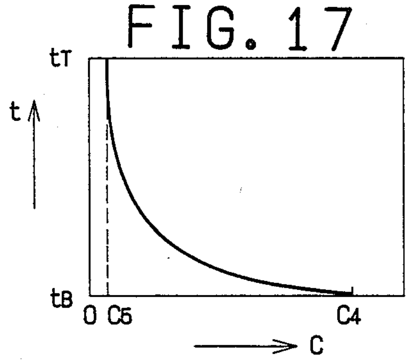

In the example shown in FIG. 17, the distribution concentration C of the group III atoms or group V atoms contained in the light receiving layer is such that concentration $C_4$ at position $t_B$ continuously decreases to concentration $C_5$ at position $t_T$.

Figure 18:
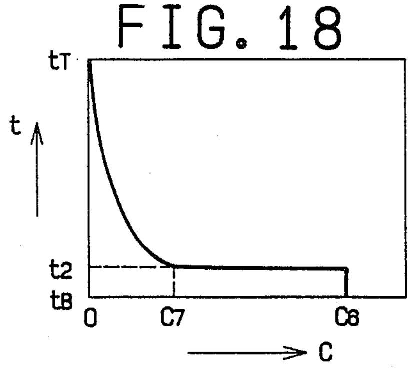

In the example shown in FIG. 18, the distribution concentration C of the group III atoms or group V atoms is such that concentration $C_6$ remains constant in the range from position $t_B$ to position $t_2$ and it gradually and continuously decreases in the range from position $t_2$ to position $t_T$. The concentration at position $t_T$ is substantially zero.

Figure 19:
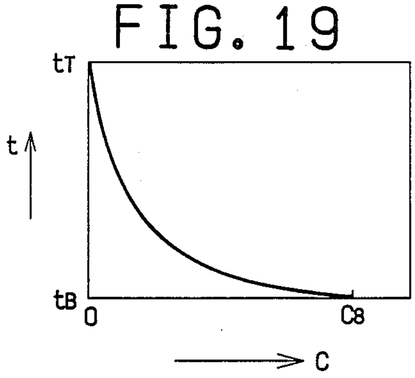

In the example shown in FIG. 19, the distribution concentration C of the group III atoms or group V atoms is such that concentration $C_8$ gradually and continuously decreases in the range from position $t_B$ to position $t_T$, at which it is substantially zero.

Figure 20:
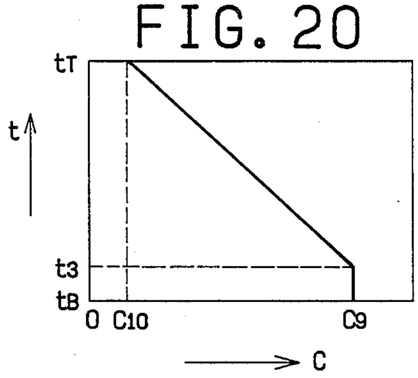

In the example shown in FIG. 20, the distribution concentration C of the group III atoms or group V atoms is such that concentration $C_9$ remains constant in the range from position $t_B$ to position $t_3$, and concentration $C_8$ linearly decreases to concentration $C_{10}$ in the range from position $t_3$ to position $t_T$.

Figure 21:
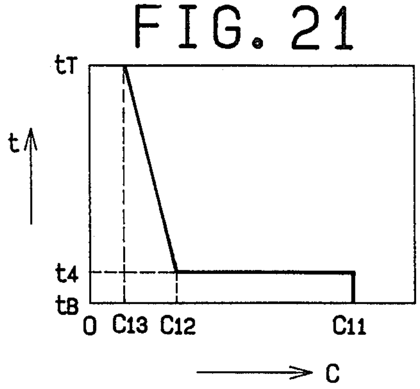

In the example shown in FIG. 21, the distribution concentration C of the group III atoms or group V atoms is such that concentration $C_{11}$ remains constant in the range from position $t_B$ to position $t_4$ and it linearly decreases from $C_{12}$ to $C_{13}$ in the range from position $t_4$ to position $t_T$.

Figure 22:
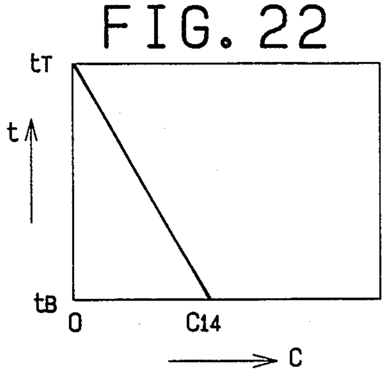

In the example shown in FIG. 22, the distribution concentration C of the group III atoms or group V atoms is such that concentration $C_{14}$ linearly decreases in the range from position $t_B$ to position $t_T$, at which the concentration is substantially zero.

Figure 23:
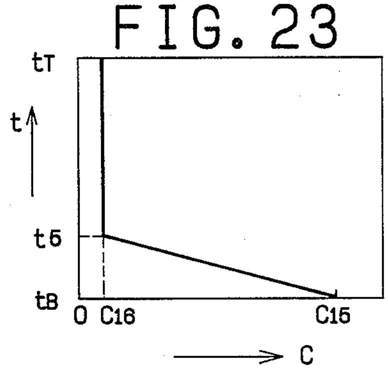

In the example shown in FIG. 23, the distribution concentration C of the group III atoms or group V atoms is such that concentration $C_{15}$ linearly decreases to concentration $C_{16}$ in the range from position $t_B$ to position $t_5$ and concentration $C_{16}$ remains constant in the range from position $t_5$ to position $t_T$.

Figure 24:
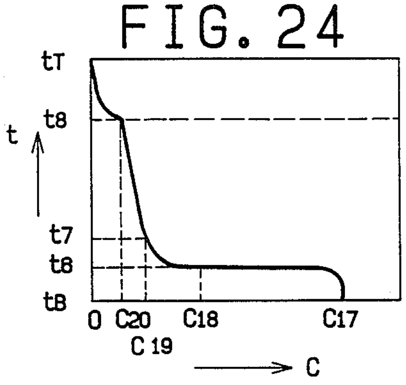

Finally, in the example shown in FIG. 24, the distribution concentration C of the group III atoms or group V atoms is such that concentration $C_{17}$ at position $t_B$ slowly decreases and then sharply decreases to concentration $C_{18}$ in the range from position $t_B$ to position $t_6$. In the range from position $t_6$ to position $t_7$, the concentration sharply decreases at first and slowly decreases to $C_{19}$ at position $t_7$. The concentration slowly decreases between position $t_7$ and position $t_8$, at which the concentration is $C_{20}$. Concentration $C_{20}$ slowly decreases to substantially zero between position $t_8$ and position $t_T$.

As shown in the embodiments of FIGS. 16 through 24, in the case where the distribution concentration C of the groups III or group V atoms is higher at the portion of the light receiving layer near the side of the support, while the distribution concentration C is considerably lower or substantially reduced to zero in the portion of the light receiving layer in the vicinity of the free surface, the foregoing effect that the layer region where the group III or group V atoms are distributed at a higher concentration can form the charge injection inhibition layer as described above more effectively, by disposing a localized region where the distribution concentration of the group III or group V atoms is relatively higher at the portion near the side of the support, preferably, by disposing the localized region at a position within 5 μm from the interface position adjacent to the support surface.

While the individual effects have been described above for the distribution state of the group III or group V atoms, the distribution state of the group III or group V atoms and the amount of the group III or group V atoms are, of course, combined properly as required for obtaining the light receiving member having performance capable of attaining a desired purpose. For instance, in the case of disposing the charge injection inhibition layer at the end of the light receiving layer on the side of the support, a substance for controlling the conductivity of a polarity different from that of the substance for controlling the conductivity contained in the charge injection inhibition layer may be contained in the light receiving layer other than the charge injection inhibition layer, or a substance for controlling the conductivity of the same polarity may be contained by an amount substantially smaller than that contained in the charge inhibition layer.

Further, in the light receiving member according to this invention, the so-called barrier layer composed of electrically insulating material may be disposed instead of the charge injection inhibition layer as the constituent layer disposed at the end on the side of the support, or both of the barrier layer and the charge injection inhibition layer may be disposed as the constituent layer. The material for constituting the barrier layer can include, for example, those inorganic electrically insulating materials such as $Al_2O_3$, $SiO_2$, and $Si_3N_4$, or organic electrically insulating material such as polycarbonate.

Furthermore, the photosensitive layer of the light receiving member of this invention may be incorporated with at least one kind selected from oxygen atoms, carbon atoms, nitrogen atoms. This is effective in increasing the photosensitivity and dark resistance of the light receiving member and also in improving adhesion between the support and the light receiving layer.

In the case of incorporating at least one kind selected from oxygen atoms, carbon atoms, and nitrogen atoms into the light receiving layer of the invention, it is performed at a uniform distribution or uneven distribution in the direction of the layer thickness depending on the purpose or the expected effects as described above, and accordingly, the content is varied depending on them.

That is, in the case of increasing the photosensitivity, the dark resistance of the light receiving member, they are contained at a uniform distribution over the entire layer region of the light receiving layer. In this case, the amount of at least one kind selected from carbon atoms, oxygen atoms, and nitrogen atoms contained in the light receiving layer may be relatively small.

In the case of improving the adhesion between the support and the light receiving layer, at least one kind selected from carbon atoms, oxygen atoms, and nitrogen atoms is contained uniformly in the layer 102' constituting the light receiving layer adjacent to the support, or at least one kind selected from carbon atoms, oxygen atoms, and nitrogen atoms is contained such that the distribution concentration is higher at the end of the light receiving layer on the side of the support. In this case, the amount of at least one kind selected from oxygen atoms, carbon atoms, and nitrogen atoms is comparatively large in order to improve the adhesion to the support.

The amount of at least one kind selected from oxygen atoms, carbon atoms, and nitrogen atoms contained in the light receiving layer of the light receiving member according to this invention is also determined while considering the organic relationship such as the performance at the interface in contact with the support, in addition to the performance required for the light receiving layer as described above and it is usually from 0.001 to 50 atomic%, preferably, from 0.002 to 40 atomic%, and, most suitably, from 0.003 to 30 atomic%.

By the way, in the case of incorporating the element in the entire layer region of the light receiving layer or the proportion of the layer thickness of the layer region incorporated with the element is greater in the layer thickness of the light receiving layer, the upper limit for the content is made smaller. That is, if the thickness of the layer region incorporated with the element is 2/5 of the thickness for the light receiving layer, the content is usually less than 30 atomic%, preferably, less than 20 atomic% and, more suitably, less than 10 atomic%.

The typical example in which a relatively large amount of at least one kind selected from oxygen atoms, carbon atoms, and nitrogen atoms is contained in the light receiving layer according to this invention on the side of the support, then the amount is gradually decreased from the end on the side of the support to the end on the side of the free surface and decreased further to a relatively small amount or substantially zero near the end of the light receiving layer on the side of the free surface, may be explained on the analogy of the examples in which the light receiving layer contains the group III or group V atoms as shown in FIGS. 16 through 24. However, the scope of this invention is not limited to them.

As shown by the embodiments in FIGS. 16 through 24, in the case where the distribution concentration C of at least one kind selected from oxygen atoms, carbon atoms, and nitrogen atoms (referred to as "the atoms-(O,C,N)" hereinafter) is higher at the end of the free surface of the light receiving layer on the side of the support, while the distribution concentration C is considerably lower or substantially equal to zero at the end of the first layer on the side of the free surface, improvement in adhesion between the support and the light receiving layer can be attained more effectively by disposing a localized region at the end of the light receiving layer on the side of the support where the distribution concentration of the atoms(O,C,N) is relatively higher and, preferably, by disposing the localized region at a position within 5 μm from the interface position $t_B$ between the support surface and the light receiving layer.

The localized region may be disposed partially or entirely at the end of the light receiving layer to be contained with the atoms(O,C,N) on the side of the support, which may be properly determined in accordance with the preformance required for the light receiving layer to be formed.

It is desired that the amount of the atoms(O,C,N) contained in the localized region is such that the maximum value of the distribution concentration C of the atoms(O,C,N) is greater than 500 atomic ppm, preferably, greater than 800 atomic ppm, most suitably greater than 1000 atomic ppm in the distribution.

FIG. 1(B) is a schematic view for illustrating the structure of another layer of the light receiving member of this invention, in which are shown the light receiving member 100, the support 101, the light receiving layer, the layer 102' containing at least either germanium atoms or tin atoms, the layer 102" containing neither germanium atoms nor tin atoms, the free surface 103, and the surface layer 104.

The light receiving member shown in FIG. 1(B) differs from the above-mentioned light receiving member shown in FIG. 1(A) in that the former has the surface layer 104 as the top layer. An explanation will be made of the surface layer 104 in the following.

Surface layer

The surface layer 104 is generally grouped into the following two types.

One of them is composed of amorphous silicon [a-Si(O,C,N)(H,X)] containing at least one member selected from oxygen atoms, carbon atoms, and nitrogen atoms, or containing uniformly the atoms different from the member selected from oxygen atoms, carbon atoms, and nitrogen atoms, in the case where the previously formed light receiving layer (i.e., the layer 102' and 102" shown in FIG. 1(B)) contains at least one member selected from oxygen atoms, carbon atoms, and nitrogen atoms.

The surface layer 104 is disposed to the light receiving layer according to this invention with the aim of improving the misture-proofness, performance for continuous repeating use, electrical voltage withstanding properly, circumstantial resistance property, and durability, and these purposes can be attained by incorporating at least one member selected from oxygen atoms, carbon atoms, and nitrogen atoms into the amorphous material constituting the surface layer.

Further, in the light receiving member according to this invention, since each of the amorphous layers constituting the surface layer 104 and the light receiving layer thereunder contains common constituent atoms of silicon, the chemical stability can be ensured at the interface between the surface layer 104 and the light receiving layer thereunder.

Atoms selected from oxygen atoms, carbon atoms, and nitrogen atoms are uniformly contained in the surface layer 104, by which the foregoing various properties can be improved in accordance with the increase in the content of these atoms. However, if the content is excessive, the layer quality is reduced and electrical and mechanical properties are also degraded. In view of the above, the amount of these atoms is usually from 0.001 to 90 atomic%, preferably, from 1 to 90 atomic%, and most suitably, from 10 to 80 atomic%.

It is desired that either hydrogen atoms or halogen atoms are also contained in the surface layer and the amount of the hydrogen atoms(H), the amount of the halogen atoms(X), or the sum of the amounts for the hydrogen and halogen atoms (H+X) contained in the surface layer is usually from 1 to 40 atomic%, preferably, from 50 to 30 atomic%, and most suitably, from 5 to 25 atomic%.

The surface layer has to be formed with an utmost care so as to obtain the properties as desired. That is, the state of the substance comprising silicon atoms, at least one kind of oxygen atoms, carbon atoms, and nitrogen atoms, and, further, hydrogen atoms and/or halogen atoms as the constituent atoms is from crystalline to amorphous state, the electrical property of the layer may vary from the conductive, to semiconductivity and insulating property and, further, the photoelectronic property of the layer also vary from photoconductive to non-photoconductive property depending on the content of each of the constituent atoms and other conditions of preparation. Accordingly, it is essential to select the content for each of the constituent atoms and the preparation conditions such that the surface layer having desired properties depending on the purpose can be formed.

For instance, in the case of disposing the surface layer mainly for improving the electrical voltage withstanding property, the amorphous material constituting the surface layer is formed such that it exhibits remarkable electrically insulating behavior under the working conditions. Further, in the case of disposing the surface layer mainly for improving the properties in the continuous repeating use or the circumstantial-resistant property, the amorphous layer constituting the surface layer is formed such that the layer has photosensitivity to some extent to the irradiated light, although the degree of the electrically insulating property is somewhat moderate.

In this invention, the thickness of the surface layer is also one of the important factors for effectively attaining the purpose of this invention and it is properly determined depending on the desired purpose. It is, however, also necessary that the layer thickness is determined in view of relative and organic relationships in accordance with the amounts of the oxygen atoms, carbon atoms, nitrogen atoms, halogen atoms, and hydrogen atoms contained in the layer or the properties required for the surface layer. Further, it should be determined also in economical point of view such as productivity or mass productivity. In view of the above, the thickness of the surface layer is usually from $3\times10^{-3}$ to 30 $\mu$m, preferably, from $4\times10^{-3}$ to 20 $\mu$m, most suitably, from $5\times10^{-3}$ to 10 $\mu$m.

The second type of the surface layer 104 provides a function of reducing the reflection and increasing the transmission rate at the free surface 103 of the light receiving layer, that is, the reflection preventive function, as well as the function of improving various properties such as the moisture-proofness, the property for continuous repeating use, electrical voltage withstanding property, circumstantial resistance and durability of the light receiving member.

Further, the material for forming the surface layer is required to satisfy various conditions in that it can provide the excellent reflection preventive function for the layer constituted therewith, and a function of improving the various properties as described above, as well as those conditions in that it does not give undesired effects on the photoconductivity of the light receiving member, provides an adequate electronic photographic property, for example, an electric resistance over a certain level, provide an excellent solvent resistance in the case of using the liquid developing process and it does not reduce the various properties of the light receiving layer already formed. Those materials that can satisfy such various conditions and can be used effectively include, for example, at least one of materials selected from inorganic fluorides, inorganic oxides, and inorganic sulfides such as $MgF_2$, $Al_2O_3$, $ZrO_2$, $TiO_2$, ZnS, $CeO_2$, $CeF_3$, $Ta_2O_5$, $AlF_3$ and NaF.

Further, for effectively preventing the reflection prevention, it is desired to selectively use those materials capable of satisfying the conditions represented by the equation:

$$n = \sqrt{n_a}$$

where n represents the refractive index of the material for forming the surface layer and $n_a$ represents the refractive index of the layer constituting the layer laminated directly to the surface layer.

Several examples of the refractive indexes of inorganic fluorides, inorganic oxides, and inorganic sulfides, or the mixtures thereof as described above will now be referred to. The refractive index is varied somewhat depending on the kinds of the layer to be prepared, conditions, and the like. Numerical values in the parentheses represent the refractive index.

$ZrO_2$ (2.00), $TiO_2$ (2.26), $ZrO_2/TiO_2=6/1$ (2.09), $TiO_2/ZrO_2=3/1$ (2.20), $GeO_2$ (2.23), ZnS (2.24), $Al_2O_3$ (1.63), $CeF_3$ (1,60), $Al_2O_3/ZrO_2=1/1$ (1.68), and $MgF_2$ (1.38).

Further, it is desirable that the thickness d of the surface layer can satisfy the conditions expressed by the following equation:

$$d = \frac{\lambda}{4n} m (m \text{ is a positive odd number.})$$

where d represents the thickness of the surface layer, n represents the refractive index of the material constituting the surface layer, and $\lambda$ represents the wavelength of the irradiated light. Specifically, in the case where the wavelength of the exposing light is within the wavelength range from the near infrared to the visible rays, the thickness d of the surface layer is preferably defined as from 0.05 to 2 $\mu$m.

By adopting the layer structure of the light receiving member according to this invention as described above, all of the various problems in the light receiving members comprising the light receiving layer constituted with amorphous silicon as described above can be overcome. Particularly, in the case of using the coherent laser beams as a light source, it is possible to remarkably prevent the occurrence of the interference fringe pattern upon forming images due to the interference phenomenon thereby enabling to obtain reproduced image at high quality.

Further, since the light receiving member according to this invention has a high photosensitivity in the entire visible ray region and, further, since it is excellent in the photosensitive property on the side of the longer wavelength, it is suitable for the matching property, particularly, with a semiconductor laser, exhibits a rapid optical response and shows more excellent electrical, optical and electroconductive nature, electrical voltage withstand property and resistance to working circumstances.

Particularly, in the case of applying the light receiving member to the electrophotography, it gives no undesired effects at all of the residual potential to the image formation, stable electrical properties high sensitivity and high S/N ratio, excellent light fastness and property for repeating use, high image density and clear half tone and can provide high quality image with high resolution power repeatingly.

The method of forming the light receiving layer according to this invention will now be explained.

The amorphous material constituting the light receiving layer in this invention is prepared by vacuum depositing method utilizing the discharging phenomena such as glow discharging, sputtering, and ion plating process. These production processes are properly used selectively depending on the factors such as the manufacturing conditions, the installation cost required, producting scale and properties required for the light receiving members to be prepared. The glow discharging process or sputtering process is suitable since the control for the condition upon preparing the light receiving members having desired properties are relatively easy and carbon atoms and hydrogens atoms can be introduced easily together with silicon atoms. The glow discharging process and the sputtering process may be used together in one identical system.

Basically, when a layer constituted with a-Si(H,X) is formed, for example, by the glow discharging process, gaseous starting material for supplying Si capable of supplying silicon atoms(Si) are introduced together with gaseous starting material for introducing hydrogen atoms(H) and/or halogen atoms(X) into a deposition chamber the inside pressure of which can be reduced, glow discharge is generated in the deposition chamber, and a layer composed of a-Si(H,X) is formed on the surface of a predetermined support disposed previously at a predetermined position.

The gaseous starting material for supplying Si can include gaseous or gasifiable silicon hydrides (silanes) such as $SiH_4$, $Si_2H_6$, $Si_3H_8$, $Si_4H_{10}$, etc., $SiH_4$ and $Si_2H_6$ being particularly preferred in view of the easy layer forming work and the good efficiency for the supply of Si.

Further, various halogen compounds can be mentioned as the gaseous starting material for introducing the halogen atoms and gaseous or gasifiable halogen compounds, for example, gaseous halogen, halides, inter-halogen compounds and halogen-substituted silane derivatives are preferred. Specifically, they can include halogen gas such as of fluorine, chlorine, bromine, and iodine; inter-halogen compounds such as BrF, ClF, $ClF_3$, $BrF_2$, $BrF_3$, $IF_7$, ICl, IBr, etc.; and silicon halides such as $SiF_4$, $Si_2F_6$, $SiCl_4$, and $SiBr_4$. The use of the gaseous or gasifiable silicon halide as described above is particularly advantageous since the layer constituted with halogen atom-containing a-Si can be formed with no additional use of the gaseous starting material for supplying Si.

The gaseous starting material usable for supplying hydrogen atoms can include those gaseous or gasifiable materials, for example, hydrogen gas, halides such as HF, HCl, HBr, and HI, silicon hydrides such as $SiH_4$, $Si_2H_6$, $Si_3H_8$, and $Si_4H_{10}$, or halogen-substituted silicon hydrides such as $SiH_2F_2$, $SiH_2I_2$, $SiH_2Cl_2$, $SiHCl_3$, $SiH_2Br_2$, and $SiHBr_3$. The use of these gaseous starting material is advantageous since the content of the hydrogen atoms(H), which are extremely effective in view of the control for the electrical or photoelectronic properties, can be controlled with ease. Then, the use of the hydrogen halide or the halogen-substituted silicon hydride as described above is particularly advantageous since the hydrogen atoms(H) are also introduced together with the introduction of the halogen atoms.

In the case of forming a layer comprising a-Si(H,X) by means of the reactive sputtering process or ion plating process, for example, by the sputtering process, the halogen atoms are introduced by introducing gaseous halogen compounds or halogen atom-containing silicon compounds into a deposition chamber thereby forming a plasma atmosphere with the gas.

Further, in the case of introducing the hydrogen atoms, the gaseous starting material for introducing the hydrogen atoms, for example, $H_2$ or gaseous silanes are described above are introduced into the sputtering deposition chamber thereby forming a plasma atmosphere with the gas.

For instance, in the case of the reactive sputtering process, a layer comprising a-Si(H,X) is formed on the support by using an Si target and by introducing a halogen atom-introducing gas and $H_2$ gas together with an inert gas such as He or Ar as required into a deposition chamber thereby forming a plasma atmosphere and then sputtering the Si target.

To form the layer of a-SiGe(H,X) by the glow discharge process, a feed gas to liberate silicon atoms(Si), a feed gas to liberate germanium atoms, and a feed gas to liberate hydrogen atoms(H) and/or halogen atoms(X) are introduced into an evacuatable deposition chamber, in which the glow discharge is generated so that a layer of a-SiGe(H,X) is formed on the properly positioned support.

The feed gases to supply silicon atoms, halogen atoms, and hydrogen atoms are the same as those used to form the layer of a-Si(H,X) mentioned above.

The feed gas to liberate Ge includes gaseous or gasifiable germanium halides such as $GeH_4$, $Ge_2H_6$, $Ge_3H_8$, $Ge_4H_{10}$, $Ge_5H_{12}$, $Ge_6H_{14}$, $Ge_7H_{16}$, $Ge_8H_{18}$, and $Ge_9H_{20}$, with $GeH_4$, $Ge_2H_6$, and $Ge_3H_8$, being preferable on account of their ease of handling and the effective liberation of germanium atoms.

To form the layer of a-SiGe(H,X) by the sputtering process, two targets (a silicon target and a germanium target) or a single target composed of silicon and germanium is subjected to sputtering in a desired gas atmosphere.

To form the layer of a-SiGe(H,X) by the ion-plating process, the vapors of silicon and germanium are allowed to pass through a desired gas plasma atmosphere. The silicon vapor is produced by heating polycrystal silicon or single crystal silicon held in a boat, and the germanium vapor is produced by heating polycrystal germanium or single crystal germanium held in a boat. The heating is accomplished by resistance heating or electron beam method (E.B. method).

In either case where the sputtering process or the ion-plating process is employed, the layer may be incorporated with halogen atoms by introducing one of the above-mentioned gaseous halides or halogen-containing silicon compounds into the deposition chamber in which a plasma atmosphere of the gas is produced. In the case where the layer is incorporated with hydrogen atoms, a feed gas to liberate hydrogen is introduced into the deposition chamber in which a plasma atmosphere of the gas is produced. The feed gas may be gaseous hydrogen, silanes, and/or germanium hydrides. The feed gas to liberate halogen atoms includes the above-mentioned halogen-containing silicon compounds. Other examples of the feed gas include hydrogen halides such as HF, HCl, HBr, and HI; halogen-substituted silanes such as $SiH_2F_2$, $SiH_2I_2$, $SiH_2Cl_2$, $SiHCl_3$, $SiH_2Br_2$, and $SiHBr_3$; germanium hydride halide such as $GeHF_3$, $GeH_2F_2$, $GeH_3F$, $GeHCl_3$, $GeH_2Cl_2$, $GeH_3Cl$, $GeHBr_3$, $GeH_2Br_2$, $GeH_3Br$, $GeHI_3$, $GeH_2I_2$, and $GeH_3I$; and germanium halides such as $GeF_4$, $GeCl_4$, $GeBr_4$, $GeI_4$, $GeF_2$, $GeCl_2$, $GeBr_2$, and $GeI_2$. They are in the gaseous form or gasifiable substances.

To form the light receiving layer composed of amorphous silicon containing tin atoms (referred to as a-SiSn(H,X) hereinafter) by the glow-discharge process, sputtering process, or ion-plating process, a starting material (feed gas) to release tin atoms(Sn) is used in place of the starting material to release germanium atoms which is used to form the layer composed of a-SiGe(H,X) as mentioned above. The process is properly controlled so that the layer contains a desired amount of tin atoms.

Examples of the feed gas to release tin atoms(Sn) include tin hydride ($SnH_4$) and tin halides (such as $SnF_2$, $SnF_4$, $SnCl_2$, $SnCl_4$, $SnBr_2$, $SnBr_4$, $SnI_2$, and $SnI_4$) which are in the gaseous form or gasifiable. Tin halides are preferable because they form on the substrate a layer of a-Si containing halogen atoms. Among tin halides, $SnCl_4$ is particularly preferable because of its ease of handling and its efficient tine supply.

In the case where solid $SnCl_4$ is used as a starting material to supply tin atoms (Sn), it should preferably be gasified by blowing (bubbling) an inert gas (e.g., Ar and He) into it while heating. The gas thus generated is introduced, at a desired pressure, into the evacuated deposition chamber.

The layer may be formed from an amorphous material (a-Si(H,X) or a-Si(Ge,Sn) (H,X)) which further contains the group III atoms or group V atoms, nitrogen atoms, oxygen atoms, or carbon atoms, by the glow-discharge process, sputtering process, or ion-plating process. In this case, the above-mentioned starting material for a-Si(H,X) or a-Si(Ge,Sn) (H,X) is used in combination with the starting materials to introduce the group III atoms or group V atoms, nitrogen atoms, oxygen atoms, or carbon atoms. The supply of the starting materials should be properly controlled so that the layer contains a desired amount of the necessary atoms.

If, for example, the layer is to be formed by the glow-discharge process from a-Si(H,X) containing atoms (O, C, N) or from a-Si(Ge,Sn)(H,X) containing atoms (O,C,N), the starting material to form the layer of a-Si(H,X) or a-Si(Ge,Sn)(H,X) should be combined with the starting material used to introduce atoms (O,C,N). The supply of these starting materials should be properly controlled so that the layer contains a desired amount of the necessary atoms.

The starting material to introduce the atoms (O,C,N) may be any gaseous substance or gasifiable substance composed of any of oxygen, carbon, and nitrogen. Examples of the starting materials used to introduce oxygen atoms(O) include oxygen ($O_2$), ozone ($O_3$), nitrogen dioxide ($NO_2$), nitrous oxide ($N_2O$), dinitrogen trioxide ($N_2O_3$), dinitrogen tetroxide ($N_2O_4$), dinitrogen pentoxide ($N_2O_5$), and nitrogen trioxide ($NO_3$). Additional examples include lower siloxanes such as disiloxane ($H_3SiOSiH_3$) and trisiloxane ($H_3SiOSiH_2OSiH_3$) which are composed of silicon atoms(Si), oxygen atoms(O), and hydrogen atoms(H). Examples of the starting materials used to introduce carbon atoms include saturated hydrocarbons having 1 to 5 carbon atoms such as methane ($CH_4$), ethane ($C_2H_6$), propane ($C_3H_8$), n-butane (n-$C_4H_{10}$), and pentane ($C_5H_{12}$); ethylenic hydrocarbons having 2 to 5 carbon atoms such as ethylene ($C_2H_4$), propylene ($C_3H_6$), butene-1 ($C_4H_8$), butene-2 ($C_4H_8$), isobutylene ($C_4H_8$), and pentene ($C_5H_{10}$); and acetylenic hydrocarbons having 2 to 4 carbon atoms such as acetylene ($C_2H_2$), methyl acetylene ($C_3H_4$), and butine ($C_4H_6$). Examples of the starting materials used to introduce nitrogen atoms include nitrogen ($N_2$), ammonia ($NH_3$), hydrazine ($H_2NNH_2$), hydrogen azide ($HN_3$), ammonium azide ($NH_4N_3$), nitrogen trifluoride ($F_3N$), and nitrogen tetrafluoride ($F_4N$).

For instance, in the case of forming a layer or layer region constituted with a-Si(H,X) or a-Si(Ge,Sn) (H,X) containing the group III atoms or group V atoms by using the glow discharging, sputtring, or ion-plating process, the starting material for introducing the group III or group V atoms are used together with the starting material for froming a-Si(H,X) or a-Si(Ge,Sn) (H,X) upon forming the layer constituted with a-Si(H,X) or a-Si(Ge,Sn) (H,X) as described above and they are incorporated while controlling the amount of them into the layer to be formed.

Referring specifically to the boron atom introducing materials as the starting material for introducing the group III atoms, they can include boron hydrides such as $B_2H_6$, $B_4H_{10}$, $B_5H_9$, $B_5H_{11}$, $B_6H_{10}$, $B_6H_{12}$, and $B_6H_{14}$, and boron halides such as $BF_3$, $BCl_3$, and $BBr_3$. In addition, $AlCl_3$, $CaCl_3$, $Ga(CH_3)_2$, $InCl_3$, $TlCl_3$, and the like can also be mentioned.

Referring to the starting material for introducing the group V atoms and, specifically, to the phosphorus atom introducing materials, they can include, for example, phosphorus hydrides such as $PH_3$ and $P_2H_6$ and phosphorus halides such as $PH_4I$, $PF_3$, $PF_5$, $PCl_3$, $PCl_5$, $PBr_3$, $PBr_5$, and $PI_3$. In addition, $AsH_3$, $AsF_5$, $AsCl_3$, $AsBr_3$, $AsF_3$, $SbH_3$, $SbF_3$, $SbF_5$, $SbCl_3$, $SbCl_5$, $BiH_3$, $BiCl_3$, and $BiBr_3$ can also be mentioned to as the effective starting material for introducing the group V atoms.

As mentioned above, the light receiving layer of the light receiving member of this invention is produced by the glow discharge process or sputtering process. The amount of germanium atoms and/or tin atoms; the group III atoms or group V atoms; oxygen atoms, carbon atoms, or nitrogen atoms; and hydrogen atoms and/or halogen atoms in the light receiving layer is controlled by regulating the flow rate of the starting materials entering the deposition chamber.

The conditions upon forming the light receiving layer of the light receiving member of the invention, for example, the temperature of the support, the gas pressure in the deposition chamber, and the electric discharging power are important factors for obtaining the light receiving member having desired properties and they are properly selected while considering the functions of the layer to be made. Further, since these layer forming conditions may be varied depending on the kind and the amount of each of the atoms contained in the light receiving layer, the conditions have to be determined also taking the kind or the amount of the atoms to be contained into consideration.

In the case where the layer of a-Si(H,X) containing nitrogen atoms, oxygen atoms, carbon atoms, and the group III atoms or group V atoms, is to be formed, the temperature of the support is usually from 50° to 350° C. and, more preferably, from 50° to 250° C.; the gas pressure in the deposition chamber is usually from 0.01 to 1 Torr and, particularly preferably, from 0.1 to 0.5 Torr; and the electrical discharging power is usually from 0.005 to 50 W/cm$^2$, more preferably, from 0.01 to 30 W/cm$^2$ and, particularly preferably, from 0.01 to 20 W/cm$^2$.

In the case where the layer of a-Si(H,X) is to be formed or the layer of a-SiGe(H,X) containing oxygen atoms, carbon atoms, nitrogen atoms, and the group III atoms or group V atoms, is to be formed, the temperature of the support is usually from 50° to 350° C., preferably, from 50° to 300° C., most suitably 100° to 300° C.; the gas pressure in the deposition chamber is usually from 0.01 to 5 Torr, preferably, from 0.001 to 3 Torr, most suitably from 0.1 to 1 Torr; and the electrical discharging power is usually from 0.005 to 50 W/cm$^2$, preferably, from 0.01 to 30 W/cm$^2$, most preferably, from 0.01 to 20 W/cm$^2$.

However, the actual conditions for forming the layer such as temperature of the support, discharging power and the gas pressure in the deposition chamber cannot usually be determined with ease independent of each other. Accordingly, the conditions optimal to the layer formation are desirably determined based on relative and organic relationships for forming the amorphous material layer having desired properties.

By the way, it is necessary that the foregoing various conditions are kept constant upon forming the light receiving layer for unifying the distribution state of germanium atoms and/or tin atoms, oxygen atoms, carbon atoms, nitrogen atoms, the group III atoms or group V atoms, or hydrogen atoms and/or halogen atoms to be contained in the light receiving layer according to this invention.

Further, in the case of forming the light receiving layer comprising germanium atoms and/or tin atoms, oxygen atoms, carbon atoms, nitrogen atoms, or the group III atoms or group V atoms at a desired distribution state in the direction of the layer thickness by varying their distribution concentration in the direction of the layer thickness upon forming the light receiving layer in this invention, the layer is formed, for example, in the case of the glow discharging process, by properly varying the gas flow rate of gaseous starting material for introducing germanium atoms and/or tin atoms, oxygen atoms, carbon atoms, nitrogen atoms, or the group III atoms or group V atoms upon introducing into the deposition chamber in accordance with a desired variation coefficient while maintaining other conditions constant. Then, the gas flow rate may be varied, specifically, by gradually changing the opening degree of a predetermined needle valve disposed to the midway of the gas flow system, for example, manually or any of other means usually employed such as in externally driving motor. In this case, the variation of the flow rate may not necessarily be linear but a desired content curve may be obtained, for example, by controlling the flow rate along with a previously designed variation coefficient curve by using a microcomputer or the like.

Further, in the case of forming the light receiving layer by means of the sputtering process, a desired distributed state of the germanium atoms and/or tin atoms, oxygen atoms, carbon atoms, nitrogen atoms, or the group III atoms or group V atoms in the direction of the layer thickness may be formed with the distribution density being varied in the direction of the layer thickness by using gaseous starting material for introducing the germanium atoms and/or tin atoms, oxygen atoms, carbon atoms, nitrogen atoms, or the group III atoms or group V atoms and varying the gas flow rate upon introducing these gases into the deposition chamber in accordance with a desired variation coefficient in the same manner as the case of using the glow discharging process.

In the case of the light receiving layer having the surface layer composed of at least one kind selected from inorganic fluorides, inorganic oxides, and inorganic sulfides, it is necessary to control the layer thickness at an optical level in order to effectively achieve the object of the invention. To this end, vapor deposition, sputtering, gas phase plasma, optical CVD, heat CVD, or the like may be used. These forming processes are, of course, properly selected while considering those factors such as the kind of the forming materials for the surface layer, production conditions, installation cost required, and production scale.

By the way, in view of the easy operation, easy setting for the conditions and the like, the sputtering process may preferably be employed in the case of using the inorganic compounds for forming the surface layer. That is, the inorganic compoud for forming the surface layer is used as a target and Ar gas is used as a sputtering gas, and the surface layer is deposited on the support, on which the light receiving layer made of amorphous material has previously been formed, by causing glow discharging and sputtering the inorganic compounds.

DESCRIPTION OF THE PREFERRED EMBODIMENTS

The invention will be described more specifically while referring to examples 1 through 54, but the invention is no way limited only to these examples.

Figure 25:
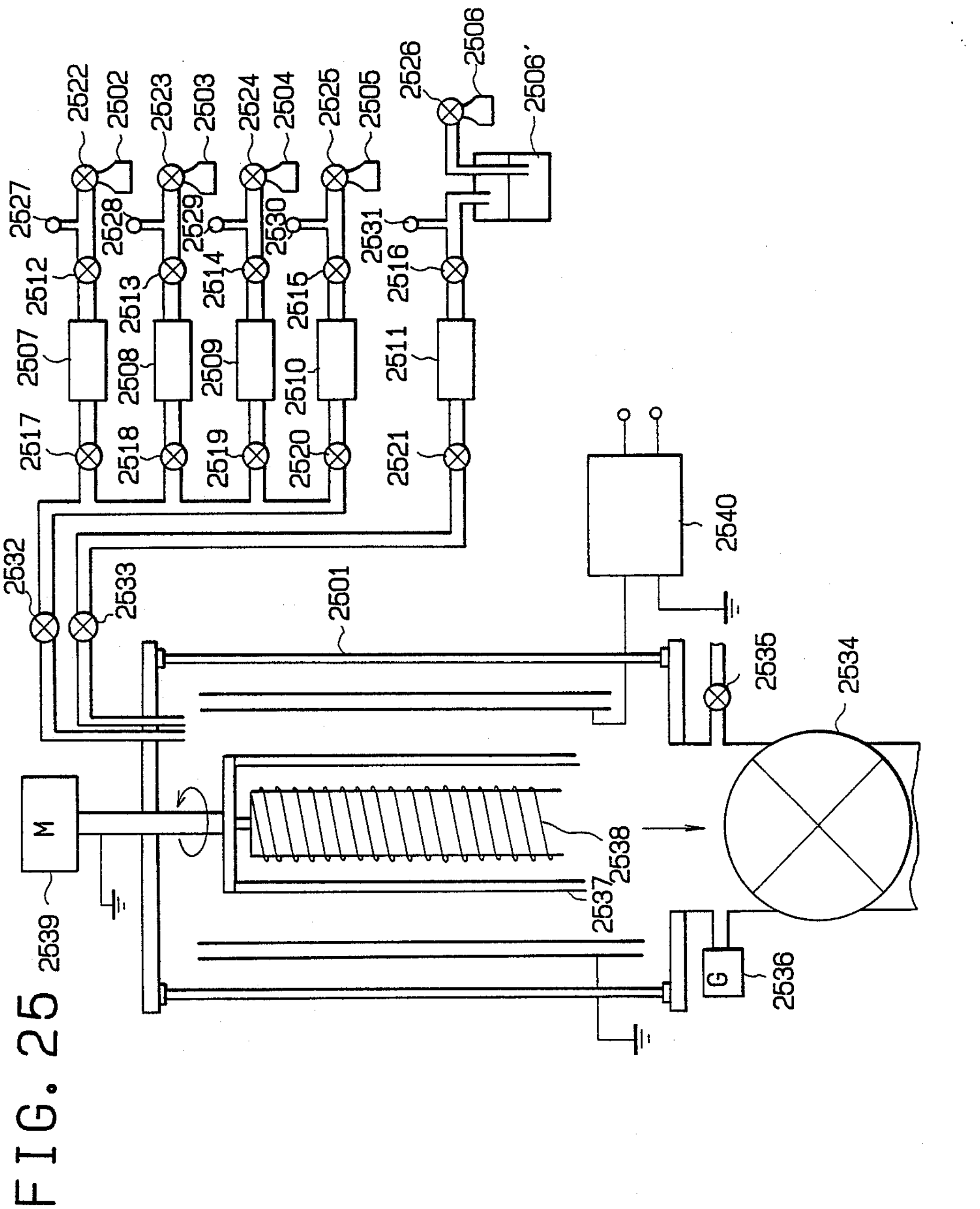
FIG. 25 is a schematic explanatory view of a fabrication device by glow discharging process as an example of the device for preparing the light receiving layer in the light receiving member according to this invention.

In each of the examples, the light receiving layer composed of an amorphous material was formed by using the glow discharging process and the surface layer composed of an inorganic compound was formed by using the sputtering process. FIG. 25 shows the apparatus for preparing the light receiving member according to this invention.

Gas cylinders 2502, 2503, 2504, 2505, and 2506 illustrated in the figure are charged with gaseous starting materials for forming the respective layers in this invention, that is, for instance, $SiF_4$ gas (99.999% purity) in gas cylinder 2505 $B_2H_6$ gas (99.999% purity) diluted with $H_2$ (referred to as $B_2H_6/H_2$) in gas cylinder 2503, $CH_4$ gas (99.999% purity) in gas cylinder 2504, $GeF_4$ gas (99.999% purity) in gas cylinder 2505, and inert gas (He) in gas cylinder 2506'. $SnCl_4$ is held in a closed container 2506'.

Prior to the entrance of these gases into a reaction chamber 2501, it is confirmed that valves 2522–2526 for the gas cylinders 2502–2506 and a leak valve 2535 are closed and that inlet valves 2512–2516, exit valves 2517–2521, and sub-valves 2532 and 2533 are opened. Then, a main valve 2534 is at first opened to evacuate the inside of the reaction chamber 2501 and gas piping. Reference is made in the following to an example in the case of forming a light receiving layer on a vacuum Al cylinder.

At first, $SiH_4$ gas from the gas cylinder 2502, $B_2H_6/H_2$ gas from the gas cylinder 2503, $CH_4$ gas from the gas cylinder 2504, and $GeF_4$ gas from the gas cylinder 2505 are caused to flow into mass flow controllers 2507, 2508, 2509, and 2510 respectively by opening the inlet valves 2512, 2513, 2514, and 2515, controlling the pressure of exit pressure gauges 2527, 2528, 2529, and 2530 to 1 $kg/cm^2$. Subsequently, the exit valves 2517, 2518, 2519, and 2520, and the sub-valve 2532 are gradually opened to enter the gases into the reaction chamber 2501. In this case, the exit valves 2517, 2518, 2519, and 2520 are adjusted so as to attain a desired value for the ratio among the $SiF_4$ gas flow rate, $GeF_4$ gas flow rate, $CH_4$ gas flow rate, and $B_2H_6/H_2$ gas flow rate, and the opening of the main valve 2534 is adjusted while observing the reading on the vacuum gauge 2536 so as to obtain a desired value for the pressure inside the reaction chamber 2501. Then, after confirming that the temperature of the 2537 has been set by a heater 2438 within a range from 50° to 400° C., a power source 2450 is set to a predetermined electrical power to cause glow discharging in the reaction chamber 2501 while controlling the flow rates of $SiF_4$ gas, $GeF_4$ gas, $CH_4$ gas, and $B_2H_4/H_2$ gas in accordance with a previously designed variation coefficient curve by using a microcomputer (not shown), thereby forming, at first, a layer 102' containing silicon atoms, germanium atoms, carbon atoms, and boron atoms on the substrate cylinder 2537. When the layer 102' has reached a desired thickness, the exit valves 2518 and 2520 are completely closed, and the glow discharge is continued in the same manner except that the discharge conditions are changed as required, whereby a layer 102'' containing substantially no germanium atoms is formed on the layer 102'.

In the case where the light receiving layer is incorporated with tin atoms and $SnCl_4$ is used as the feed gas (starting material for tin atoms, solid $SnCl_4$ placed in 2506' is heated by a heating means (not shown) and an inert gas such as He is blown for bubbling from the inert gas cylinder 2506. The thus generated gas of $SnCl_4$ is introduced into the reaction chamber in the same manner as mentioned for $SiF_4$ gas, $GeF_4$ gas, $CH_4$ gas, and $B_2H_6/H_2$ gas. In the case where the layer of amorphous material is formed by glow discharge process as mentioned above and subsequently the surface layer of inorganic compound is formed thereon, the valves for the feed gases and diluent gas used for the layer of amorphous material are closed, and then the leak valve 2535 is gradually opened so that the pressure in the deposition chamber is restored to the atmospheric pressure and the deposition chamber is scavenged with argon gas.

Then, a target of inorganic compound for the formation of the surface layer is spread all over the cathode (not shown), and the deposition chamber is evacuated, with the leak valve 2535 closed, and argon gas is introduced into the deposition chamber until a pressure of 0.015 to 0.02 Torr is reached. A high-frequency power (150 to 170 W) is applied to bring about glow discharge, whereby sputtering the inorganic compound so that the surface layer is deposited on the previously formed layer.

Test Example 1

Rigid spheres of 0.6 mm diameter made of SUS stainless steels were chemically etched to form an unevenness to the surface of each of the rigid spheres.

Usable as the etching agent are an acid such as hydrochloric acid, hydrofluoric acid, sulfuric acid and chromic acid and an alkali such as caustic soda.

In this example, an aqueous solution prepared by admixing 1.0 volumetric part of cocentrated hydrochloric acid to 1.0 to 4.0 volumetric part of distilled water was used, and the period of time for the rigid spheres to be immersed in the aqueous solution, the acid concentration of the aqueous solution and other necessary conditions were appropriately adjusted to form a desired unevenness to the surface of each of the rigid spheres.

Test Example 2

In the device as shown in FIGS. 6(A) and 6(B), the surface of an aluminum alloy cylinder (diameter: 60 mm, length: 298 mm) was treated by using the rigid spheres each of which having a surface provided with appropriate minute irregularities (average height of the irregularities $\gamma_{max}=5$ μm) which were obtained in Test Example 1 to have an appropriate uneven shape composed of dimples each of which having an inside face provided with irregularities.

When examining the relationship for the diameter R' of the rigid sphere, the falling height h, the radius of curvature R and the width D for the dimple, it was confirmed that the radius of curvature R and the width D of the dimple was determined depending on the conditions such as the diameter R' for the rigid sphere, the falling height h and the like. It was also confirmed that the pitch between each of the dimples (density of the dimples or the pitch for the unevenness) could be adjusted to a desired pitch by controlling the rotating speed or the rotation number of the cylinder, or the falling amount of the rigid sphere.

Further, the following matters were confirmed as a result of the studies about the magnitude of R and of D; it is not preferred for R to be less than 0.1 mm because the rigid spheres to be employed in that case are to be lighter and smaller, that results in making it difficult to control the formation of the dimples as expected. Then, it is not preferred for R to be more than 2.0 mm because the rigid spheres to be employed in that case are to be heavier and the falling height is to be extremely lower, for instance, in the case where D is desired to be relatively smaller in order to adjust the falling height, that results in making it also difficult to control the formation of the dimples as expected. Further, it is not preferred for D to be less than 0.02 mm because the rigid spheres to be employed in that case are to be of a smaller size and to be lighter in order to secure their falling height, that results in making it also difficult to control the formation of the dimples as expected.

Further in addition, when examining the dimples as formed, it was confirmed that the inside face of each of the dimples as formed was provided with appropriate minute irregularities.

EXAMPLE 1

The surface of an aluminum alloy cylinder was treated in the same manner as in the Test Example 2 to obtain a cylindrical Al support having diameter D and ratio D/R (cylinder Nos. 101 to 106) as shown in the upper column of Table 1A.

Then, a light receiving layer was formed on the Al support (cylinder Nos. 101 to 106) under the conditions shown in Table 1B below using the fabrication device shown in FIG. 25.

Figure 26:
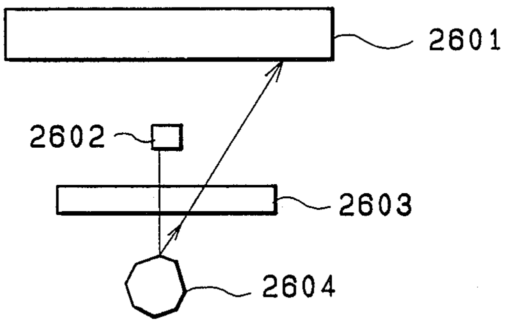
FIG. 26 is a view for illustrating the image exposing device by the laser beams.
Figure 26:
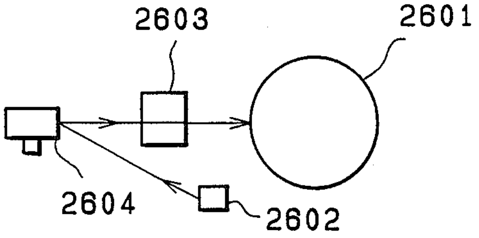

These light receiving members were subjected to imagewise exposure by irradiating laser beams at 780 nm wavelength and with 80 μm spot diameter using an image exposing device shown in FIG. 26 and images were obtained by subsequent development and transfer. The state of the occurrence of interference fringe on the thus obtained images were as shown in the lower row of Table 1A.

FIG. 26(A) is a schematic plan view illustrating the entire exposing device, and FIG. 26(B) is a schematic side elevational view for the entire device. In the figures, are shown a light receiving member 2601, a semiconductor laser 2602, and fθ lens 2603, and a polygonal mirror 2604.

Then as a comparison, a light receiving member was manufactured in the same manner as described above by using an aluminum alloy cylinder, the surface of which was fabricated with a conventional cutting tool (60 mm in diameter, 298 mm in length, 100 μm unevenness pitch, and 3 μm unevenness depth). When observing the thus obtained light receiving member under an electron microscope, the layer interface between the support surface and the light receiving layer and the surface of the light receiving layer were in parallel with each other. Images were formed in the same manner as above by using this light receiving member and the thus obtained images were evaluated in the same manner as described above. The results are as shown in the lower row of Table 1A.

TABLE 1A

| Cylinder No. | 101 | 102 | 103 | 104 | 105 | 106 | 107 |
|---|---|---|---|---|---|---|---|
| D (μm) | 450 ± 50 | 450 ± 50 | 450 ± 50 | 450 ± 50 | 450 ± 50 | 450 ± 50 | — |

TABLE 1A-continued

| Cylinder No. | 101 | 102 | 103 | 104 | 105 | 106 | 107 |
|---|---|---|---|---|---|---|---|
| D/R | 0.02 | 0.03 | 0.04 | 0.05 | 0.06 | 0.07 | — |
| Occurrence of interference fringes | x | Δ | | | | | x |

Actual usability:
: excellent,
: good,
Δ: fair,
x: poor

TABLE 1B

| Layer preparing steps | Gas used | Flow rate (SCCM) | Discharging power (W) | Rate of layer deposition (Å/S) | Layer thickness (μm) |
|---|---|---|---|---|---|
| 1st step | $GeH_4$<br>$SiH_4$<br>$H_2$ | $GeH_4 = 50$<br>$SiH_4 = 50$<br>$H_2 = 300$ | 100 | 9 | 3 |
| 2nd step | $SiH_4$<br>$H_2$ | $SiH_4 = 300$<br>$H_2 = 300$ | 300 | 24 | 20 |

Al substrate temperature: 250° C.
Discharging frequency: 13.56 MHz

EXAMPLE 2

Figure 27:
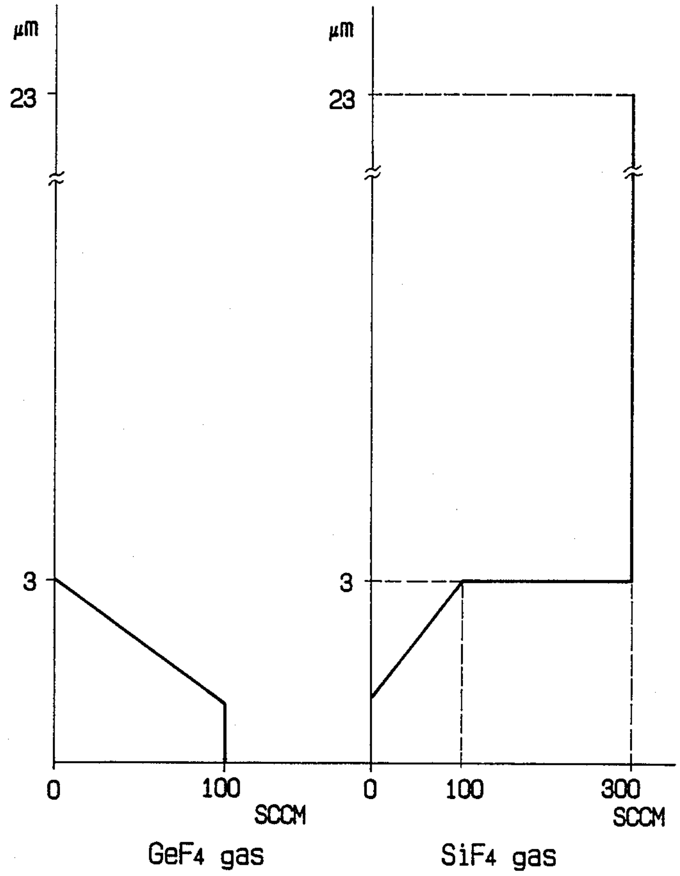
FIGS. 27 through 46 are views illustrating the variations in the gas flow rates in forming the light receiving layer according to this invention, in which the ordinate represents the thickness of the light receiving layer and the abscissa represents the gas flow rate respectively.

A light receiving layer was formed on Al supports (cylinder Nos. 101 to 107) in the same manner as in Example 1 except for forming these light receiving layers in accordance with the layer forming conditions shown in Table 2B. Incidentally, while the light receiving layer was formed, the flow rates of $SiF_4$ and $GeF_4$ were controlled automatically using a microcomputer according to the flow rate curve as shown in FIG. 27.

When forming the images on the thus obtained light receiving members in the same manner as in Example 1, the state of occurrence of the interference fringe in the obtained images were as shown in the lower row of Table 2A.

TABLE 2A

| Cylinder No. | 101 | 102 | 103 | 104 | 105 | 106 | 107 |
|---|---|---|---|---|---|---|---|
| D (μm) | 450 ± 50 | 450 ± 50 | 450 ± 50 | 450 ± 50 | 450 ± 50 | 450 ± 50 | — |
| D/R | 0.02 | 0.03 | 0.04 | 0.05 | 0.06 | 0.07 | — |
| Occurrence of interference fringes | x | Δ | | | | | χ |

Actual usability:
: excellent,
: good,
Δ: fair,
x: poor

TABLE 2B (See FIG. 27 for flow rate curve)

| Layer preparing steps | Gas used | Flow rate (SCCM) | Discharging power (W) | Rate of layer deposition (Å/S) | Layer thickness (μm) |
|---|---|---|---|---|---|
| 1st step | $GeF_4$<br>$SiF_4$<br>$H_2$ | $GeF_4 = 100 \rightarrow 0$<br>$SiF_4 = 0 \rightarrow 100$<br>$H_2 = 300$ | 100 | 9 | 3 |
| 2nd step | $SiF_4$<br>$H_2$ | $SiF_4 = 300$<br>$H_2 = 300$ | 300 | 24 | 20 |

Al substrate temperature: 250° C.
Discharging frequency: 13.56 MHz

EXAMPLES 3 TO 11

A light receiving layer was formed on an Al support (Sample Nos. 103 to 106) in the same manner as in Example 1 except for forming these light receiving layers in accordance with the layer forming conditions shown in Tables 3 through 11. In these examples, the flow rates for the gases used upon forming the light receiving layers were automatically adjusted under the microcomputer control in accordance with the flow rate variation curves shown in FIGS. 28 through 36, respectively. In Examples 5 through 11, the boron atoms were incorporated so that their concentration in the entire layer is about 200 ppm.

Images were formed on the thus obtained light receiving members in the same manner as in Example 1. Occurrence of interference fringe was not observed in any of the thus obtained images and the image quality was extremely high.

TABLE 3

Figure 28:
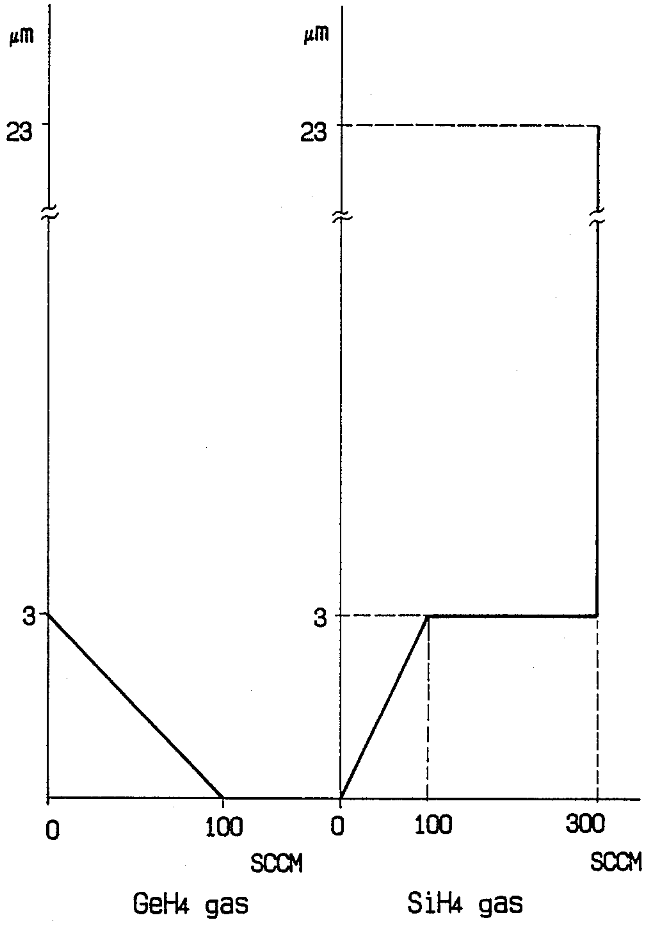

(See FIG. 28 for flow rate curve)

| Layer preparing steps | Gas used | Flow rate (SCCM) | Discharging power (W) | Rate of layer deposition (Å/S) | Layer thickness (μm) |
|---|---|---|---|---|---|
| 1st step | $GeH_4$<br>$SiH_4$<br>$H_2$ | $GeH_4 = 100 \rightarrow 0$<br>$SiH_4 = 0 \rightarrow 100$<br>$H_2 = 300$ | 100 | 9 | 3 |
| 2nd step | $SiH_4$ | $SiH_4 = 300$ | 300 | 24 | 20 |

TABLE 3-continued

| Layer preparing steps | Gas used | Flow rate (SCCM) | Discharging power (W) | Rate of layer deposition (Å/S) | Layer thickness (μm) |
|---|---|---|---|---|---|
| | (See FIG. 28 for flow rate curve) | | | | |
| | $H_2$ | $H_2$ = 300 | | | |

Al substrate temperature: 250° C.
Discharging frequency: 13.56 MHz

TABLE 4

| Layer preparing steps | Gas used | Flow rate (SCCM) | Discharging power (W) | Rate of layer deposition (Å/S) | Layer thickness (μm) |
|---|---|---|---|---|---|
| | (See FIG. 29 for flow rate curve) | | | | |
| 1st step | $GeF_4$ | $GeF_4$ = 50 → 0 | 100 | 9 | 3 |
| | $SiF_4$ | $SiF_4$ = 50 → 100 | | | |
| | $H_2$ | $H_2$ = 300 | | | |
| 2nd step | $SiF_4$ | $SiF_4$ = 300 | 300 | 24 | 20 |
| | $H_2$ | $H_2$ = 300 | | | |

Al substrate temperature: 250° C.
Discharging frequency: 13.56 MHz

TABLE 5

| Layer preparing steps | Gas used | Flow rate (SCCM) | Discharging power (W) | Rate of layer deposition (Å/S) | Layer thickness (μm) |
|---|---|---|---|---|---|
| | (See FIG. 30 for flow rate curve) | | | | |
| 1st step | $GeF_4$ | $GeF_4$ = 50 → 0 | 100 | 9 | 3 |
| | $SiF_4$ | $SiF_4$ = 50 → 100 | | | |
| | $H_2$ | $H_2$ = 120 | | | |
| | $B_2H_6/H_2$ | $B_2H_6/H_2$ = 180 | | | |
| 2nd step | $SiF_4$ | $SiF_4$ = 300 | 300 | 24 | 20 |
| | $H_2$ | $H_2$ = 300 | | | |

Al substrate temperature: 250° C.
Discharging frequency: 13.56 MHz

TABLE 6

| Layer preparing steps | Gas used | Flow rate (SCCM) | Discharging power (W) | Rate of layer deposition (Å/S) | Layer thickness (μm) |
|---|---|---|---|---|---|
| | (See FIG. 31 for flow rate curve) | | | | |
| 1st step | $SnCl_4He$ | $SnCl_4/He$ = 20 | 100 | 9 | 3 |
| | $SiH_4$ | $SiH_4$ = 80 | | | |
| | $H_2$ | $H_2$ = 120 → 300 | | | |
| | $B_2H_6/H_2$ | $B_2H_6/H_2$ = 180 → 0 | | | |
| 2nd step | $SiH_4$ | $SiH_4$ = 300 | 300 | 24 | 20 |
| | $H_2$ | $H_2$ = 300 | | | |

Al substrate temperature: 250° C.
Discharging frequency: 13.56 MHz

TABLE 7

| Layer preparing steps | Gas used | Flow rate (SCCM) | Discharging power (W) | Rate of layer deposition (Å/S) | Layer thickness (μm) |
|---|---|---|---|---|---|
| | (See FIG. 32 for flow rate curve) | | | | |
| 1st step | $SnCl_4/He$ | $SnCl_4/He$ = 40 → 0 | 100 | 9 | 3 |
| | $SiH_4$ | $SiH_4$ = 60 → 100 | | | |
| | $H_2$ | $H_2$ =120 | | | |
| | $B_2H_6/H_2$ | $B_2H_6/H_2$ = 180 | | | |
| 2nd step | $SiH_4$ | $SiH_4$ = 300 | 300 | 24 | 20 |
| | $H_2$ | $H_2$ = 120 → 300 | | | |
| | $B_2H_6/H_2$ | $B_2H_6/H_2$ = 180 → 0 | | | |

Al substrate temperature: 250° C.
Discharging frequency: 13.56 MHz

TABLE 8

| Layer preparing steps | Gas used | Flow rate (SCCM) | Discharging power (W) | Rate of layer deposition (Å/S) | Layer thickness (μm) |
|---|---|---|---|---|---|
| | (See FIG. 33 for flow rate curve) | | | | |
| 1st step | $GeH_4$ | $GeH_2$ = 100 → 0 | 100 | 9 | 3 |
| | $SiH_4$ | $SiH_4$ = 0 → 100 | | | |
| | $H_2$ | $H_2$ = 120 | | | |
| | $B_2H_6/H_2$ | $B_2H_6/H_2$ = 180 | | | |
| 2nd step | $SiH_4$ | $SiH_4$ = 300 | 300 | 24 | 20 |

TABLE 8-continued

| Layer preparing steps | Gas used | Flow rate (SCCM) | Discharging power (W) | Rate of layer deposition (Å/S) | Layer thickness (μm) |
|---|---|---|---|---|---|
| | (See FIG. 33 for flow rate curve) | | | | |
| | $H_2$ | $H_2 = 300$ | | | |

Al substrate temperature: 250° C.
Discharging frequency: 13.56 MHz

TABLE 9

| Layer preparing steps | Gas used | Flow rate (SCCM) | Discharging power (W) | Rate of layer deposition (Å/S) | Layer thickness (μm) |
|---|---|---|---|---|---|
| | (See FIG. 34 for flow rate curve) | | | | |
| 1st step | $GeF_4$ | $GeF_4 = 100 \rightarrow 0$ | 100 | 9 | 3 |
| | $SiF_4$ | $SiF_4 = 0 \rightarrow 100$ | | | |
| | $H_2$ | $H_2 = 120 \rightarrow 300$ | | | |
| | $B_2H_6/H_2$ | $B_2H_6/H_2 = 180 \rightarrow 0$ | | | |
| 2nd step | $SiF_4$ | $SiF_4 = 300$ | 300 | 24 | 20 |
| | $H_2$ | $H_2 = 300$ | | | |

Al substrate temperature: 250° C.
Discharging frequency: 13.56 MHz

TABLE 10

| Layer preparing step | Gas used | Flow rate (SCCM) | Discharging power (W) | Rate of layer deposition (Å/S) | Layer thickness (μm) |
|---|---|---|---|---|---|
| | (See FIG. 35 for flow rate curve) | | | | |
| 1st step | $GeF_4$ | $GeF_4 = 50 \rightarrow 0$ | 100 | 9 | 3 |
| | $SiF_4$ | $SiF_4 = 50 \rightarrow 100$ | | | |
| | $B_2H_6/H_2$ | $B_2H_6/H_2 = 180$ | | | |
| | $H_2$ | $H_2 = 120$ | | | |
| 2nd step | $SiF_4$ | $SiF_4 = 300$ | 300 | 24 | 20 |
| | $H_2$ | $H_2 = 300$ | | | |

Al substrate temperature: 250° C.
Discharging frequency: 13.56 MHz

TABLE 11

| Layer preparing steps | Gas used | Flow rate (SCCM) | Discharging power (W) | Rate of layer deposition (Å/S) | Layer thickness (μm) |
|---|---|---|---|---|---|
| | (See FIG. 36 for flow rate curve) | | | | |
| 1st step | $GeH_4$ | $GeH_4 = 50 \rightarrow 0$ | 100 | 9 | 3 |
| | $SiH_4$ | $SiH_4 = 50 \rightarrow 100$ | | | |
| | $H_2$ | $H_2 = 120 \rightarrow 300$ | | | |
| | $B_2H_6/H_2$ | $B_2H_6/H_2 = 180 \rightarrow 0$ | | | |
| 2nd step | $SiH_4$ | $SiH_4 = 300$ | 300 | 24 | 20 |
| | $H_2$ | $H_2 = 300$ | | | |

Al substrate temperature: 250° C.
Discharging frequency: 13.56 MHz

EXAMPLES 12 TO 21

A light receiving layer was formed on an Al support (Sample Nos. 103 to 106) in the same manner as in Example 1 except for forming these light receiving layers in accordance with the layer forming conditions shown in Tables 12 through 21. In these examples, the flow rates for the gases used upon forming the light recieving layers were automatically adjusted under the microcomputer control in accordance with the flow rate variation curves shown in FIGS. 37 through 45, respectively. In Examples 16 through 21, the boron atoms were incorporated so that their concentration in the entire layer is about 200 ppm.

Images were formed on the thus obtained light receiving members in the same manner as in Example 1. Occurrence of interference fringe was not observed in any of the thus obtained images and the image quality was extremely high.

TABLE 12

| Layer preparing steps | Gas used | Flow rate (SCCM) | Discharging power (W) | Rate of layer deposition (Å/S) | Layer thickness (μm) |
|---|---|---|---|---|---|
| 1st step | $GeH_4$ | $GeH_4 = 50$ | 100 | 9 | 3 |
| | $SiH_4$ | $SiH_4 = 50$ | | | |
| | $H_2$ | $H_2 = 300$ | | | |
| | $CH_4$ | $CH_4 = 5$ | | | |
| 2nd step | $SiH_4$ | $SiH_4 = 300$ | 300 | 24 | 20 |
| | $H_2$ | $H_2 = 300$ | | | |
| | $CH_4$ | $CH_4 = 5$ | | | |

Al substrate temperature: 250° C.
Discharging frequency: 13.56 MHz

TABLE 13

| (See FIG. 37 for flow rate curve) | | | | | |
|---|---|---|---|---|---|
| Layer preparing steps | Gas used | Flow rate (SCCM) | Discharging power (W) | Rate of layer deposition (Å/S) | Layer thickness (μm) |
| 1st step | $GeF_4$ | $GeF_4 = 100 \rightarrow 0$ | 100 | 9 | 3 |
| | $SiF_4$ | $SiF_4 = 0 \rightarrow 100$ | | | |
| | $H_2$ | $H_2 = 300$ | | | |
| | CH4 | $CH_4 = 10$ | | | |
| 2nd step | $SiF_4$ | $SiF_4 = 300$ | 300 | 24 | 20 |
| | $H_2$ | $H_2 = 300$ | | | |

Al substrate temperature: 250° C.
Discharging frequency: 13.56 MHz

TABLE 14

| (See FIG. 38 for flow rate curve) | | | | | |
|---|---|---|---|---|---|
| Layer preparing steps | Gas used | Flow rate (SCCM) | Discharging power (W) | Rate of layer deposition (Å/S) | Layer thickness (μm) |
| 1st step | $GeH_4$ | $GeH_4 = 100 \rightarrow 0$ | 100 | 9 | 3 |
| | $SiH_4$ | $SiH_3 = 0 \rightarrow 100$ | | | |
| | $H_2$ | $H_2 = 300$ | | | |
| | $NH_3$ | $NH_3 = 10 \rightarrow 0$ | | | |
| 2nd step | $SiH_4$ | $SiH_4 = 300$ | 300 | 24 | 20 |
| | $H_2$ | $H_2 = 300$ | | | |

Al substrate temperature: 250° C.
Discharging frequency: 13.56 MHz

TABLE 15

| (See FIG. 39 for flow rate curve) | | | | | |
|---|---|---|---|---|---|
| Layer preparing steps | Gas used | Flow rate (SCCM) | Discharging power (W) | Rate of layer deposition (Å/S) | Layer thickness (μm) |
| 1st step | $GeF_4$ | $GeF_4 = 50 \rightarrow 0$ | 100 | 9 | 3 |
| | $SiF_4$ | $SiF_4 = 50 \rightarrow 100$ | | | |
| | $H_2$ | $H_2 = 300$ | | | |
| | NO | NO = 6 | | | |
| 2nd step | $SiF_4$ | $SiF_4 = 300$ | 300 | 24 | 20 |
| | $H_2$ | $H_2 = 300$ | | | |
| | NO | NO = 6 | | | |

Al substrate temperature: 250° C.
Discharging frequency: 13.56 MHz

TABLE 16

| (See FIG. 40 for flow rate curve) | | | | | |
|---|---|---|---|---|---|
| Layer preparing steps | Gas used | Flow rate (SCCM) | Discharging power (W) | Rate of layer deposition (Å/S) | Layer thickness (μm) |
| 1st step | $SnCl_4/He$ | $SnCl_4/He = 20$ | 100 | 9 | 3 |
| | $SiH_4$ | $SiH_4 = 80$ | | | |
| | $H_2$ | $H_2 = 120 \rightarrow 300$ | | | |
| | $B_2H_6/H_2$ | $B_2H_6/H_2 = 180 \rightarrow 0$ | | | |
| | $CH_4$ | $CH_4 = 5$ | | | |
| 2nd step | $SiH_4$ | $SiH_4 = 300$ | 300 | 24 | 20 |
| | $H_2$ | $H_2 = 300$ | | | |
| | $CH_4$ | $CH_4 = 5$ | | | |

Al substrate temperature: 250° C.
Discharging frequency: 13.56 MHz

TABLE 17

| (See FIG. 41 for flow rate curve) | | | | | |
|---|---|---|---|---|---|
| Layer preparing steps | Gas used | Flow rate (SCCM) | Discharging power (W) | Rate of layer deposition (Å/S) | Layer thickness (μm) |
| 1st step | $SnCl_4/He$ | $SnCl_4/He = 40 \rightarrow 0$ | 100 | 9 | 3 |
| | $SiH_4$ | $SiH_4 = 60 \rightarrow 100$ | | | |
| | $H_2$ | $H_2 = 120$ | | | |
| | $B_2H_6/H_2$ | $B_2H_6/H_2 = 180$ | | | |
| | $NH_3$ | $NH_3 = 5$ | | | |
| 2nd step | $SiH_4$ | $SiH_4 = 300$ | 300 | 24 | 20 |
| | $H_2$ | $H_2 = 120 \rightarrow 300$ | | | |
| | $B_2H_6/H_2$ | $B_2H_6/H_2 = 180 \rightarrow 0$ | | | |
| | $NH_3$ | $NH_3$ | | | |

Al substrate temperature: 250° C.
Discharging frequency: 13.56 MHz

TABLE 18

| (See FIG. 42 for flow rate curve) | | | | | |
|---|---|---|---|---|---|
| Layer preparing steps | Gas used | Flow rate (SCCM) | Discharging power (W) | Rate of layer deposition (Å/S) | Layer thickness (μm) |
| 1st step | $GeH_4$ | $GeH_4 = 100 \rightarrow 0$ | 100 | 9 | 3 |
| | $SiH_4$ | $SiH_4 = 0 \rightarrow 100$ | | | |
| | $H_2$ | $H_2 = 120$ | | | |
| | $B_2H_6/H_2$ | $B_2H_6/H_2 = 180$ | | | |

Figure 42:
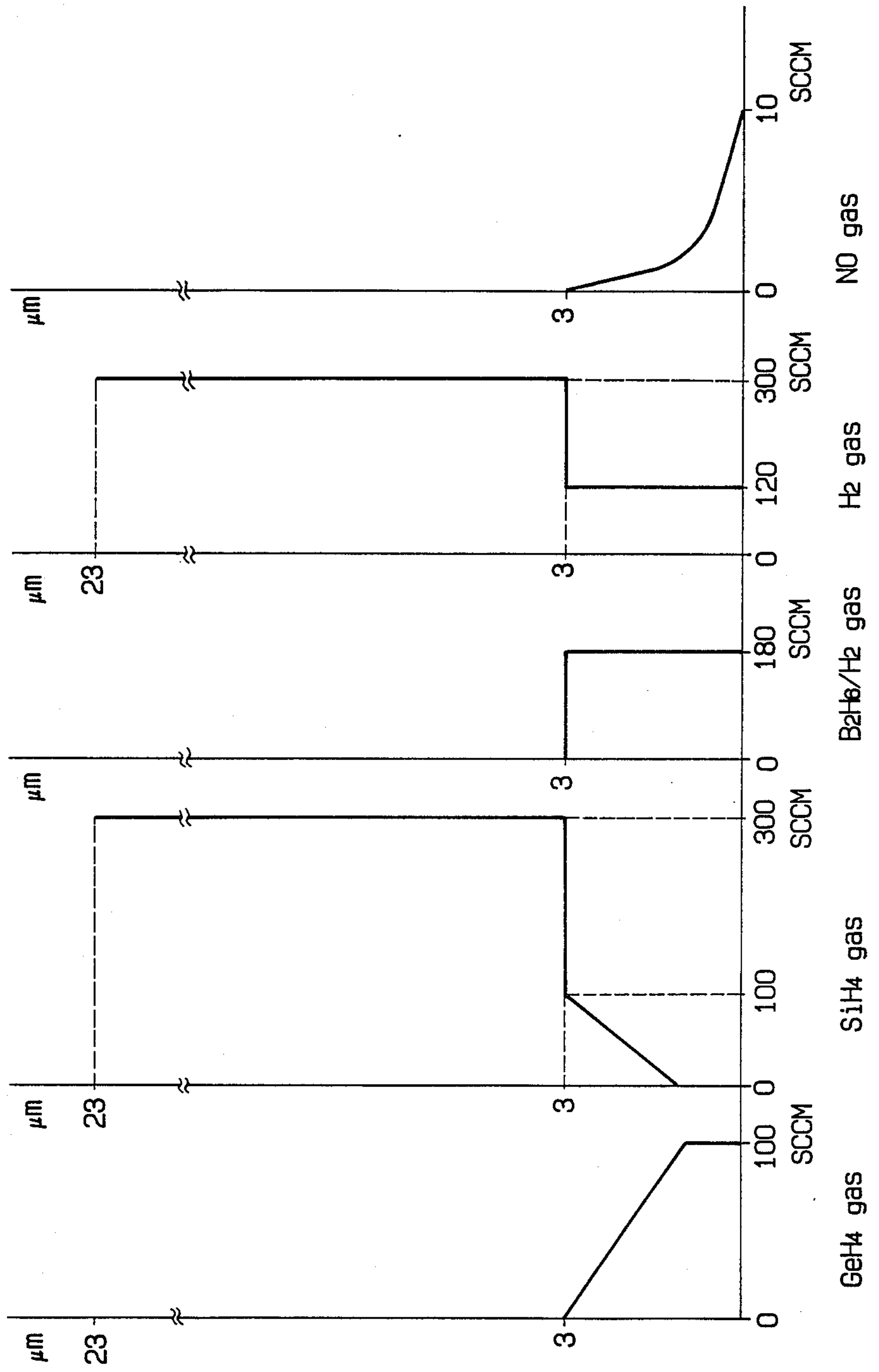

TABLE 18-continued (See FIG. 42 for flow rate curve)

| Layer preparing steps | Gas used | Flow rate (SCCM) | Discharging power (W) | Rate of layer deposition (Å/S) | Layer thickness (μm) |
|---|---|---|---|---|---|
| | NO | NO = 10 → 0 | | | |
| 2nd step | $SiH_4$ | $SiH_4$ = 300 | 300 | 24 | 20 |
| | $H_2$ | $H_2$ = 300 | | | |

Al substrate temperature: 250° C.
Discharging frequency: 13.56 MHz

TABLE 19

Figure 43:
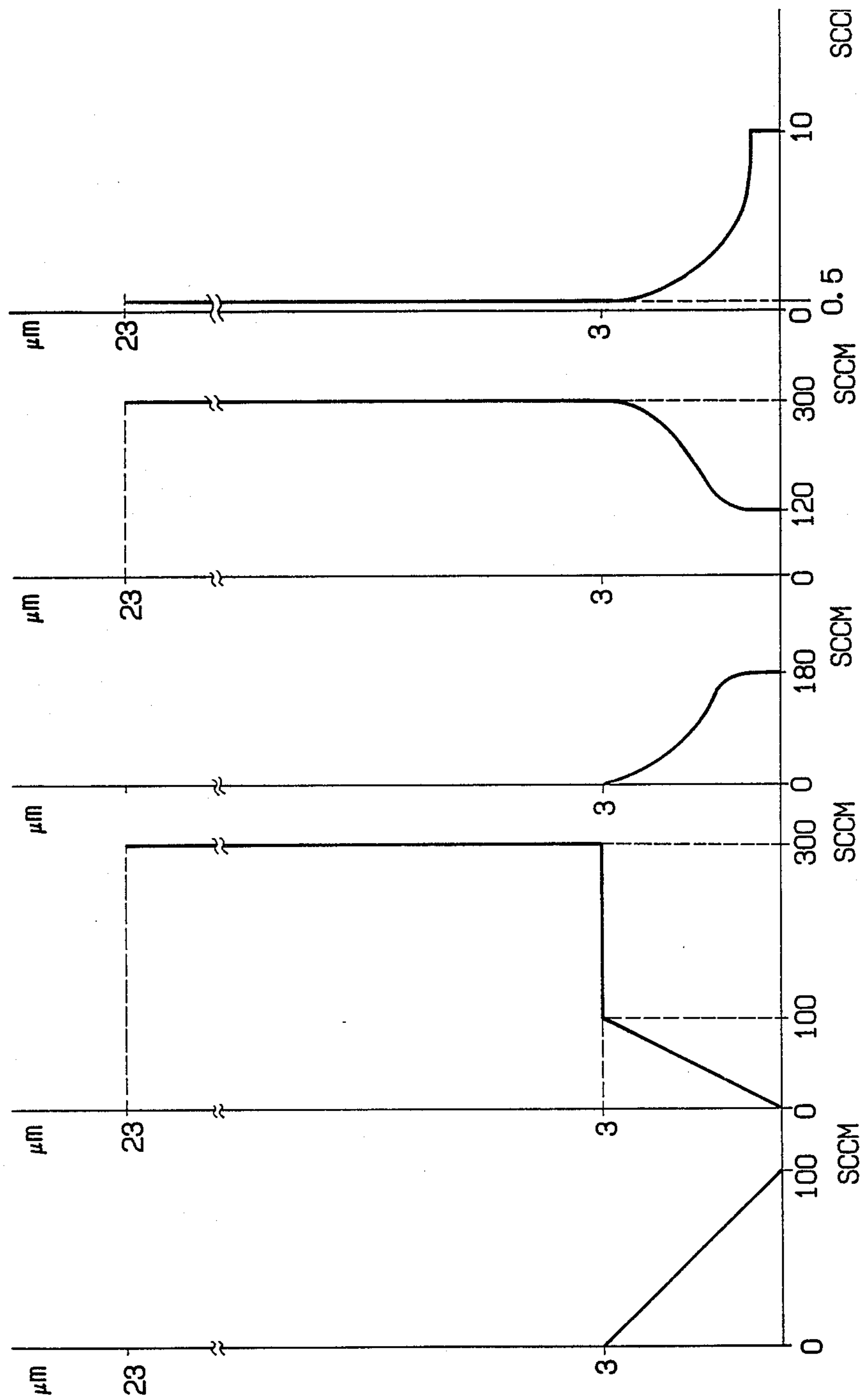

(See FIG. 43 for flow rate curve)

| Layer preparing steps | Gas used | Flow rate (SCCM) | Discharging power (W) | Rate of layer deposition (Å/S) | Layer thickness (μm) |
|---|---|---|---|---|---|
| 1st step | $GeF_4$ | $GeF_4$ = 100 → 0 | 100 | 9 | 3 |
| | $SiF_4$ | $SiF_4$ = 0 → 100 | | | |
| | $H_2$ | $H_2$ = 120 → 300 | | | |
| | $B_2H_6/H_2$ | $B_2H_6/H_2$ = 180 → 0 | | | |
| | $NH_3$ | $NH_3$ = 10 → 0.5 | | | |
| 2nd step | $SiF_4$ | $SiF_4$ = 300 | 300 | 24 | 20 |
| | $H_2$ | $H_2$ = 300 | | | |
| | $NH_3$ | $NH_3$ = 0.5 | | | |

Al substrate temperature: 250° C.
Discharging frequency: 13.56 MHz

TABLE 20

Figure 44:
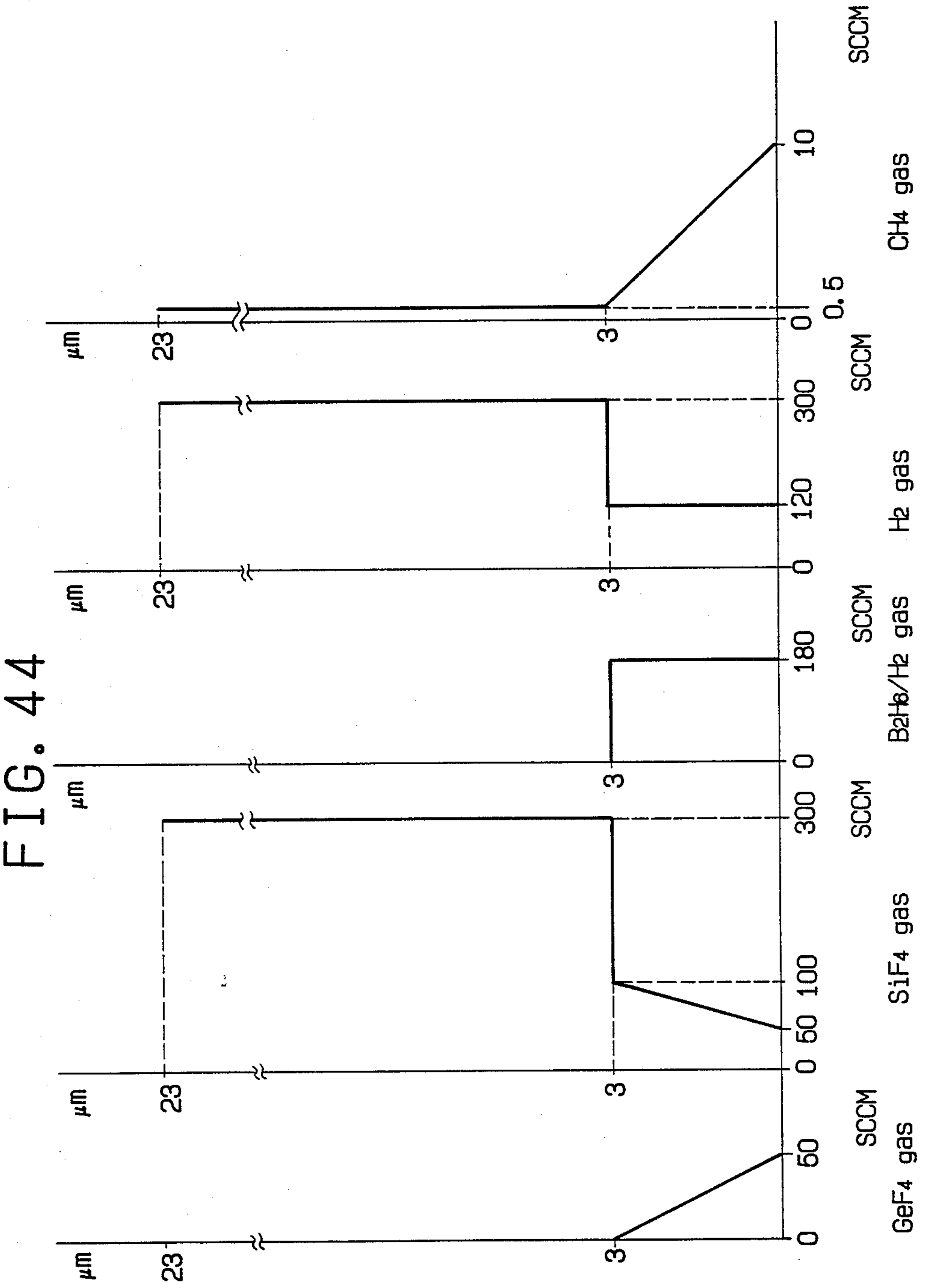

(See FIG. 44 for flow rate curve)

| Layer preparing steps | Gas used | Flow rate (SCCM) | Discharging power (W) | Rate of layer deposition (Å/S) | Layer thickness (μm) |
|---|---|---|---|---|---|
| 1st step | $GeF_4$ | $GeF_4$ = 50 → 0 | 100 | 9 | 3 |
| | $SiF_4$ | $SiF_4$ = 50 → 100 | | | |
| | $B_2H_6/H_2$ | $B_2H_6/H_2$ = 180 | | | |
| | $H_2$ | $H_2$ = 120 | | | |
| | $CH_4$ | $CH_4$ = 10 → 0.5 | | | |
| 2nd step | $SiF_4$ | $SiF_4$ = 300 | 300 | 24 | 20 |
| | $H_2$ | $H_2$ = 300 | | | |
| | $CH_4$ | $CH_4$ = 0.5 | | | |

Al substrate temperature: 250° C.
Discharging frequency: 13.56 MHz

TABLE 21

Figure 45:
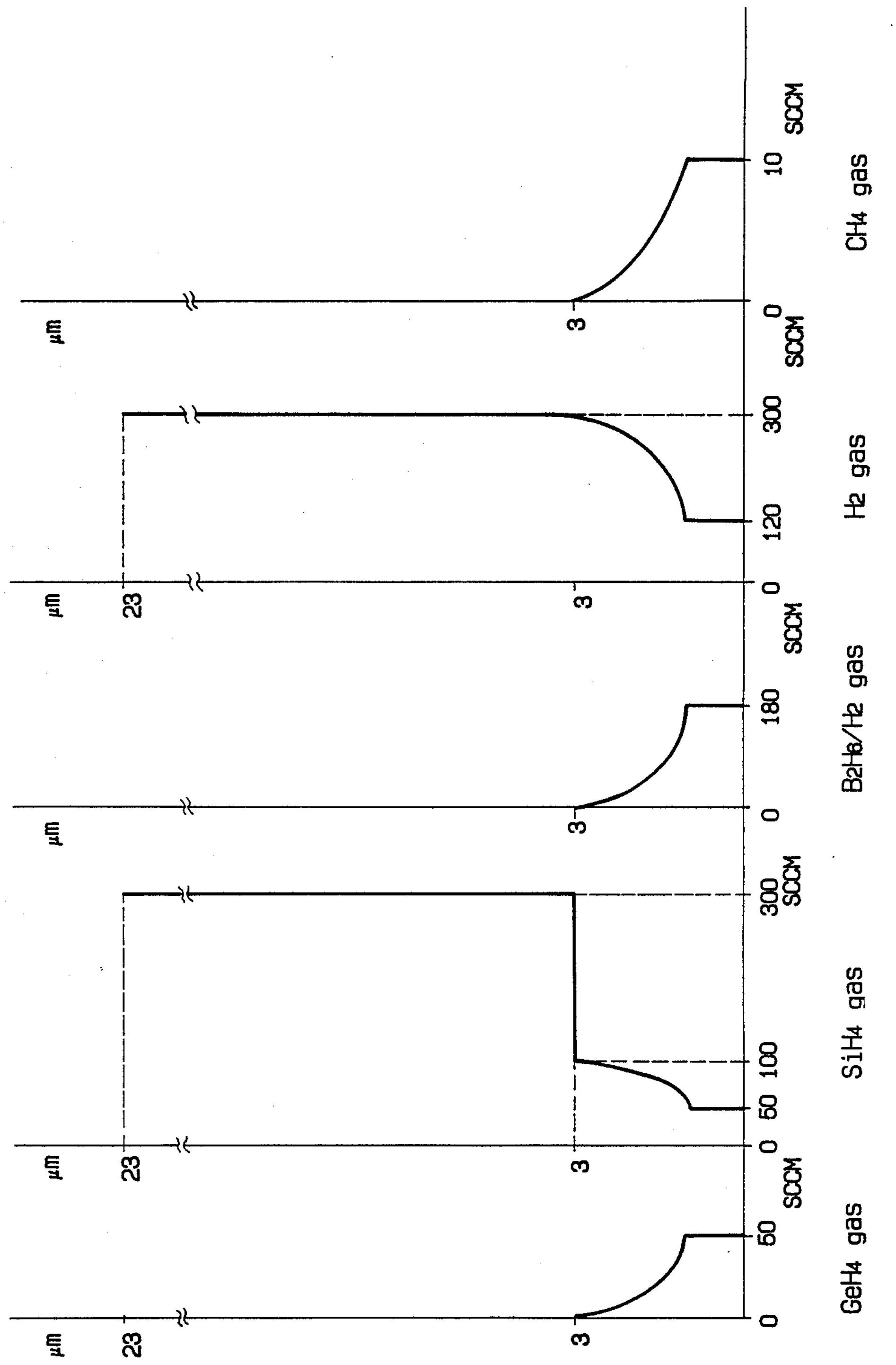

(See FIG. 45 for flow rate curve)

| Layer preparing steps | Gas used | Flow rate (SCCM) | Discharging power (W) | Rate of layer deposition (Å/S) | Layer thickness (μm) |
|---|---|---|---|---|---|
| 1st step | $GeH_4$ | $GeH_4$ = 50 → 0 | 100 | 9 | 3 |
| | $SiH_4$ | $SiH_4$ = 50 → 100 | | | |
| | $H_2$ | $H_2$ = 120 → 300 | | | |
| | $B_2H_6/H_2$ | $B_2H_6/H_2$ = 180 → 0 | | | |
| | $CH_4$ | $CH_4$ = 10 → 0 | | | |
| 2nd step | $SiH_4$ | $SiH_4$ = 300 | 300 | 24 | 20 |
| | $H_2$ | $H_2$ = 300 | | | |

Al substrate temperature: 250° C.
Discharging frequency: 13.56 MHz

EXAMPLES 22 TO 32

Light receiving members were prepared on Al supports (cylinder Nos. 103 to 106) of Example 1 in the same manner as in Example 1 except for forming these light receiving members in accordance with the layer forming conditions shown in Tables 22 through 32. In Examples 23 through 32, the flow rates for the gases used in the first and second steps upon forming the light receiving layers were automatically adjusted under the microcomputer control in accordance with the flow rate variation curves shown in FIGS. 27 through 36, respectively.

Images were formed on the thus obtained light receiving members in the same manner as in Example 1.

Occurrence of interference fringe was not observed in any of the thus obtained images and the image quality was extremely high.

TABLE 22

| Layer preparing steps | Gas used | Flow rate (SCCM) | Discharging power (W) | Rate of layer deposition (Å/S) | Layer thickness (μm) |
|---|---|---|---|---|---|
| 1st step | $GeH_4$ | $GeH_4$ = 50 | 100 | 9 | 3 |
| | $SiH_4$ | $SiH_4$ = 50 | | | |
| | $H_2$ | $H_2$ = 300 | | | |

TABLE 22-continued

| Layer preparing steps | Gas used | Flow rate (SCCM) | Discharging power (W) | Rate of layer deposition (Å/S) | Layer thickness (μm) |
|---|---|---|---|---|---|
| 2nd step | $SiH_4$<br>$H_2$ | $SiH_4$ = 300<br>$H_2$ = 300 | 300 | 24 | 20 |
| 3rd step | $SiH_4$<br>$CH_4$ | $SiH_4$ = 10<br>$CH_4$ = 600 | 200 | 7 | 0.5 |

Al substrate temperature: 250° C.
Discharging frequency: 13.56 MHz

TABLE 23

(See FIG. 27 for flow rate curve)

| Layer preparing steps | Gas used | Flow rate (SCCM) | Discharging power (W) | Rate of layer deposition (Å/S) | Layer thickness (μm) |
|---|---|---|---|---|---|
| 1st step | $GeF_4$<br>$SiF_4$<br>$H_2$ | $GeF_4$ = 100 → 0<br>$SiF_4$ = 0 → 100<br>$H_2$ = 300 | 100 | 9 | 3 |
| 2nd step | $SiF_4$<br>$H_2$ | $SiF_4$ = 300<br>$H_2$ = 300 | 300 | 24 | 20 |
| 3rd step | $SiF_4$<br>$NH_3$ | $SiF_4$ = 20<br>$NH_3$ = 600 | 200 | 7 | 0.5 |

Al substrate temperature: 250° C.
Discharging frequency: 13.56 MHz

TABLE 24

(See FIG. 28 for flow rate curve)

| Layer preparing steps | Gas used | Flow rate (SCCM) | Discharging power (W) | Rate of layer deposition (Å/S) | Layer thickness (μm) |
|---|---|---|---|---|---|
| 1st step | $GeF_4$<br>$SiF_4$<br>$H_2$ | $GeF_4$ = 100 → 0<br>$SiF_4$ = 0 → 100<br>$H_2$ = 300 | 100 | 9 | 3 |
| 2nd step | $SiH_4$<br>$H_2$ | $SiH_4$ = 300<br>$H_2$ = 300 | 300 | 24 | 20 |
| 3rd step | $SiF_4$<br>NO | $SiF_4$ = 100<br>NO = 500 | 200 | 7 | 0.5 |

Al substrate temperature: 250° C.
Discharging frequency: 13.56 MHz

TABLE 25

Figure 29:
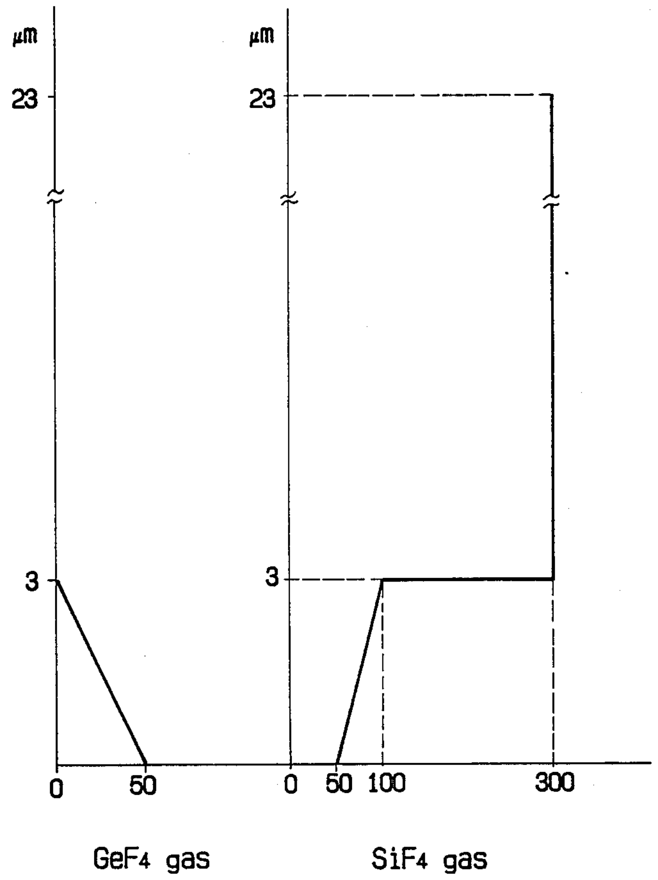

(See FIG. 29 for flow rate curve)

| Layer preparing steps | Gas used | Flow rate (SCCM) | Discharging power (W) | Rate of layer deposition (Å/S) | Layer thickness (μm) |
|---|---|---|---|---|---|
| 1st step | $GeF_4$<br>$SiF_4$<br>$H_2$ | $GeF_4$ = 50 → 0<br>$SiF_4$ = 50 → 100<br>$H_2$ = 300 | 100 | 9 | 3 |
| 2nd step | $SiF_4$<br>$H_2$ | $SiF_4$ = 300<br>$H_2$ = 300 | 300 | 24 | 20 |
| 3rd step | $SiF_4$<br>$CH_4$ | $SiF_4$ = 10<br>$CH_4$ = 600 | 200 | 7 | 0.5 |

Al substrate temperature: 250° C.
Discharging frequency: 13.56 MHz

TABLE 26

Figure 30:
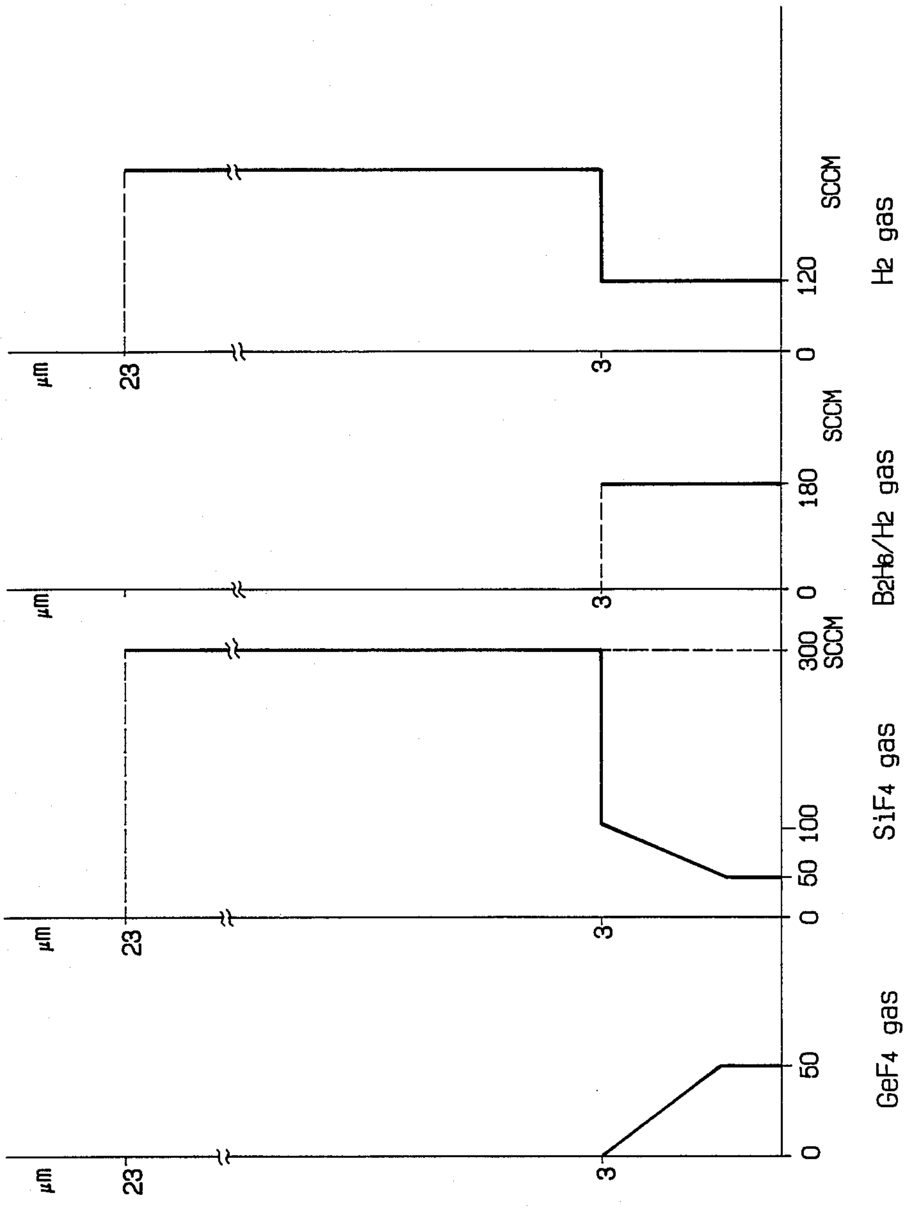

(See FIG. 30 for flow rate curve)

| Layer preparing steps | Gas used | Flow rate (SCCM) | Discharging power (W) | Rate of layer deposition (Å/S) | Layer thickness (μm) |
|---|---|---|---|---|---|
| 1st step | $GeF_4$<br>$SiF_4$<br>$H_2$<br>$B_2H_6/H_2$ | $GeF_4$ = 50 → 0<br>$SiF_4$ = 50 → 100<br>$H_2$ = 120<br>$B_2H_6/H_2$ = 180 | 100 | 9 | 3 |
| 2nd step | $SiF_4$<br>$H_2$ | $SiF_4$ = 300<br>$H_2$ = 300 | 300 | 24 | 20 |
| 3rd step | $SiF_4$<br>$N_2$ | $SiF_4$ = 20<br>$N_2$ = 600 | 200 | 7 | 0.5 |

Al substrate temperature: 250° C.
Discharging frequency: 13.56 MHz

TABLE 27

Figure 31:
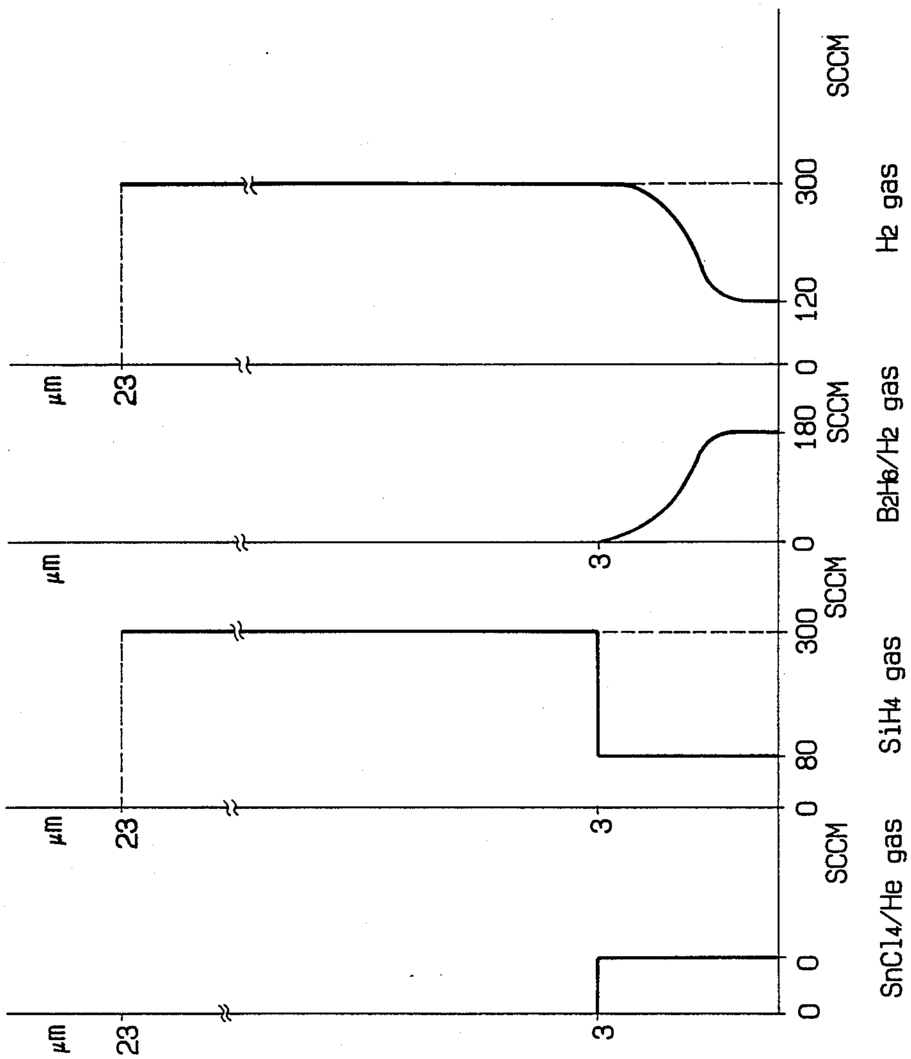

(See FIG. 31 for flow rate curve)

| Layer preparing steps | Gas used | Flow rate (SCCM) | Discharging power (W) | Rate of layer deposition (Å/S) | Layer thickness (μm) |
|---|---|---|---|---|---|
| 1st step | $SnCl_4/He$<br>$SiH_4$<br>$H_2$<br>$B_2H_6/H_2$ | $SnCl_4/He$ = 20<br>$SiH_4$ = 80<br>$H_2$ = 120 → 300<br>$B_2H_6/H_2$ = 180 → 0 | 100 | 9 | 3 |
| 2nd step | $SiH_4$<br>$H_2$ | $SiH_4$ = 300<br>$H_2$ = 300 | 300 | 24 | 20 |
| 3rd step | $SiH_4$<br>NO | $SiH_4$ = 100<br>NO = 500 | 200 | 7 | 0.5 |

Al substrate temperature: 250° C.
Discharging frequency: 13.56 MHz

TABLE 28

Figure 32:
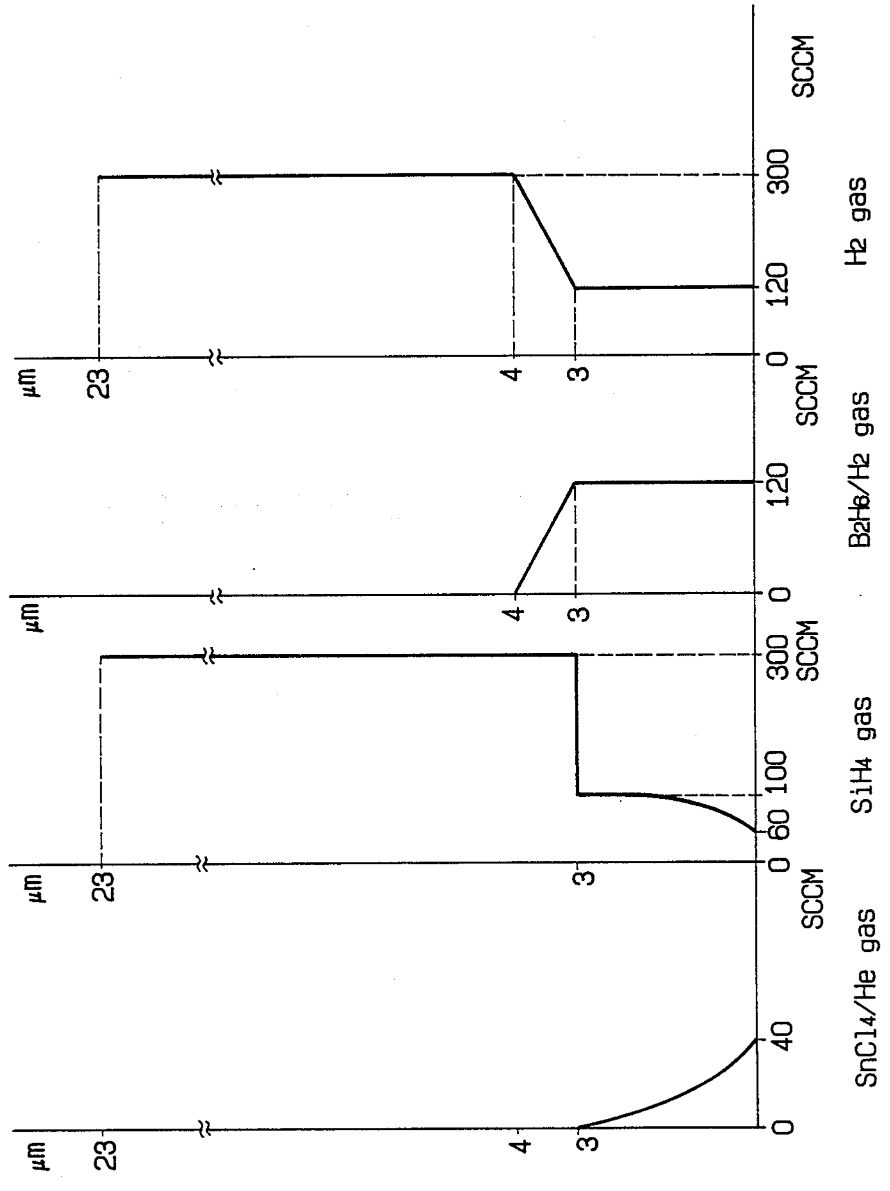

(See FIG. 32 for flow rate curve)

| Layer preparing steps | Gas used | Flow rate (SCCM) | Discharging power (W) | Rate of layer deposition (Å/S) | Layer thickness (μm) |
|---|---|---|---|---|---|
| 1st step | $SnCl_4/He$<br>$SiH_4$<br>$H_2$ | $SnCl_4/He$ = 40 → 0<br>$SiH_4$ = 60 → 100<br>$H_2$ = 120 | 100 | 9 | 3 |

TABLE 28-continued (See FIG. 32 for flow rate curve)

| Layer preparing steps | Gas used | Flow rate (SCCM) | Discharging power (W) | Rate of layer deposition (Å/S) | Layer thickness (μm) |
|---|---|---|---|---|---|
| | $B_2H_6/H_2$ | $B_2H_6/H_2$ = 180 | | | |
| 2nd step | $SiH_4$ | $SiH_4$ = 300 | 300 | 24 | 20 |
| | $H_2$ | $H_2$ = 120 → 300 | | | |
| | $B_2H_6/H_2$ | $B_2H_6/H_2$ = 180 → 0 | | | |
| 3rd step | $SiH_4$ | $SiH_4$ = 10 | 200 | 7 | 0.5 |
| | $CH_4$ | $CH_4$ = 600 | | | |

Al substrate temperature: 250° C.
Discharging frequency: 13.56 MHz

TABLE 29

Figure 33:
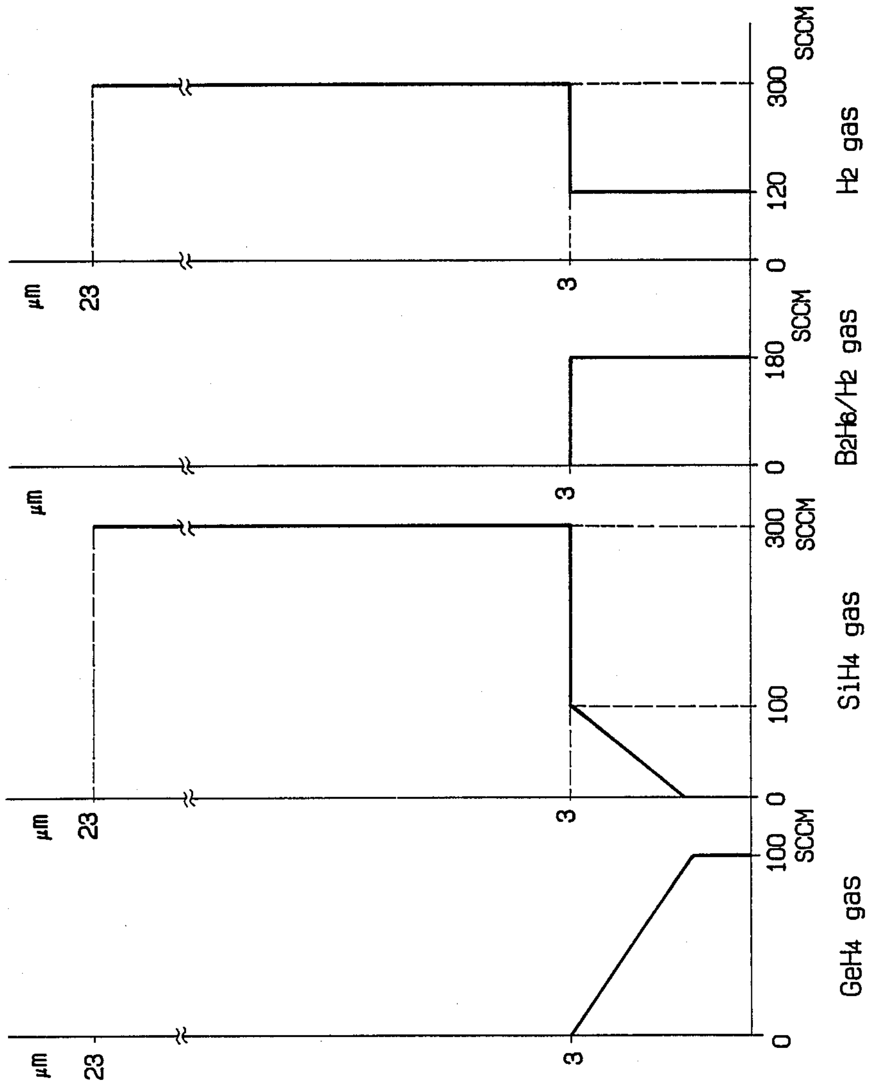

(See FIG. 33 for flow rate curve)

| Layer preparing steps | Gas used | Flow rate (SCCM) | Discharging power (W) | Rate of layer deposition (Å/S) | Layer thickness (μm) |
|---|---|---|---|---|---|
| 1st step | $GeH_4$ | $GeH_4$ = 100 → 0 | 100 | 9 | 3 |
| | $SiH_4$ | $SiH_4$ = 0 → 100 | | | |
| | $H_2$ | $H_2$ = 120 | | | |
| | $B_2H_6/H_2$ | $B_2H_6/H_2$ = 180 | | | |
| 2nd step | $SiH_4$ | $SiH_4$ = 300 | 300 | 24 | 20 |
| | $H_2$ | $H_2$ = 300 | | | |
| 3rd step | $SiH_4$ | $SiH_4$ = 20 | 200 | 7 | 0.5 |
| | $NH_3$ | $NH_3$ = 600 | | | |

Al substrate temperature: 250° C.
Discharging frequency: 13.56 MHz

TABLE 30

Figure 34:
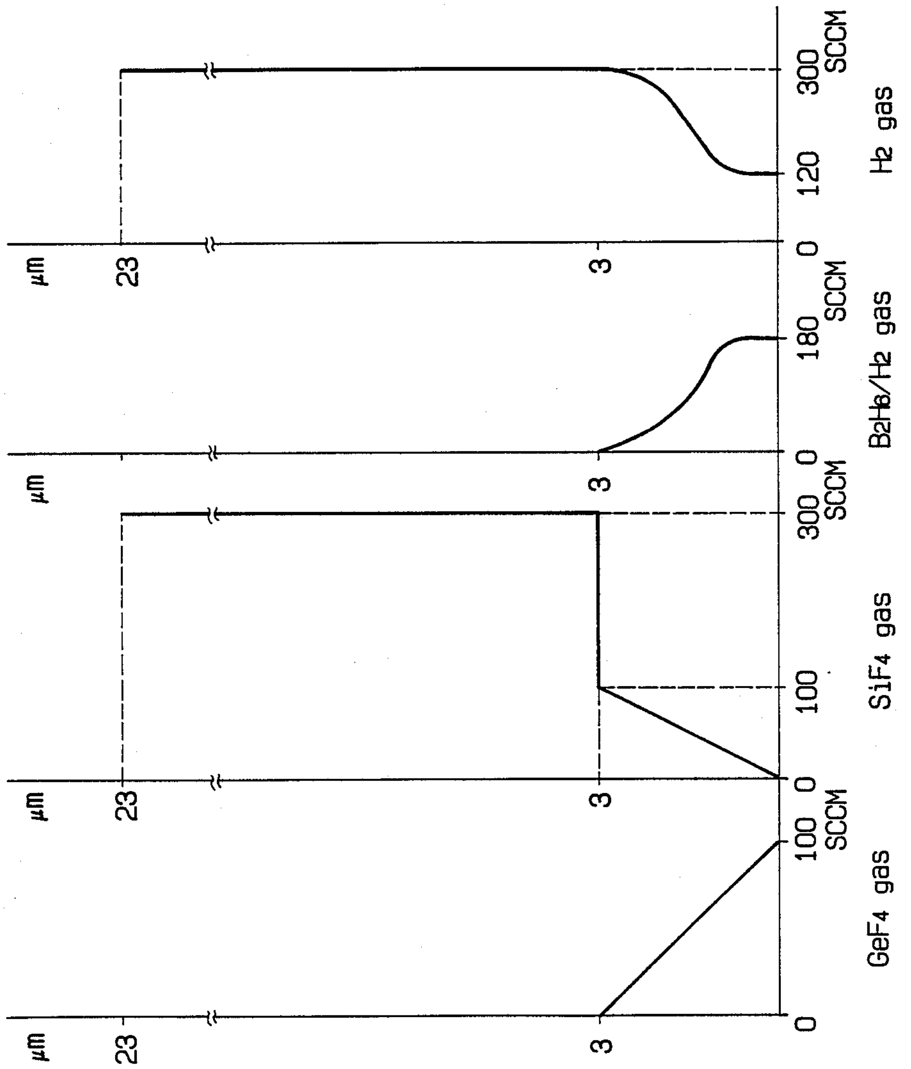

(See FIG. 34 for flow rate curve)

| Layer preparing steps | Gas used | Flow rate (SCCM) | Discharging power (W) | Rate of layer deposition (Å/S) | Layer thickness (μm) |
|---|---|---|---|---|---|
| 1st step | $GeF_4$ | $GeF_4$ = 100 → 0 | 100 | 9 | 3 |
| | $SiF_4$ | $SiF_4$ = 0 → 100 | | | |
| | $H_2$ | $H_2$ = 120 → 300 | | | |
| | $B_2H_6/H_2$ | $B_2H_6/H_2$ = 180 → 0 | | | |
| 2nd step | $SiF_4$ | $SiF_4$ = 300 | 300 | 24 | 20 |
| | $H_2$ | $H_2$ = 300 | | | |
| 3rd step | $SiF_4$ | $SiF_4$ = 100 | 200 | 7 | 0.5 |
| | NO | NO = 500 | | | |

Al substrate temperature: 250° C.
Discharging frequency: 13.56 MHz

TABLE 31

Figure 35:
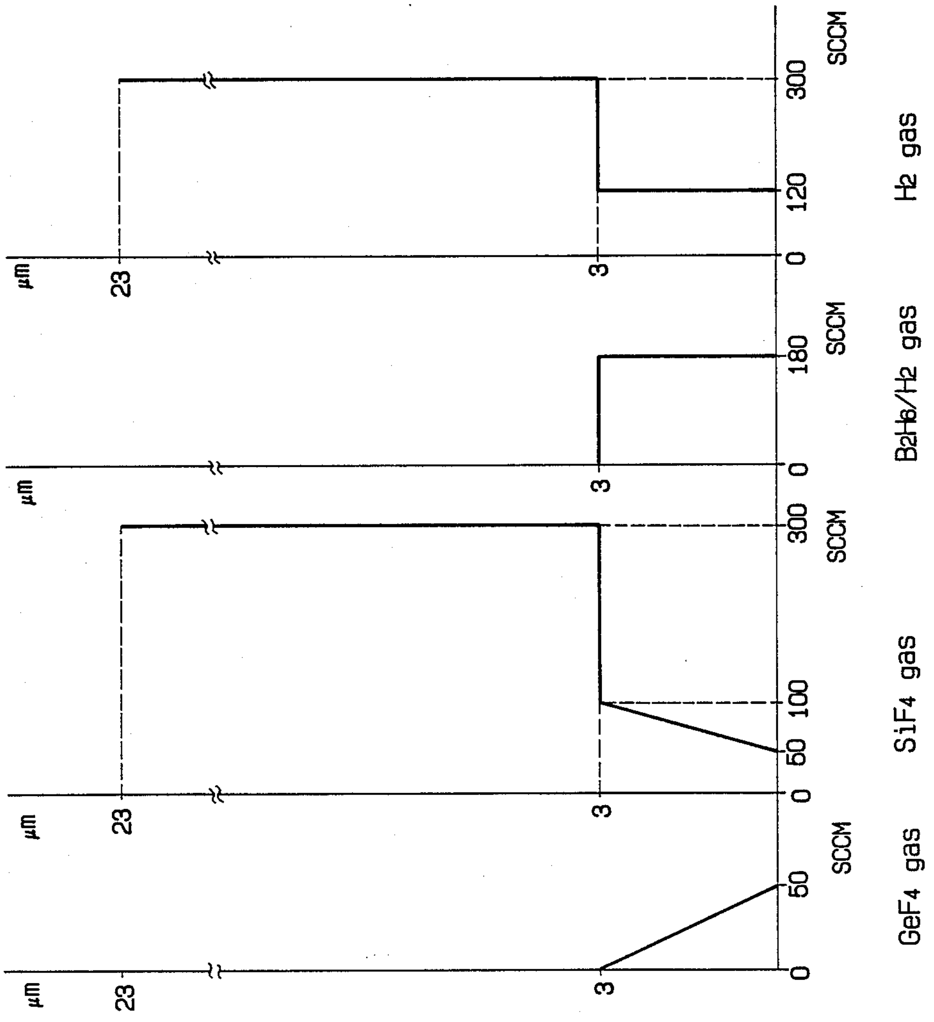

(See FIG. 35 for flow rate curve)

| Layer preparing steps | Gas used | Flow rate (SCCM) | Discharging power (W) | Rate of layer deposition (Å/S) | Layer thickness (μm) |
|---|---|---|---|---|---|
| 1st step | $GeF_4$ | $GeF_4$ = 50 → 0 | 100 | 9 | 3 |
| | $SiF_4$ | $SiF_4$ = 50 → 100 | | | |
| | $B_2H_6/H_2$ | $B_2H_6/H_2$ = 180 | | | |
| | $H_2$ | $H_2$ = 120 | | | |
| 2nd step | $SiF_4$ | $SiF_4$ = 300 | 300 | 24 | 20 |
| | $H_2$ | $H_2$ = 300 | | | |
| 3rd step | $SiF_4$ | $SiF_4$ = 10 | 200 | 7 | 0.5 |
| | $CH_4$ | $CH_4$ = 600 | | | |

Al substrate temperature: 250° C.
Discharging frequency: 13.56 MHz

TABLE 32

Figure 36:
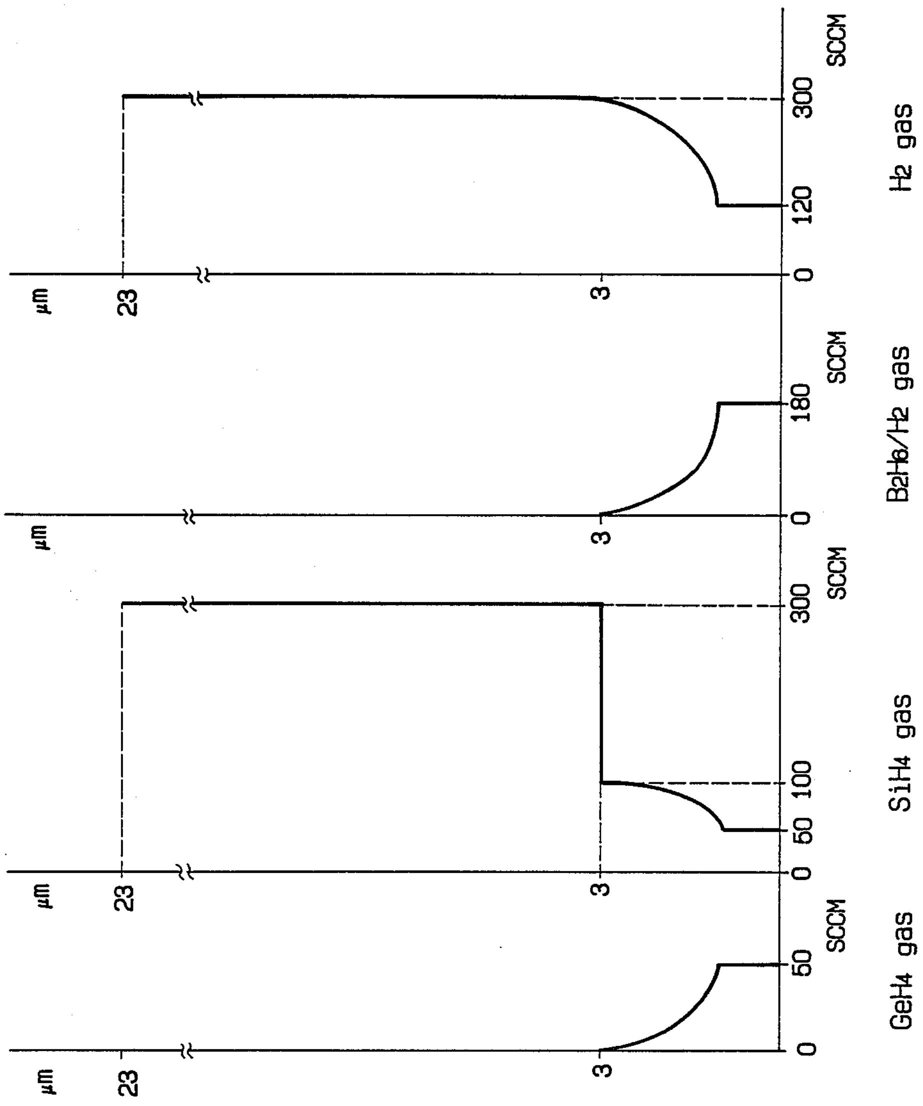

(See FIG. 36 for flow rate curve)

| Layer preparing steps | Gas used | Flow rate (SCCM) | Discharging power (W) | Rate of layer deposition (Å/S) | Layer thickness (μm) |
|---|---|---|---|---|---|
| 1st step | $GeH_4$ | $GeH_4$ = 50 → 0 | 100 | 9 | 3 |
| | $SiH_4$ | $SiH_4$ = 50 → 100 | | | |
| | $H_2$ | $H_2$ = 120 → 300 | | | |
| | $B_2H_6/H_2$ | $B_2H_6/H_2$ = 180 → 0 | | | |
| 2nd step | $SiH_4$ | $SiH_4$ = 300 | 300 | 24 | 20 |
| | $H_2$ | $H_2$ = 300 | | | |

TABLE 32-continued (See FIG. 36 for flow rate curve)

| Layer preparing steps | Gas used | Flow rate (SCCM) | Discharging power (W) | Rate of layer deposition (Å/S) | Layer thickness (μm) |
|---|---|---|---|---|---|
| 3rd step | $SiH_4$<br>$NH_3$ | $SiH_4$ = 20<br>$NH_3$ = 600 | 200 | 7 | 0.5 |

Al substrate temperature: 250° C.
Discharging frequency: 13.56 MHz

EXAMPLES 33 TO 43

Light receiving members were prepared on Al supports (cylinder Nos. 103 to 106) of Example 1 in the same manner as in Example 1 except for forming these light receiving members in accordance with the layer forming conditions shown in Tables 33 through 43. In Examples 34 through 43, the flow rates for the gases used in the first and second steps upon forming the light receiving layers were automatically adjusted under the microcomputer control in accordance with the flow rate variation curves shown in FIGS. 37 through 39, 46, and 40 through 45, respectively. In Examples 37 through 43, the boron atoms were incorporated so that their concentration in the entire layer is about 200 ppm.

Images were formed on the thus obtained light receiving members in the same manner as in Example 1.

Occurrence of interference fringe was not observed in any of the thus obtained images and the image quality was extremely high.

TABLE 33

| Layer preparing steps | Gas used | Flow rate (SCCM) | Discharging power (W) | Rate of layer deposition (Å/S) | Layer thickness (μm) |
|---|---|---|---|---|---|
| 1st step | $GeH_4$<br>$SiH_4$<br>$H_2$<br>$CH_4$ | $GeH_4$ = 50<br>$SiH_4$ = 50<br>$H_2$ = 300<br>$CH_4$ = 5 | 100 | 9 | 3 |
| 2nd step | $SiH_4$<br>$H_2$<br>$CH_4$ | $SiH_4$ = 300<br>$H_2$ = 300<br>$CH_4$ = 5 | 300 | 24 | 20 |
| 3rd step | $SiH_4$<br>NO | $SiH_4$ = 100<br>NO = 500 | 200 | 7 | 0.5 |

Al substrate temperature: 250° C.
Discharging frequency: 13.56 MHz

TABLE 34

Figure 37:
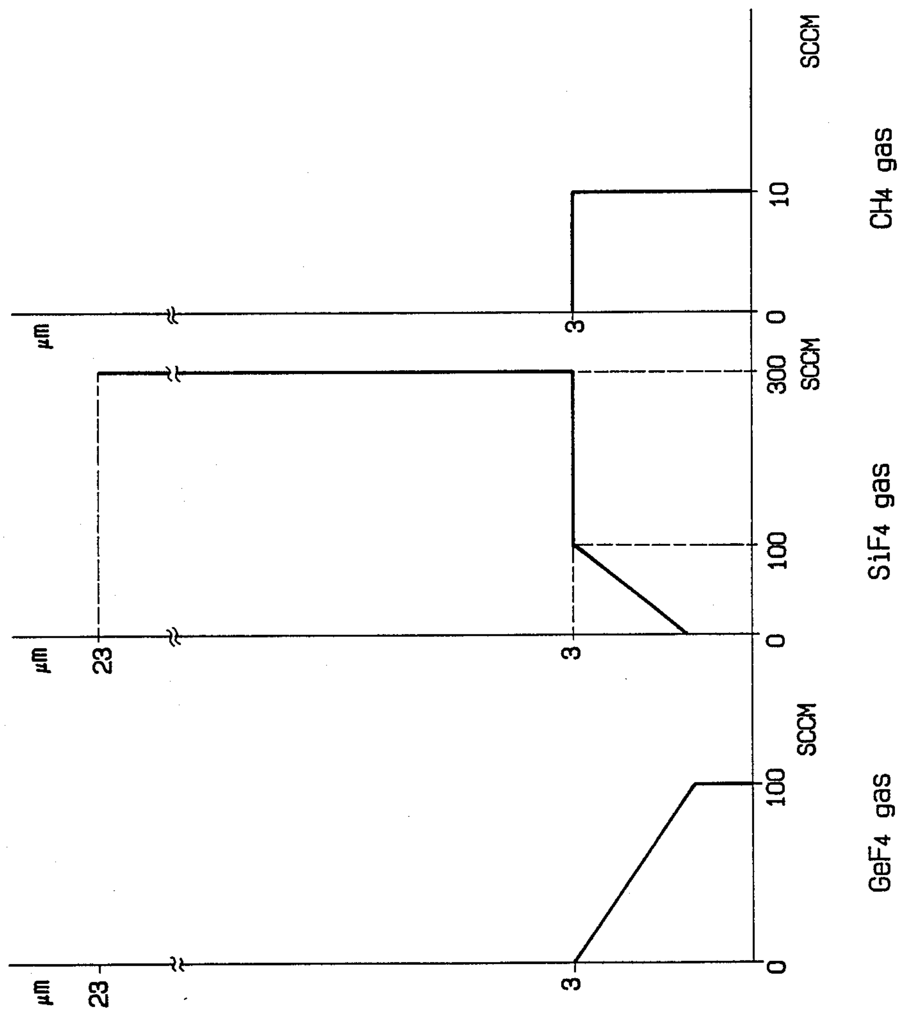

(See FIG. 37 for flow rate curve)

| Layer preparing steps | Gas used | Flow rate (SCCM) | Discharging power (W) | Rate of layer deposition (Å/S) | Layer thickness (μm) |
|---|---|---|---|---|---|
| 1st step | $GeF_4$<br>$SiF_4$<br>$H_2$<br>$CH_4$ | $GeF_4$ = 100 → 0<br>$SiF_4$ = 0 → 100<br>$H_2$ = 300<br>$CH_4$ = 10 | 100 | 9 | 3 |
| 2nd step | $SiF_4$<br>$H_2$ | $SiF_4$ = 300<br>$H_2$ = 300 | 300 | 24 | 20 |
| 3rd step | $SiF_4$<br>$NH_3$ | $SiF_4$ = 20<br>$NH_3$ = 600 | 200 | 7 | 0.5 |

Al substrate temperature: 250° C.
Discharging frequency: 13.56 MHz

TABLE 35

Figure 38:
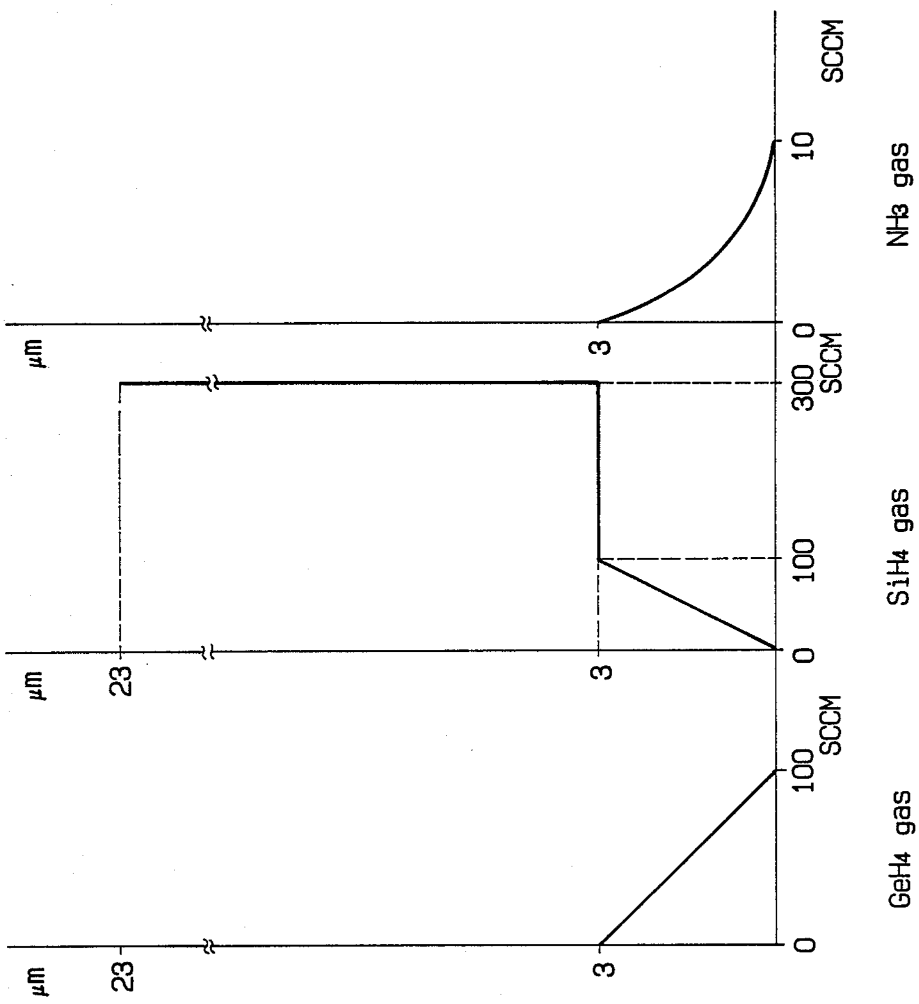

(See FIG. 38 for flow rate curve)

| Layer preparing steps | Gas used | Flow rate (SCCM) | Discharging power (W) | Rate of layer deposition (Å/S) | Layer thickness (μm) |
|---|---|---|---|---|---|
| 1st step | $GeH_4$<br>$SiH_4$<br>$H_2$<br>$NH_3$ | $GeH_4$ = 100 → 0<br>$SiH_4$ = 0 → 100<br>$H_2$ = 300<br>$NH_3$ = 10 → 0 | 100 | 9 | 3 |
| 2nd step | $SiH_4$<br>$H_2$ | $SiH_4$ = 300<br>$H_2$ = 300 | 300 | 24 | 20 |
| 3rd step | $SiF_4$<br>$CH_4$ | $SiF_4$ = 10<br>$CH_4$ = 600 | 200 | 7 | 0.5 |

Al substrate temperature: 250° C.
Discharging frequency: 13.56 MHz

TABLE 36

Figure 39:
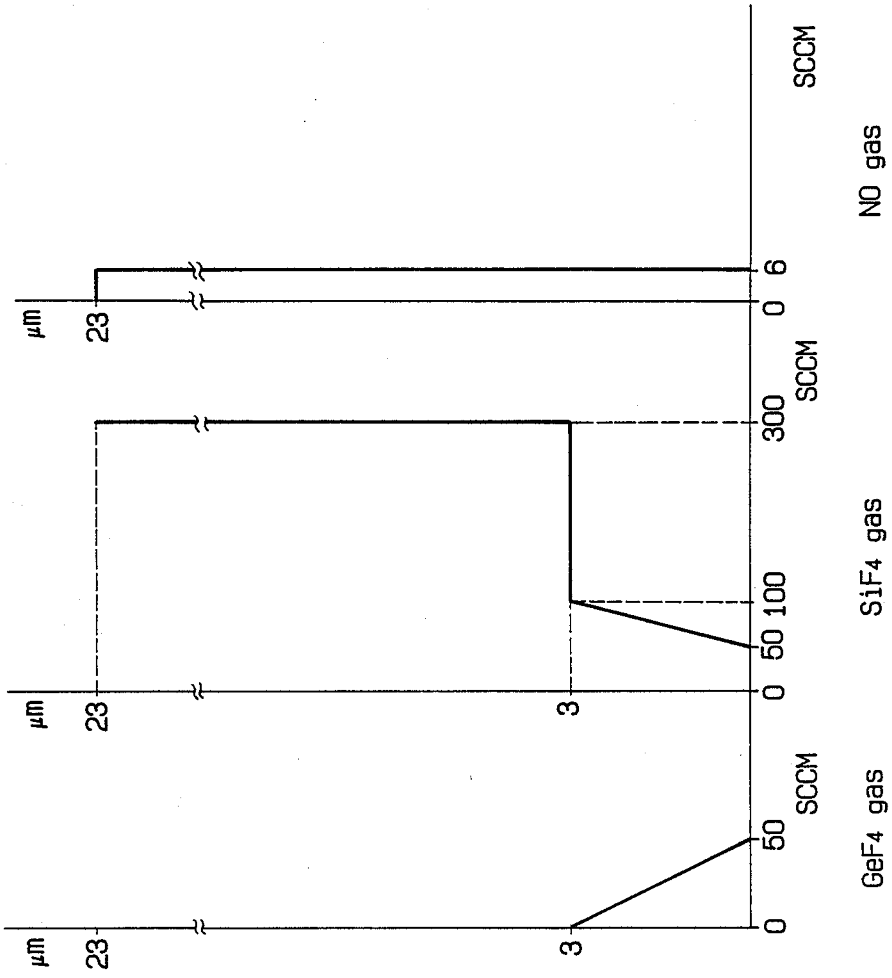

(See FIG. 39 for flow rate curve)

| Layer preparing steps | Gas used | Flow rate (SCCM) | Discharging power (W) | Rate of layer deposition (Å/S) | Layer thickness (μm) |
|---|---|---|---|---|---|
| 1st step | $GeF_4$<br>$SiF_4$<br>$H_2$<br>NO | $GeF_4$ = 50 → 0<br>$SiF_4$ = 50 → 100<br>$H_2$ = 300<br>NO = 6 | 100 | 9 | 3 |
| 2nd step | $SiF_4$ | $SiF_4$ = 300 | 300 | 24 | 20 |

TABLE 36-continued (See FIG. 39 for flow rate curve)

| Layer preparing steps | Gas used | Flow rate (SCCM) | Discharging power (W) | Rate of layer deposition (Å/S) | Layer thickness (μm) |
|---|---|---|---|---|---|
| | $H_2$ | $H_2$ = 300 | | | |
| | NO | NO = 6 | | | |
| 3rd step | $SiF_4$ | $SiF_4$ = 10 | 200 | 7 | 0.5 |
| | $CH_4$ | $CH_4$ = 600 | | | |

Al substrate temperature: 250° C.
Discharging frequency: 13.56 MHz

TABLE 37

Figure 46:
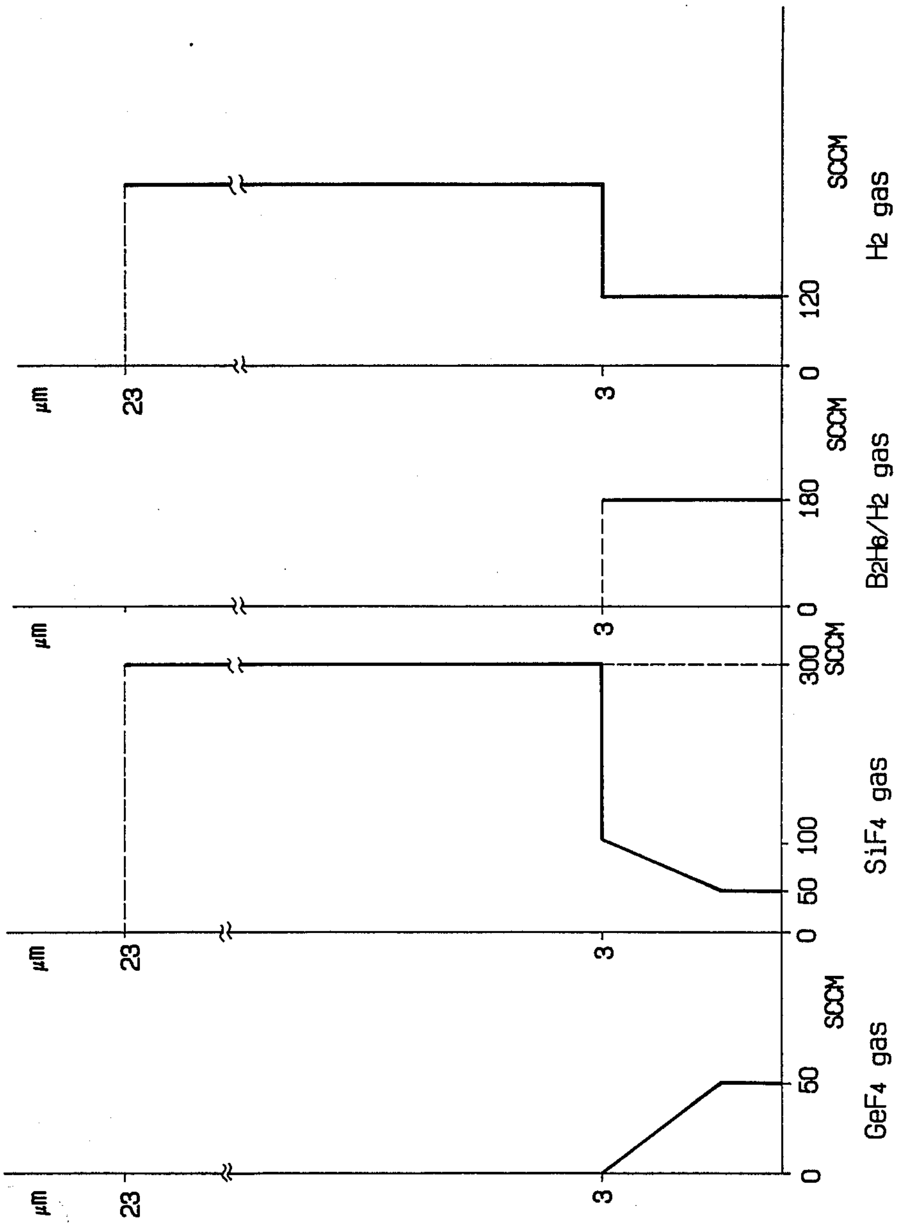

(See Fig. 46 for flow rate curve)

| Layer preparing steps | Gas used | Flow rate (SCCM) | Discharging power (W) | Rate of layer deposition (Å/S) | Layer thickness (μm) |
|---|---|---|---|---|---|
| 1st step | $GeF_4$ | $GeF_4$ = 50 → 0 | 100 | 9 | 3 |
| | $SiF_4$ | $SiF_4$ = 50 → 100 | | | |
| | $H_2$ | $H_2$ = 120 | | | |
| | $B_2H_6/H_2$ | $B_2H_6/H_2$ = 180 | | | |
| | $CH_4$ | $CH_4$ = 5 | | | |
| 2nd step | $SiF_4$ | $SiF_4$ = 300 | 300 | 24 | 20 |
| | $H_2$ | $H_2$ = 300 | | | |
| | $CH_4$ | $CH_4$ = 5 | | | |
| 3rd step | $SiF_4$ | $SiF_4$ = 20 | 200 | 7 | 0.5 |
| | $NH_3$ | $NH_3$ = 600 | | | |

Al substrate temperature: 250° C.
Discharging frequency: 13.56 MHz

TABLE 38

Figure 40:
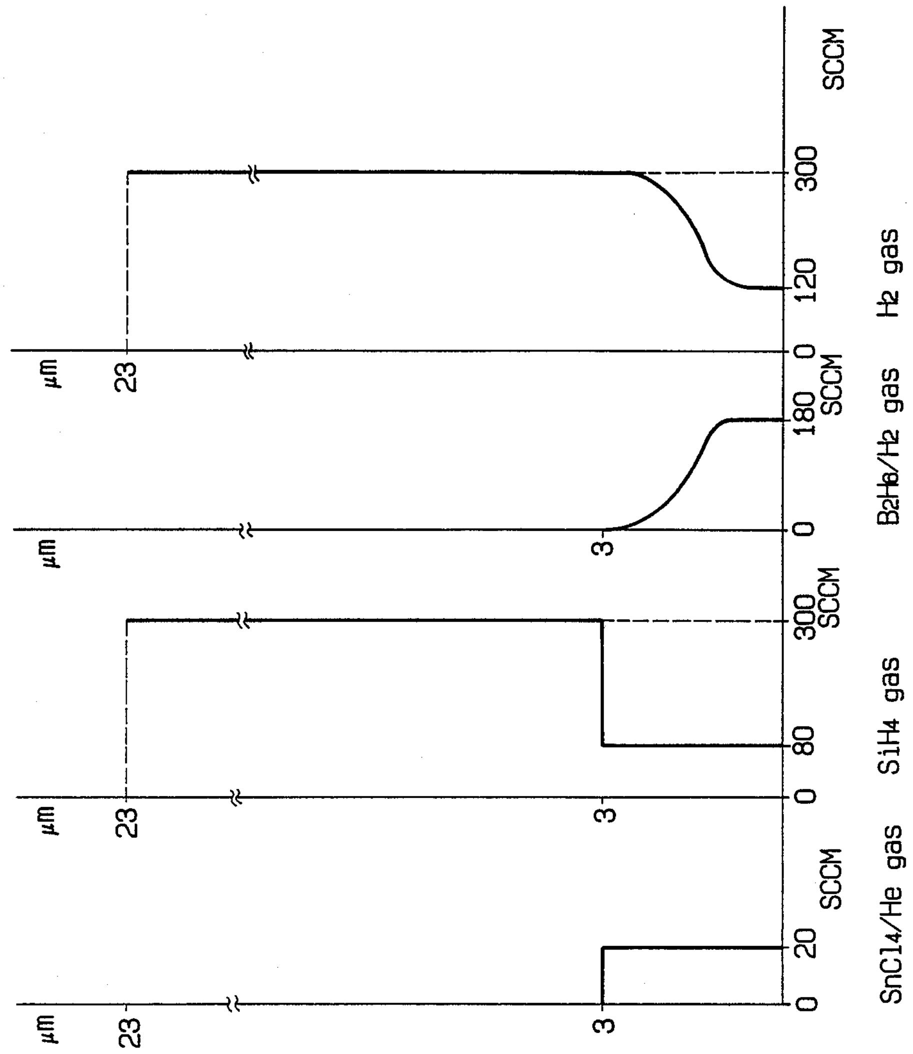

(See FIG. 40 for flow rate curve)

| Layer preparing steps | Gas used | Flow rate (SCCM) | Discharging power (W) | Rate of layer deposition (Å/S) | Layer thickness (μm) |
|---|---|---|---|---|---|
| 1st step | $SnCl_4/He$ | $SnCl_4/He$ = 20 | 100 | 9 | 3 |
| | $SiH_4$ | $SiH_4$ = 80 | | | |
| | $H_2$ | $H_2$ = 120 → 300 | | | |
| | $B_2H_6/H_2$ | $B_2H_6/H_2$ = 180 → 0 | | | |
| | $CH_4$ | $CH_4$ = 5 | | | |
| 2nd step | $SiH_4$ | $SiH_4$ = 300 | 300 | 24 | 20 |
| | $H_2$ | $H_2$ = 300 | | | |
| | $CH_4$ | $CH_4$ = 5 | | | |
| 3rd step | $SiH_4$ | $SiH_4$ = 100 | 200 | 7 | 0.5 |
| | NO | NO = 500 | | | |

Al substrate temperature: 250° C.
Discharging frequency: 13.56 MHz

TABLE 39

Figure 41:
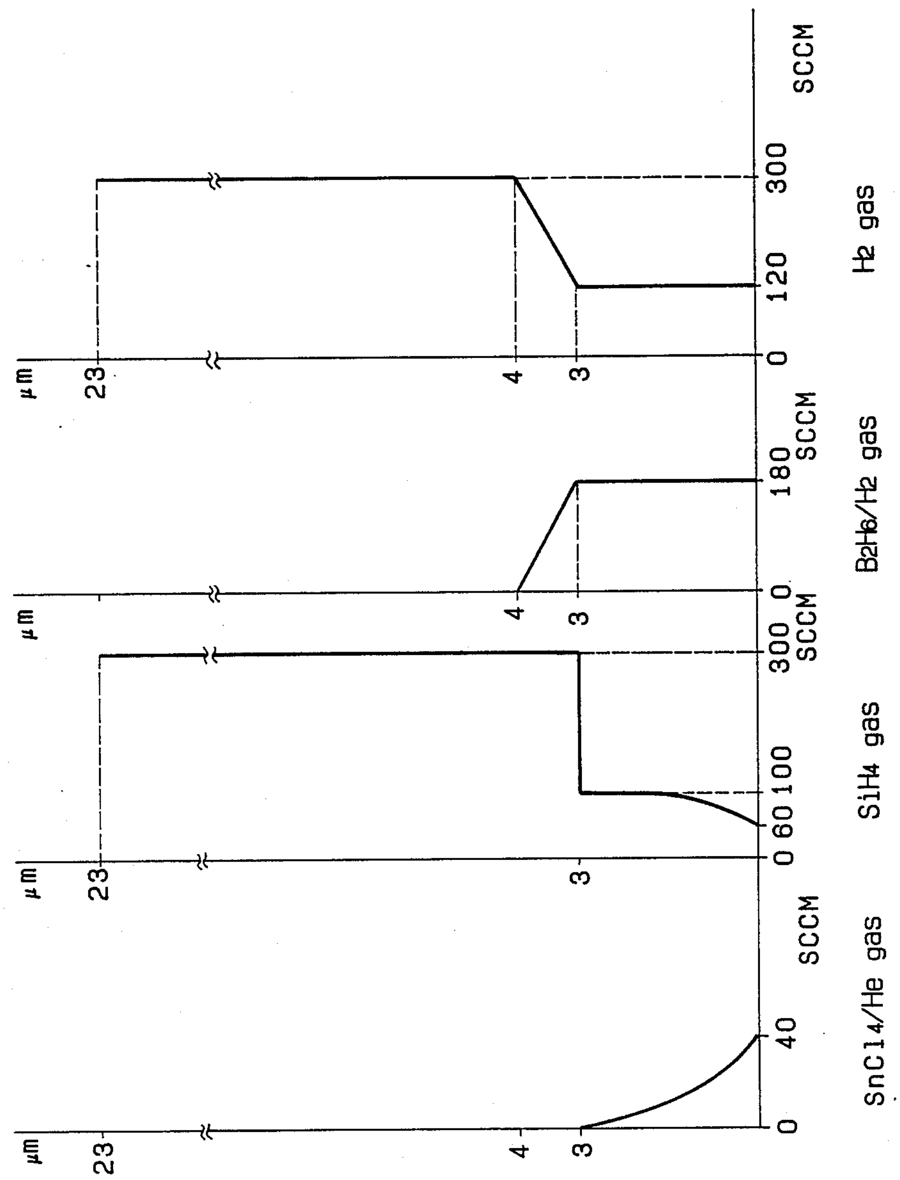

(See FIG. 41 for flow rate curve)

| Layer preparing steps | Gas used | Flow rate (SCCM) | Discharging power (W) | Rate of layer deposition (Å/S) | Layer thickness (μm) |
|---|---|---|---|---|---|
| 1st step | $SnCl_4/He$ | $SnCl_4/He$ = 40 → 0 | 100 | 9 | 3 |
| | $SiH_4$ | $SiH_4$ = 60 → 100 | | | |
| | $H_2$ | $H_2$ = 120 | | | |
| | $B_2H_6/H_2$ | $B_2H_6/H_2$ = 180 | | | |
| | $CH_4$ | $CH_4$ = 5 | | | |
| 2nd step | $SiH_4$ | $SiH_4$ = 300 | 300 | 24 | 20 |
| | $H_2$ | $H_2$ = 120 → 300 | | | |
| | $B_2H_6/H_2$ | $B_2H_6/H_2$ = 180 → 0 | | | |
| | $CH_4$ | $CH_4$ = 5 | | | |
| 3rd step | $SiH_4$ | $SiH_4$ = 100 | 200 | 7 | 0.5 |
| | $CH_4$ | $CH_4$ = 500 | | | |

Al substrate temperature: 250° C.
Discharging frequency: 13.56 MHz

TABLE 40

(See FIG. 42 for flow rate curve)

| Layer preparing steps | Gas used | Flow rate (SCCM) | Discharging power (W) | Rate of layer deposition (Å/S) | Layer thickness (μm) |
|---|---|---|---|---|---|
| 1st step | $GeH_4$ | $GeH_4$ = 100 → 0 | 100 | 9 | 8 |

TABLE 40-continued (See FIG. 42 for flow rate curve)

| Layer preparing steps | Gas used | Flow rate (SCCM) | Discharging power (W) | Rate of layer deposition (Å/S) | Layer thickness (μm) |
|---|---|---|---|---|---|
| | $SiH_4$ | $SiH_4 = 0 \rightarrow 100$ | | | |
| | $H_2$ | $H_2 = 120$ | | | |
| | $B_2H_6/H_2$ | $B_2H_6/H_2 = 180$ | | | |
| | NO | $NO = 10 \rightarrow 0$ | | | |
| 2nd step | $SiH_4$ | $SiH_4 = 300$ | 300 | 24 | 20 |
| | $H_2$ | $H_2 = 300$ | | | |
| 3rd step | $SiH_4$ | $SiH_4 = 10$ | 200 | 7 | 0.5 |
| | $CH_4$ | $CH_4 = 600$ | | | |

Al substrate temperature: 250° C.
Discharging frequency: 13.56 MHz

TABLE 41

(See FIG. 43 for flow rate curve)

| Layer preparing steps | Gas used | Flow rate (SCCM) | Discharging power (W) | Rate of layer deposition (Å/S) | Layer thickness (μm) |
|---|---|---|---|---|---|
| 1st step | $GeF_4$ | $GeF_4 = 100 \rightarrow 0$ | 100 | 9 | 3 |
| | $SiF_4$ | $SiF_4 = 0 \rightarrow 100$ | | | |
| | $H_2$ | $H_2 = 120 \rightarrow 300$ | | | |
| | $B_2H_6/H_2$ | $B_2H_6/H_2 = 180 \rightarrow 0$ | | | |
| | $NH_3$ | $NH_3 = 10 \rightarrow 0.5$ | | | |
| 2nd step | $SiF_4$ | $SiF_4 = 300$ | 300 | 24 | 20 |
| | $H_2$ | $H_2 = 300$ | | | |
| | $NH_3$ | $NH_3 = 0.5$ | | | |
| 3rd step | $SiF_4$ | $SiF_4 = 10$ | 200 | 7 | 0.5 |
| | $CH_4$ | $CH_4 = 600$ | | | |

Al substrate temperature: 250° C.
Discharging frequency: 13.56 MHz

TABLE 42

(See FIG. 44 for flow rate curve)

| Layer preparing steps | Gas used | Flow rate (SCCM) | Discharging power (W) | Rate of layer deposition (Å/S) | Layer thickness (μm) |
|---|---|---|---|---|---|
| 1st step | $GeF_4$ | $GeF_4 = 50 \rightarrow 0$ | 100 | 9 | 3 |
| | $SiF_4$ | $SiF_4 = 50 \rightarrow 100$ | | | |
| | $B_2H_6/H_2$ | $B_2H_6/H_2 = 180$ | | | |
| | $H_2$ | $H_2 = 120$ | | | |
| | $CH_4$ | $CH_4 = 10 \rightarrow 0.5$ | | | |
| 2nd step | $SiF_4$ | $SiF_4 = 300$ | 300 | 24 | 20 |
| | $H_2$ | $H_2 = 300$ | | | |
| | $CH_4$ | $CH_4 = 0.5$ | | | |
| 3rd step | $SiF_4$ | $SiF_4 = 20$ | 200 | 7 | 0.5 |
| | $NH_3$ | $NH_3 = 600$ | | | |

Al substrate temperature: 250° C.
Discharging frequency: 13.56 MHz

TABLE 43

(See FIG. 45 for flow rate curve)

| Layer preparing steps | Gas used | Flow rate (SCCM) | Discharging power (W) | Rate of layer deposition (Å/S) | Layer thickness (μm) |
|---|---|---|---|---|---|
| 1st step | $GeH_4$ | $GeH_4 = 50 \rightarrow 0$ | 100 | 9 | 3 |
| | $SiH_4$ | $SiH_4 = 50 \rightarrow 100$ | | | |
| | $H_2$ | $H_2 = 300$ | | | |
| | $B_2H_6/H_2$ | $B_2H_6/H_2 = 180 \rightarrow 0$ | | | |
| | $CH_4$ | $CH_4 = 10 \rightarrow 0$ | | | |
| 2nd step | $SiH_4$ | $SiH_4 = 300$ | 300 | 24 | 20 |
| | $H_2$ | $H_2 = 300$ | | | |
| 3rd step | $SiH_4$ | $SiH_4 = 20$ | 200 | 7 | 0.5 |
| | $N_2$ | $N_2 = 600$ | | | |

Al substrate temperature: 250° C.
Discharging frequency: 13.56 MHz

EXAMPLE 44

A light receiving layer was formed on an Al support (cylinder No. 105) of Example 1 in accordance with the layer forming conditions shown in Table 44A. Boron atoms were incorporated under the same conditions as in Example 5. The flow rates of $GeH_4$ gas, $SiH_4$ gas, $H_2$ gas, and $NH_3$ gas at the time of forming the light receiving layer were automatically adjusted under the microcomputer control in accordance with the flow rate variation curves shown in FIG. 38.

After the light receiving layer had been formed, the surface layer was formed by the sputtering process. The material used for forming each of the surface layer is shown in the upper row of Table 44B. The thickness of the surface layer is shown in the lower row of Table 44B.

Images were formed on the thus obtained light receiving members (4401-4420) in the same manner as in Example 1.

Occurrence of interference fringe was not observed in any of the thus obtained images and the image quality was extremely high.

TABLE 44A (See FIG. 38 for flow rate curve)

| Layer preparing steps | Gas used | Flow rate (SCCM) | Discharging power ($W/cm^2$) | Layer thickness ($\mu m$) |
|---|---|---|---|---|
| 1st step | $GeH_4$ | $GeH_4 = 100 \rightarrow 0$ | 100 | 3 |
| | $SiH_4$ | $SiH_4 = 0 \rightarrow 100$ | | |
| | $H_2$ | $H_2 = 300$ | | |
| | $NH_3$ | $NH_3 = 10 \rightarrow 0$ | | |
| 2nd step | $SiH_4$ | $SiH_4 = 300$ | 300 | 20 |
| | $H_2$ | $H_2 = 300$ | | |

Al substrate temperature: 250° C.
Discharging frequency: 13.56 MHz

TABLE 44B

| Condition No. | Composition of surface layer | Refractive index | Layer thickness ($\mu m$) |
|---|---|---|---|
| 1 | $ZrO_2$ | 2.00 | 0.0975 |
| 2 | $ZrO_2$ | 2.00 | 0.293 |
| 3 | $TiO_2$ | 2.26 | 0.0863 |
| 4 | $TiO_2$ | 2.26 | 0.259 |
| 5 | $ZrO_2/TiO_2 = 6/1$ | 2.09 | 0.0933 |
| 6 | $ZrO_2/TiO_2 = 6/1$ | 2.09 | 0.280 |
| 7 | $TiO_2/ZrO_2 = 3/1$ | 2.20 | 0.0886 |
| 8 | $TiO_2/ZrO_2 = 3/1$ | 2.20 | 0.266 |
| 9 | $CeO_2$ | 2.23 | 0.0874 |
| 10 | $CeO_2$ | 2.23 | 0.262 |
| 11 | ZnS | 2.24 | 0.0871 |
| 12 | ZnS | 2.24 | 0.261 |
| 13 | $Al_2O_3$ | 1.63 | 0.120 |
| 14 | $Al_2O_3$ | 1.63 | 0.359 |
| 15 | $CeF_3$ | 1.60 | 0.123 |
| 16 | $CeF_3$ | 1 60 | 0.366 |
| 17 | $Al_2O_3/ZrO_2 = 1/1$ | 1.68 | 0.116 |
| 18 | $Al_2O_3/ZrO_2 = 1/1$ | 1.68 | 0.348 |
| 19 | $MgF_2$ | 1.38 | 0.141 |
| 20 | $MgF_2$ | 1.38 | 0.424 |

EXAMPLE 45

A light receiving layer was formed on an Al support (cylinder No. 105) in the same manner as in Example 44 in accordance with the layer forming conditions shown in Table 45. The flow rates of $GeF_4$ gas and $SiF_4$ gas at the time of forming the light receiving layer were automatically adjusted under the microcomputer control in accordance with the flow rate variation curve shown in FIG. 39.

After the light receiving layer had been formed, the surface layer (1-20) was formed in the same manner as in Example 44.

Images were formed on the thus obtained light receiving members (4501-4520) in the same manner as in Example 1.

Occurrence of interference fringe was not observed in any of the thus obtained images and the image quality was extremely high.

TABLE 45

(See FIG. 39 for flow rate curve)

| Layer preparing steps | Gas used | Flow rate (SCCM) | Discharging power ($W/cm^2$) | Layer thickness ($\mu m$) |
|---|---|---|---|---|
| 1st step | $GeF_4$ | $GeF_4 = 50 \rightarrow 0$ | 100 | 3 |
| | $SiF_4$ | $SiF_4 = 50 \rightarrow 100$ | | |
| | $H_2$ | $H_2 = 300$ | | |
| | NO | NO = 6 | | |
| 2nd step | $SiF_4$ | $SiF_4 = 300$ | 300 | 20 |
| | $H_2$ | $H_2 = 300$ | | |
| | NO | No = 6 | | |

Al substrate temperature: 250° C.
Discharging frequency: 13.56 MHz

EXAMPLES 46 TO 54

A light receiving layer was formed on an Al support (cylinder Nos. 103-106) of Example 1 in accordance with the layer forming conditions shown in Tables 46 through 54. A surface layer was formed on the light receiving layer by the sputtering process. The composition of the surface layer is shown in the upper row of Table 55 and the thickness of the surface layer is shown in the lower row of Table 55.

The flow rates of the gases at the time of forming the light receiving layer in Examples 47 to 54 were automatically adjusted under the microcomputer control in accordance with the flow rate variation curves shown in FIGS. 37, 30-32, 42-45, respectively.

The concentration of boron atoms in the layer was 200 ppm in each example.

Images were formed on the thus obtained light receiving members in the same manner as in Example 1. As good results as in Example 1 were obtained.

TABLE 46

| Layer preparing steps | Gas used | Flow rate (SCCM) | Discharging power ($W/cm^2$) | Layer thickness ($\mu m$) |
|---|---|---|---|---|
| 1st step | $GeH_4$ | $GeH_4 = 50$ | 100 | 3 |
| | $SiH_4$ | $SiH_4 = 50$ | | |
| | $H_2$ | $H_2 = 300$ | | |
| 2nd step | $SiH_4$ | $SiH_4 = 300$ | 300 | 20 |
| | $H_2$ | $H_2 = 300$ | | |

Al substrate temperature: 250° C.
Discharging frequency: 13.56 MHz

TABLE 47

(See FIG. 37 for flow rate curve)

| Layer preparing steps | Gas used | Flow rate (SCCM) | Discharging power ($W/cm^2$) | Layer thickness ($\mu m$) |
|---|---|---|---|---|
| 1st step | $GeF_4$ | $GeF_4 = 100 \rightarrow 0$ | 100 | 3 |
| | $SiF_4$ | $SiF_4 = 0 \rightarrow 100$ | | |
| | $H_2$ | $H_2 = 300$ | | |
| | $CH_4$ | $CH_4 = 10$ | | |
| 2nd step | $SiF_4$ | $SiF_4 = 300$ | 300 | 20 |
| | $H_2$ | $H_2 = 300$ | | |

Al substrate temperature: 250° C.
Discharging frequency: 13.56 MHz

TABLE 48

(See FIG. 30 for flow rate curve)

| Layer preparing steps | Gas used | Flow rate (SCCM) | Discharging power ($W/cm^2$) | Layer thickness ($\mu m$) |
|---|---|---|---|---|
| 1st step | $GeF_4$ | $GeF_4 = 50 \rightarrow 0$ | 100 | 3 |
| | $SiF_4$ | $SiF_4 = 50 \rightarrow 100$ | | |
| | $H_2$ | $H_2 = 120$ | | |
| | $B_2H_6/H_2$ | $B_2H_6/H_2 = 180$ | | |

TABLE 48-continued (See FIG. 30 for flow rate curve)

| Layer preparing steps | Gas used | Flow rate (SCCM) | Discharging power ($W/cm^2$) | Layer thickness ($\mu m$) |
|---|---|---|---|---|
| 2nd step | $SiF_4$ | $SiF_4 = 300$ | 300 | 20 |
| | $H_2$ | $H_2 = 300$ | | |

Al substrate temperature: 250° C.
Discharging frequency: 13.56 MHz

TABLE 49

(See FIG. 31 for flow rate curve)

| Layer preparing steps | Gas used | Flow rate (SCCM) | Discharging power ($W/cm^2$) | Layer thickness ($\mu m$) |
|---|---|---|---|---|
| 1st step | $SnCl_4/He$ | $SnCl_4/He = 20$ | 100 | 3 |
| | $SiH_4$ | $SiH_4 = 80$ | | |
| | $H_2$ | $H_2 = 120 \rightarrow 300$ | | |
| | $B_2H_6/H_2$ | $B_2H_6/H_2 = 180 \rightarrow 0$ | | |
| 2nd step | $SiH_4$ | $SiH_4 = 300$ | 300 | 20 |
| | $H_2$ | $H_2 = 300$ | | |

Al substrate temperature: 250° C.
Discharging frequency: 13.56 MHz

TABLE 50

(See FIG. 32 for flow rate curve)

| Layer preparing steps | Gas used | Flow rate (SCCM) | Discharging power ($W/cm^2$) | Layer thickness ($\mu m$) |
|---|---|---|---|---|
| 1st step | $SnCl_4/He$ | $SnCl_4/He = 40 \rightarrow 0$ | 100 | 3 |
| | $SiH_4$ | $SiH_4 = 60 \rightarrow 100$ | | |
| | $H_2$ | $H_2 = 120$ | | |
| | $B_2H_6/H_2$ | $B_2H_6/H_2 = 180$ | | |
| 2nd step | $SiH_4$ | $SiH_4 = 300$ | 300 | 20 |
| | $H_2$ | $H_2 = 120 \rightarrow 300$ | | |
| | $B_2H_6/H_2$ | $B_2H_6/H_2 = 180 \rightarrow 0$ | | |

Al substrate temperature: 250° C.
Discharging frequency: 13.56 MHz

TABLE 51

(See FIG. 42 for flow rate curve)

| Layer preparing steps | Gas used | Flow rate (SCCM) | Discharging power ($W/cm^2$) | Layer thickness ($\mu m$) |
|---|---|---|---|---|
| 1st step | $GeH_4$ | $GeH_4 = 100 \rightarrow 0$ | 100 | 3 |
| | $SiH_4$ | $SiH_4 = 0 \rightarrow 100$ | | |
| | $H_2$ | $H_2 = 120$ | | |
| | $B_2H_6/H_2$ | $B_2H_6/H_2 = 180$ | | |
| | NO | $NO = 10 \rightarrow 0$ | | |
| 2nd step | $SiH_4$ | $SiH_4 = 300$ | 300 | 20 |
| | $H_2$ | $H_2 = 300$ | | |

Al substrate temperature: 250° C.
Discharging frequency: 13.56 MHz

TABLE 52

(See FIG. 43 for flow rate curve)

| Layer preparing stesp | Gas used | Flow rate (SCCM) | Discharging power ($W/cm^2$) | Layer thickness ($\mu m$) |
|---|---|---|---|---|
| 1st step | $GeF_4$ | $GeF_4 = 100 \rightarrow 0$ | 100 | 3 |
| | $SiF_4$ | $SiF_4 = 0 \rightarrow 100$ | | |
| | $H_2$ | $H_2 = 120 \rightarrow 300$ | | |
| | $B_2H_6/H_2$ | $B_2H_6/H_2 = 180 \rightarrow 0$ | | |
| | $NH_3$ | $NH_3 = 10 \rightarrow 0.5$ | | |
| 2nd step | $SiF_4$ | $SiF_4 = 300$ | 300 | 20 |
| | $H_2$ | $H_2 = 300$ | | |
| | $NH_3$ | $NH_3 = 0.5$ | | |

Al substrate temperature: 250° C.
Discharging frequency: 13.56 MHz

TABLE 53

(See FIG. 44 for flow rate curve)

| Layer preparing steps | Gas used | Flow rate (SCCM) | Discharging power ($W/cm^2$) | Layer thickness ($\mu m$) |
|---|---|---|---|---|
| 1st step | $GeF_4$ | $GeF_4 = 50 \rightarrow 0$ | 100 | 3 |
| | $SiF_4$ | $SiF_4 = 50 \rightarrow 100$ | | |
| | $B_2H_6/H_2$ | $B_2H_6/H_2 = 180$ | | |
| | $H_2$ | $H_2 = 120$ | | |
| | $CH_4$ | $CH_4 = 10 \rightarrow 0.5$ | | |
| 2nd step | $SiF_4$ | $SiF_4 = 300$ | 300 | 20 |
| | $H_2$ | $H_2 = 300$ | | |
| | $CH_4$ | $CH_4 = 0.5$ | | |

Al substrate temperature: 250° C.
Discharging frequency: 13.56 MHz

TABLE 54

(See FIG. 45 for flow rate curve)

| Layer preparing steps | Gas used | Flow rate (SCCM) | Discharging power ($W/cm^2$) | Layer thickness ($\mu m$) |
|---|---|---|---|---|
| 1st step | $GeH_4$ | $GeH_4 = 50 \rightarrow 0$ | 100 | 3 |
| | $SiH_4$ | $SiH_4 = 50 \rightarrow 100$ | | |
| | $H_2$ | $H_2 = 300$ | | |
| | $B_2H_6/H_2$ | $B_2H_6/H_2 = 180 \rightarrow 0$ | | |
| | $CH_4$ | $CH_4 = 10 \rightarrow 0$ | | |
| 2nd step | $SiH_4$ | $SiH_4 = 300$ | 300 | 20 |
| | $H_2$ | $H_2 = 300$ | | |

Al substrate temperature: 250° C.
Discharging frequency: 13.56 MHz

TABLE 55

| Example No. | Composition of surface layer | Refractive index | Layer thickness ($\mu m$) |
|---|---|---|---|
| 46 | $ZrO_2$ | 2.00 | 0.293 |
| 47 | $ZrO_2$ | 2.00 | 0.293 |
| 48 | $TiO_2$ | 2.26 | 0.259 |
| 49 | $ZrO_2/TiO_2 = 6/1$ | 2.09 | 0.280 |
| 50 | $CeO_2$ | 2.23 | 0.262 |
| 51 | ZnS | 2.24 | 0.261 |
| 52 | $Al_2O_3$ | 1.63 | 0.359 |
| 53 | $CeF_3$ | 1.60 | 0.366 |
| 54 | $MgF_2$ | 1.38 | 0.424 |

What is claimed is:

1. A light receiving member comprising:

(a) a support having an uneven-shaped surface formed by a plurality of spherical dimples, each of said dimples having an inside face provided with minute irregularities; and (b) a light receiving layer having a free surface on the support, said light receiving layer being a multi-layered structure having an inner layer and an outer layer; said inner layer being composed of an amorphous material containing silicon atoms, at least one kind of atom selected from the group consisting of germanium atoms and tin atoms, and at least one kind selected from the group consisting of hydrogen atoms and halogen atoms and said outer layer being composed of an amorphous material containing silicon atoms as the main constituent and at least one kind selected from the group consisting of hydrogen atoms and halogen atoms and containing neither germanium atoms nor tin atoms.

2. The light receiving member according to claim 1, wherein the uneven-shaped surface of the support is formed of spherical dimples having the same radius of curvature and the same width.

3. The light receiving member according to claim 1, wherein the uneven-shaped surface of the support is formed by the impact of a plurality of rigid spheres on the surface of the support, each of said spheres having a surface provided with minute irregularities.

4. The light receiving member according to claim 3, wherein the uneven-shaped surface of the support is formed by the impact of rigid spheres of approximately the same diameter falling spontaneously on the surface of the support from approximately the same height.

5. The light receiving member according to claim 1, wherein the spherical dimples have a radius of curvature R and a width D which satisfy the following equation:

$$0.35 \leqq D/R \leqq 0.5.$$

6. The light receiving member according to claim 1, wherein the spherical dimples having the width D satisfying the following equation:

$$D \leqq 0.5 \text{ mm}.$$

7. The light receiving member according to claim 1, wherein the minute irregularities each have a height h which satisfies the following quotation:

$$0.5\ \mu m \leqq h\ 20 \leqq \mu m.$$

8. The light receiving member according to claim 1, wherein the support is a metal member.

9. The light receiving member according to claim 1, wherein the inner layer contains the germanium atoms uniformly distributed to the entire layer region.

10. The light receiving member according to claim 1, wherein the inner layer contains the germanium atoms unevenly distributed in the thickness direction of the layer.

11. The light receiving member according to claim 1, wherein the inner layer contains thwe tin atoms uniformly distributed in the entire layer region.

12. The light receiving member according to claim 1, wherein the inner layer contains the tin atoms unevenly distributed to the thickness direction of the layer.

13. The light receiving member according to claim 1, wherein the inner layer contains both the germanium atoms and the tin atoms uniformly distributed in the entire layer region.

14. The light receiving member according to claim 1, wherein the inner layer contains both the germanium atoms and the tin atoms unevenly distributed in the thickness direction of the layer.

15. The light receiving member according to claim 1, wherein the inner layer contains the germanium atoms in an amount from 1 to $6 \times 10^5$ atomic ppm.

16. The light receiving member according to claim 1, wherein the inner layer contains the tin atoms in an amount from 1 to $6 \times 10^5$ atomic ppm.

17. The light receiving member according to claim 1, wherein the inner layer contains both the germanium atoms and the tin atoms in a total amount of 1 to $6 \times 10^5$ atomic ppm.

18. The light receiving member according to claim 1, wherein the light receiving layer contains the hydrogen atoms in an amount from 1 to 40 atomic %.

19. The light receiving member according to claim 1, wherein the light receiving layer contains the halogen atoms in an amount from 1 to 40 atomic %.

20. The light receiving member according to claim 1, wherein the light receiving layer contains both the hydrogen atoms and the halogen atoms in a total amount of 1 to 40 atomic %.

21. The light receiving member according to claim 1, wherein the light receiving layer contains 0.001 to $1 \times 10^3$ atomic ppm of one kind of atom selected from the group consisting of Group III and Group V atoms of the Periodic Table.

22. The light receiving member according to claim 1, wherein the light receiving layer additionally includes a layer region functioning as a charge injection inhibition layer at the end on the side of the support.

23. The light receiving member according to claim 22, wherein said layer region contains one kind of atom selected from the group consisting of Group III and Group V atoms of the Periodic Table in a high distribution density.

24. The light receiving member according to claim 23, wherein the concentration of said atoms is from 30 to $5 \times 10^4$ atomic ppm.

25. The light receiving member according to claim 1, wherein the light receiving layer additionally includes a barrier layer region composed of an electrically insulating material selected from the group consisting of $Al_2O_3$, $SiO_3$, $Si_3N_4$ and polycarbonate at the end on the side of the support.

26. The light receiving member according to claim 1, wherein the light receiving layer contains at least one kind of atoms (C,N,O) selected from the group consisting of carbon atoms, oxygen atoms and nitrogen atoms.

27. The light receiving member according to claim 26, wherein said at least one kind of atoms (C,N,O) are (i) most concentrated on the side of the support, (ii) gradually reduced in concentration thereafter and (iii) of least reduced concentration or free from said atoms (C,N,O) at the opposite end of the light receiving layer.

28. The light receiving member according to claim 26, wherein the amount of said atoms (C,N,O) is from 0.001 to 30 atomic %.

29. The light receiving member according to claim 1, wherein the thickness of the light receiving layer is 1 to 100 μm.

30. The light receiving member according to claim 1, wherein the light receiving layer includes a surface layer portion from 0.003 to 30 μm in thickness.

31. The light receiving member according to claim 30, wherein the surface layer portion comprises an amorphous silicon material containing from 0.001 to 90 atomic % of at least one kind of atom selected from the group consisting of oxygen atoms, carbon atoms and nitrogen atoms.

32. The light receiving member according to claim 31, wherein said at least one kind of atom contained in the surface layer portion is different from the kind of atom selected from the group consisting of oxygen atoms, carbon atoms and nitrogen atoms contained in adjacent layer region.

33. The light receiving member according to claim 30, wherein the surface layer portion is of a thickness d defined by the equation: $d = \lambda/4n \times m$, wherein m is a positive odd number, n is a refractive index of the material constituting the surface layer and λ is a wavelength of irradiated light.

34. The light receiving member according to claim 33, wherein the thickness d is 0.05 to 2 μm.

35. The light receiving member according to claim 1, including a surface layer comprising an inorganic material capable of satisfying the conditions represented by the equation: $n = \sqrt{n_a}$, wherein n is a refractive index of the material constituting the surface layer and $n_a$ is a refractive index of the amorphous material constituting the layer adjacent to the surface layer.

36. The light receiving member according to claim 35, wherein said inorganic material is selected from the group consisting of $MgF_2$, $Al_2O_3$, $ZrO_2$, ZnS, $CeO_2$, $CeF_3$, $Ta_2O_5$, $AlF_3$, NaF and mixtures thereof.

37. The light receiving member according to claim 35, wherein the surface layer is of a thickness d defined by the equation: $d=\lambda/4n\times m$, wherein m is a positive odd number, n is a refractive index of the material constituting the surface layer and $\lambda$ is a wavelength of irradiated light.

38. The light receiving member according to claim 37, wherein the thickness d is 0.05 to 2 $\mu$m.

39. An electrophotographic process comprising:

(a) imagewise exposing a light receiving member with an information bearing electromagnetic wave to thereby form an electrostatic latent image, said light receiving member comprising, a support having an uneven-shaped surface formed by a plurality of spherical dimples, each of said dimples having an inside face provided with minute irregularities; and a light receiving layer having a free surface on the support, said light receiving layer being a multilayered structure having an inner layer and an outer layer; said inner layer being composed of an amorphous material containing silicon atoms, at least one kind of atom selected from the group consisting of germanium and tin atoms, and at least one kind selected from the group consisting of hydrogen atoms and halogen atoms and said outer layer being composed of an amorphous material containing silicon atoms as the main constituent and at least one kind selected from the group consisting of hydrogen atoms and halogen atoms and containing neither germanium atoms nor tin atoms; and (b) developing said electrostatic latent image.

* * * * *

UNITED STATES PATENT AND TRADEMARK OFFICE

CERTIFICATE OF CORRECTION

PATENT NO. : 4,834,501

DATED : May 30, 1989

INVENTOR(S) : MITSURU HONDA ET AL.

It is certified that error appears in the above-identified patent and that said Letters Patent is hereby corrected as shown below:

DRAWINGS

SHEET 9 OF 35

FIG.10, "C8" should read --C6--.

COLUMN 2

Line 60, "resulted" should read --resultant--.

COLUMN 4

Line 33, "Other" should read --Another--.

COLUMN 7

Line 46, "resulted" should read --resulting--.

COLUMN 11

Line 40, "boat hall tube" should read --boat hull tube--.

COLUMN 14

Line 9, "$t_B$ and position $t_2$" should read --$t_B$ to position $t_2$--.

Line 16, "$t_B$ and position $t_3$," should read --$t_B$ to position $t_3$,--.

Line 21, "$t_B$ and position $t_4$" should read --$t_B$ to position $t_4$--.

Line 26, "$t_B$ and position $t_5$" should read --$t_B$ to position $t_5$--.

UNITED STATES PATENT AND TRADEMARK OFFICE

CERTIFICATE OF CORRECTION

PATENT NO. : 4,834,501

DATED : May 30, 1989

INVENTOR(S) : MITSURU HONDA ET AL.

It is certified that error appears in the above-identified patent and that said Letters Patent is hereby corrected as shown below:

COLUMN 20

Line 37, "50 to 30 atomic%," should read --5 to 30 atomic%,--.

COLUMN 21

Line 67, "$CeF_3$(1,60)," should read --$CeF_3$(1.60),--.

COLUMN 28

Line 18, "2505 $B_2H_6$" should read --2505, $B_2H_6$--.
Line 53, "2537" should read --substrate cylinder 2537-- and "heater 2438" should read --heater 2538--.
Line 54, "power source 2450" should read --power source 2540--.

COLUMN 29

Line 3, "(starting" should read --starting--.

COLUMN 31

Table 1A, "Actual usability:
:excellent,
:good,"
should read
--Actual usability:
⊚:excellent,
o:good,--.

UNITED STATES PATENT AND TRADEMARK OFFICE

CERTIFICATE OF CORRECTION

PATENT NO. : 4,834,501

DATED : May 30, 1989

INVENTOR(S) : MITSURU HONDA ET AL.

It is certified that error appears in the above-identified patent and that said Letters Patent is hereby corrected as shown below:

COLUMN 32

Table 2A, "Occurrence of interferrence fringes" x Δ X
should read
--Occurrence of interferrence fringes x Δ ○ ○ ◎ ◎ X--

Table 2A, "Actual usability:
:excellent,
:good,"
should read
--Actual usability:
◎:excellent,
○:good,--.

COLUMN 33

Table 6, "Gas used $SnCl_4He$" should read --Gas used $SnCl_4/He$--.

COLUMN 37

Table 13, "CH4" should read --$CH_4$--.

COLUMN 52

Table 45, "No = 6" should read --NO = 6--.

UNITED STATES PATENT AND TRADEMARK OFFICE

CERTIFICATE OF CORRECTION

PATENT NO. : 4,834,501

DATED : May 30, 1989

INVENTOR(S) : MITSURU HONDA ET AL.

It is certified that error appears in the above-identified patent and that said Letters Patent is hereby corrected as shown below:

COLUMN 55

Line 21, "quotation:" should read --equation:--.
Line 28, "to" should read --in--.
Line 34, "thwe" should read --the--.
Line 38, "to" should read --in--.

COLUMN 56

Line 56, "d=$\lambda$/4*nxm*," should read --d=$\lambda$/4nxm,--.

Signed and Sealed this

Seventeenth Day of December, 1991

*Attest:*

HARRY F. MANBECK, JR.

*Attesting Officer*

*Commissioner of Patents and Trademarks*